United States Patent
Kolesnikov et al.

(10) Patent No.: US 11,381,823 B2
(45) Date of Patent: *Jul. 5, 2022

(54) METHOD, APPARATUS AND SYSTEM FOR ENCODING AND DECODING A SAMPLE ADAPTIVE OFFSET DATA OF ENCODED VIDEO DATA

(71) Applicant: Canon Kabushiki Kaisha, Tokyo (JP)

(72) Inventors: Volodymyr Kolesnikov, Marsfield (AU); Christopher James Rosewarne, Gosford (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,660

(22) Filed: Dec. 4, 2020

(65) Prior Publication Data

US 2021/0092386 A1 Mar. 25, 2021

Related U.S. Application Data

(63) Continuation of application No. 14/411,010, filed as application No. PCT/AU2013/000706 on Jun. 28, 2013, now Pat. No. 10,887,592.

(30) Foreign Application Priority Data

Jun. 28, 2012 (AU) .............................. 2012203828

(51) Int. Cl.
*H04N 19/13* (2014.01)
*H04N 19/463* (2014.01)
(Continued)

(52) U.S. Cl.
CPC .......... *H04N 19/13* (2014.11); *H04N 19/117* (2014.11); *H04N 19/176* (2014.11);
(Continued)

(58) Field of Classification Search
None
See application file for complete search history.

(56) References Cited

FOREIGN PATENT DOCUMENTS

WO 2013/183232 A1 1/2016

OTHER PUBLICATIONS

Ehsan Maani; et al., Flexible Band Offset Mode in SAO, Joint Collaborative Team on Video Coding (JCT-VC) of ITU-T SG16 WP3 and ISO/IEC JTC1/SC29/WG11, 8th Meeting, Feb. 1-10, 2012, pp. 1-4, San Jose, CA, US, Doc. No. JCTVC-H0406.

(Continued)

*Primary Examiner* — Edemio Navas, Jr.
(74) *Attorney, Agent, or Firm* — Canon U.S.A., Inc. IP Division

(57) ABSTRACT

Disclosed is a method of decoding sample adaptive offset type index data from a received stream of encoded video data. The method determines an arithmetically encoded first portion of a sample adaptive offset type index value from the stream of video data, and a bypass encoded second portion of the sample adaptive offset type index value when the first portion indicates that the second portion will be present in the stream of video data. The method decodes the sample adaptive offset type index from a combination of the decoded first and second portions of the sample adaptive offset type index values. The sample adaptive offset type index data is used to select one of a plurality of offsets in digital video decoding. Corresponding methods of encoding are also disclosed.

1 Claim, 46 Drawing Sheets

(51) Int. Cl.
*H04N 19/186* (2014.01)
*H04N 19/44* (2014.01)
*H04N 19/117* (2014.01)
*H04N 19/176* (2014.01)
*H04N 19/70* (2014.01)

(52) U.S. Cl.
CPC ........... *H04N 19/186* (2014.11); *H04N 19/44* (2014.11); *H04N 19/463* (2014.11); *H04N 19/70* (2014.11)

(56) References Cited

OTHER PUBLICATIONS

Guillame Laroche, et al., On Additional SAO Band Offset Classifications, Joint Collaborative Team on Video Coding (JCT-VC) of ITU-T SG16 WP3 and ISO/IEC JTC1/SC29/WG11, 7th Meeting, Nov. 21-30, 2011, pp. 1-7, Geneva, CH, Doc. No. JCTVC-G246.

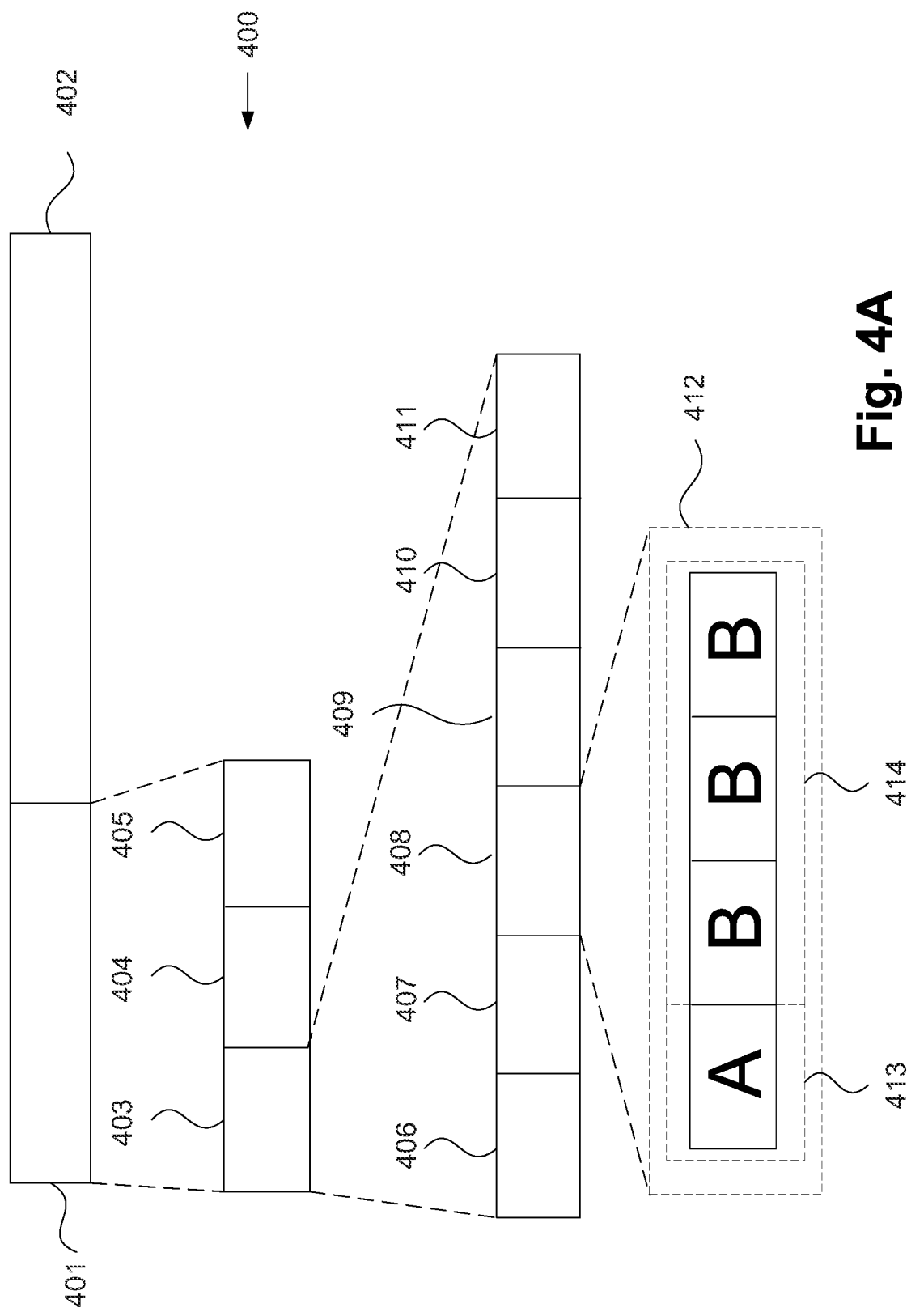

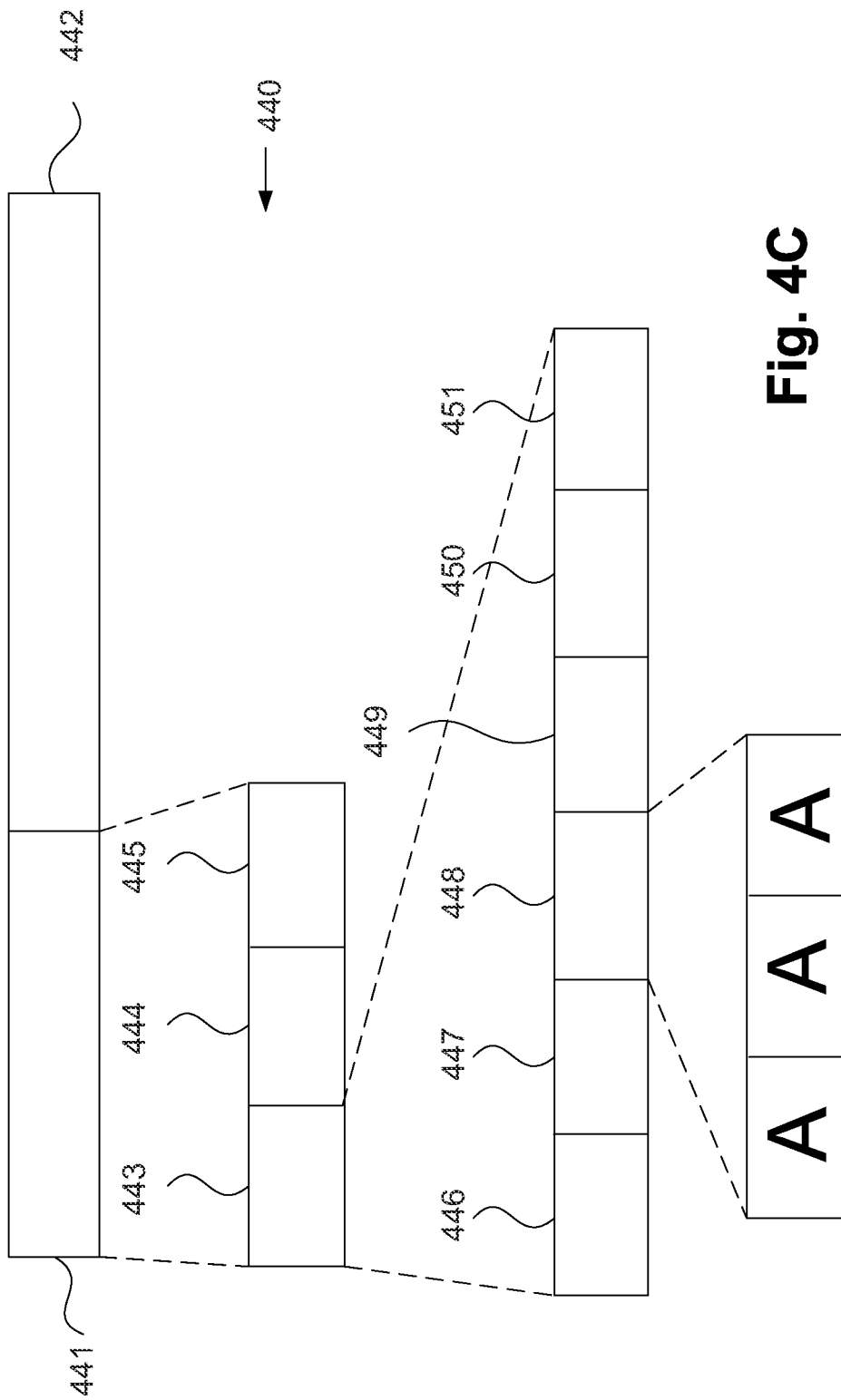

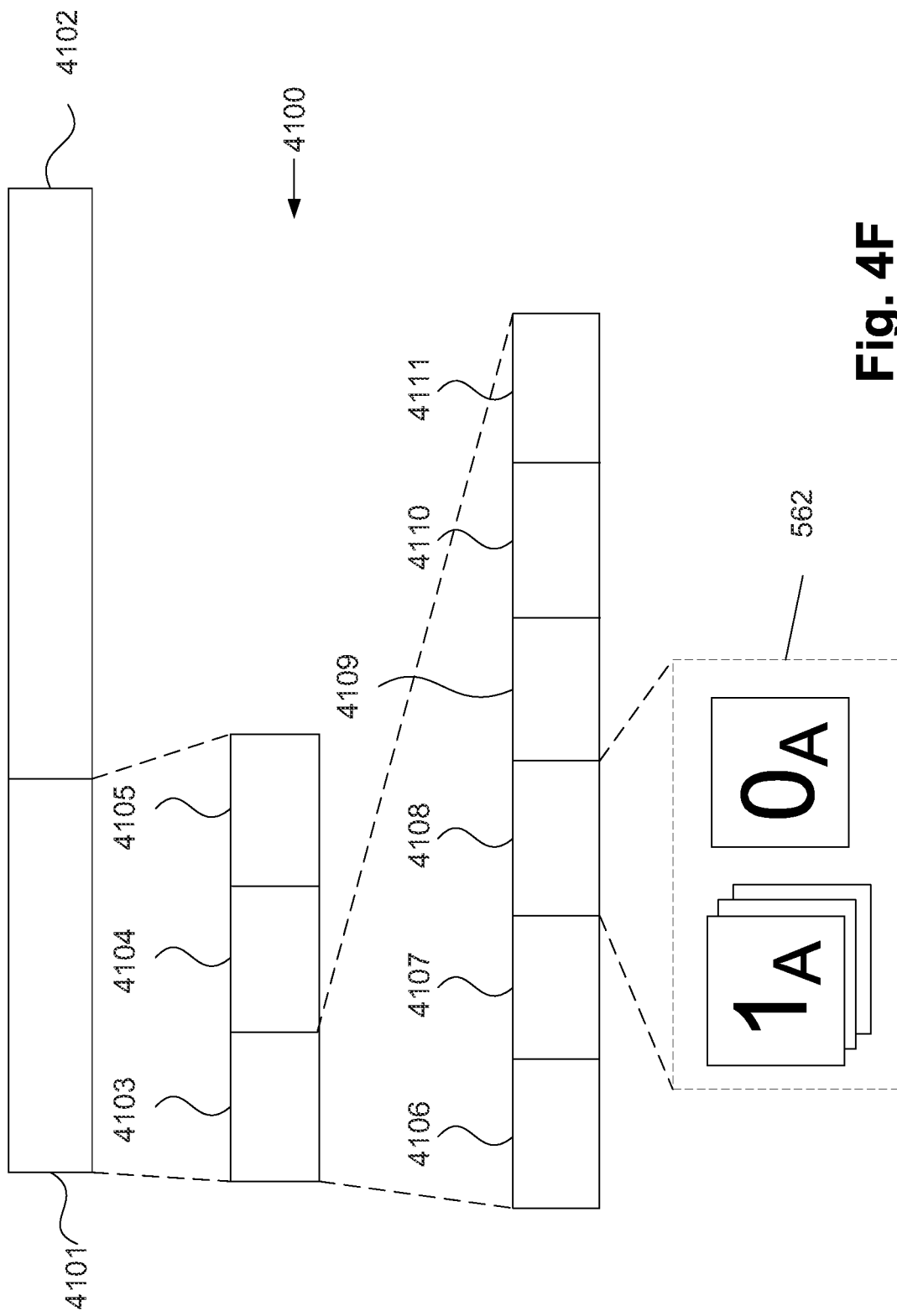

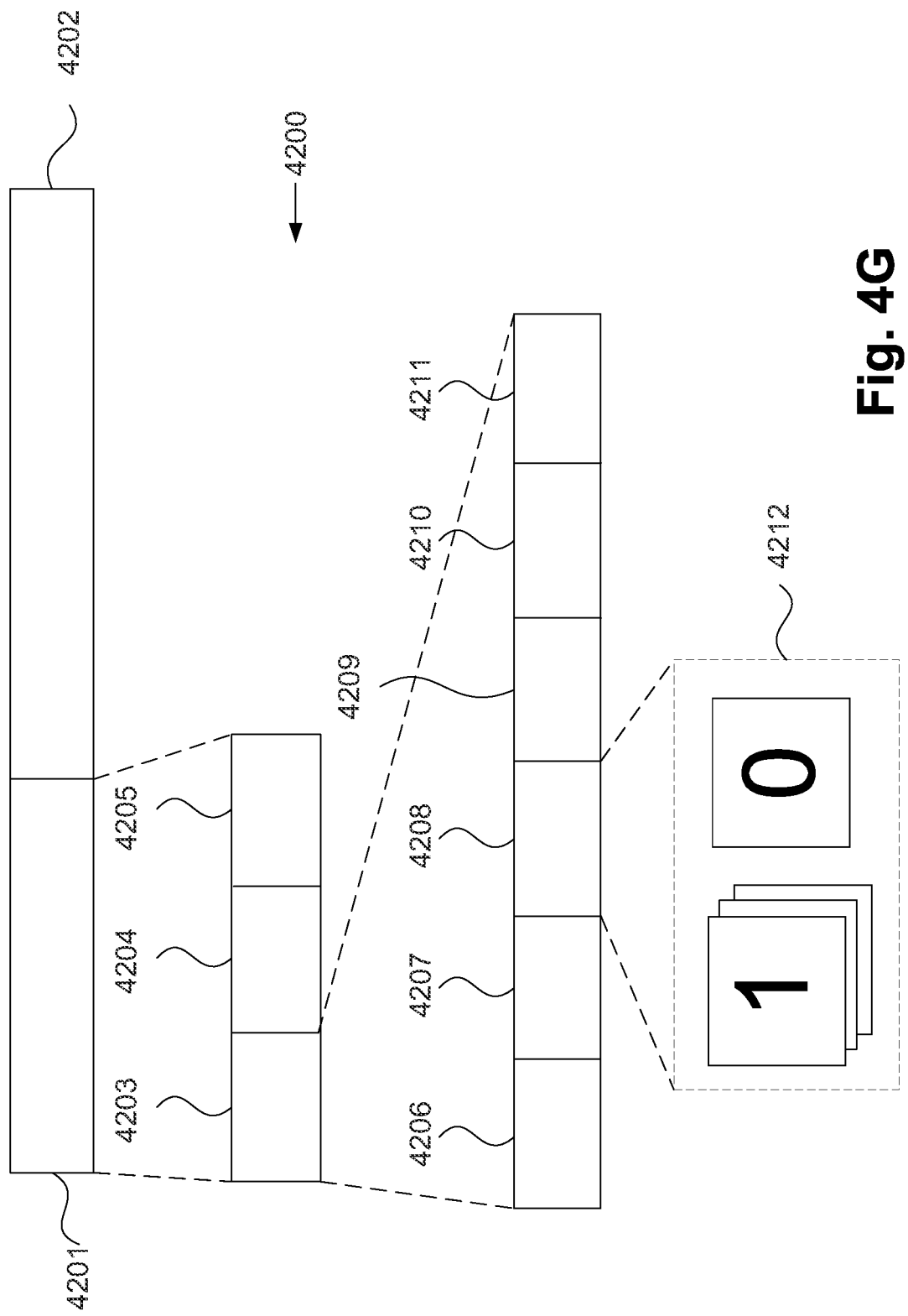

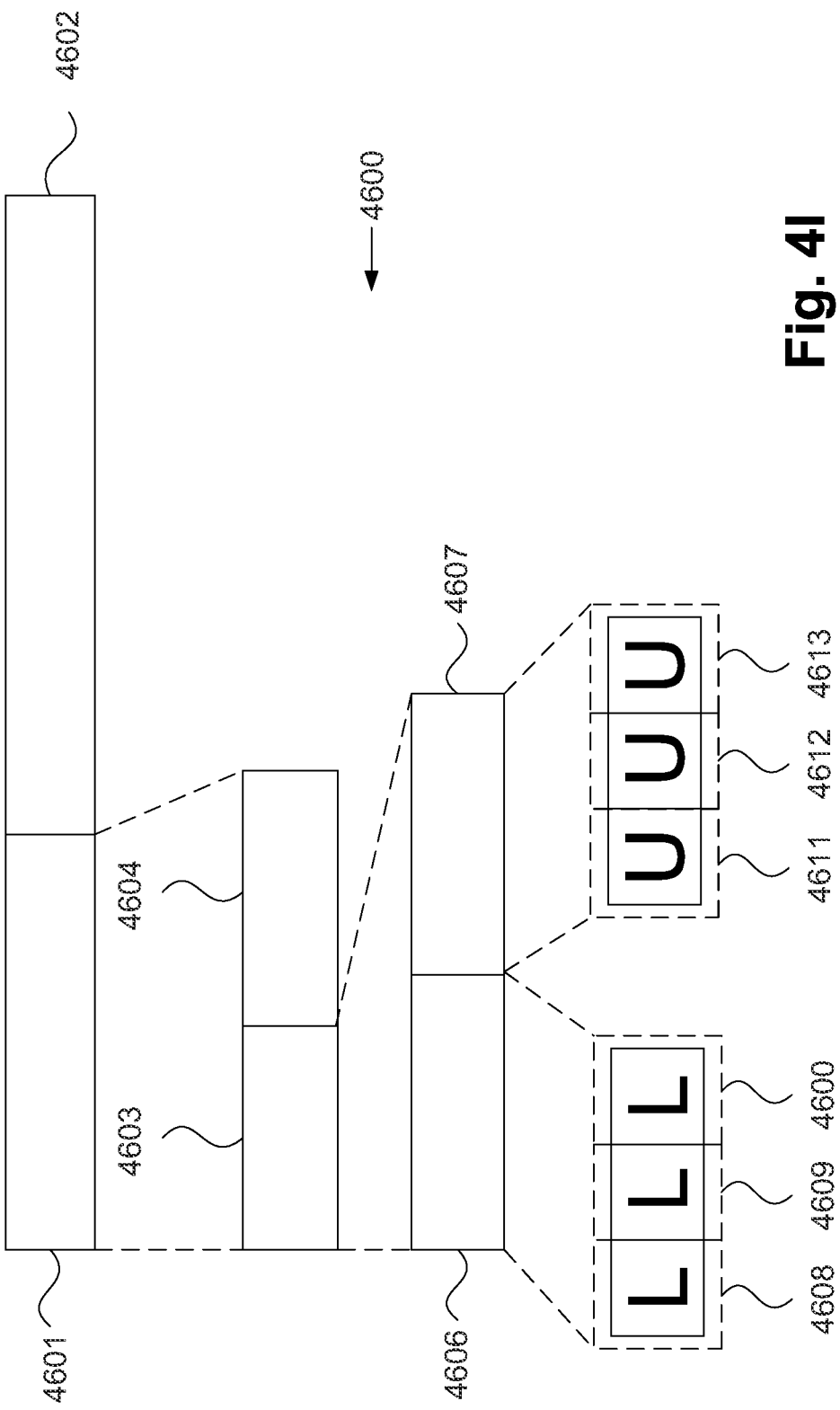

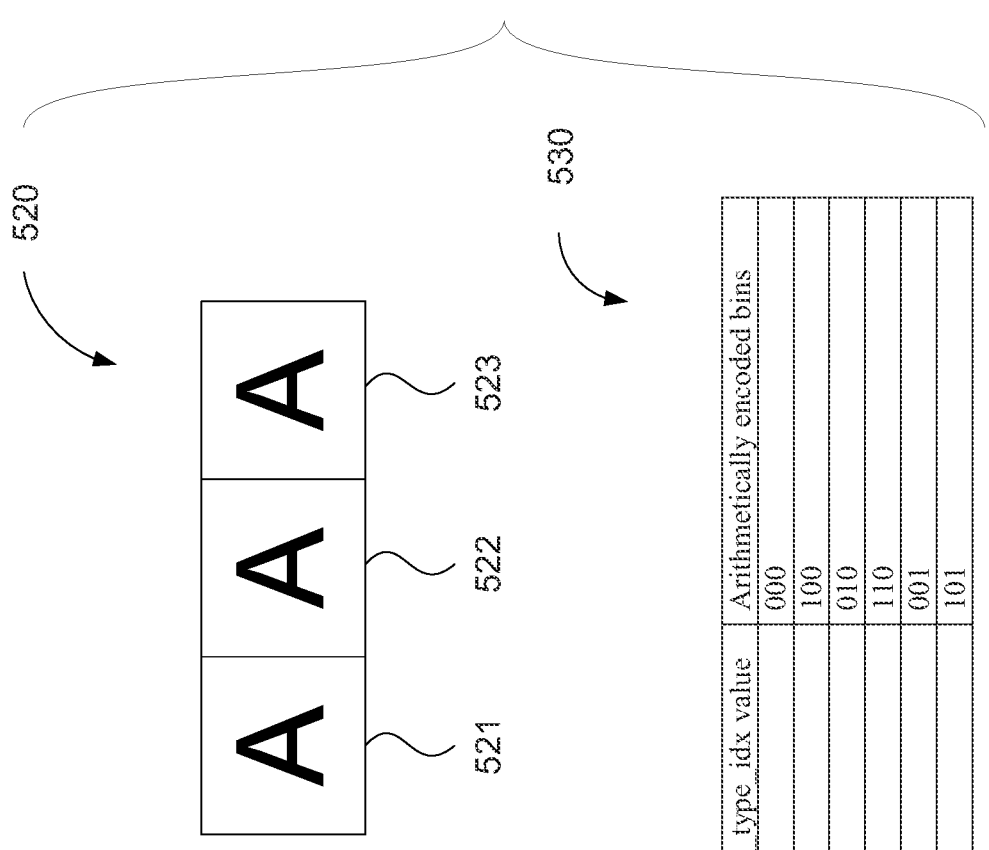

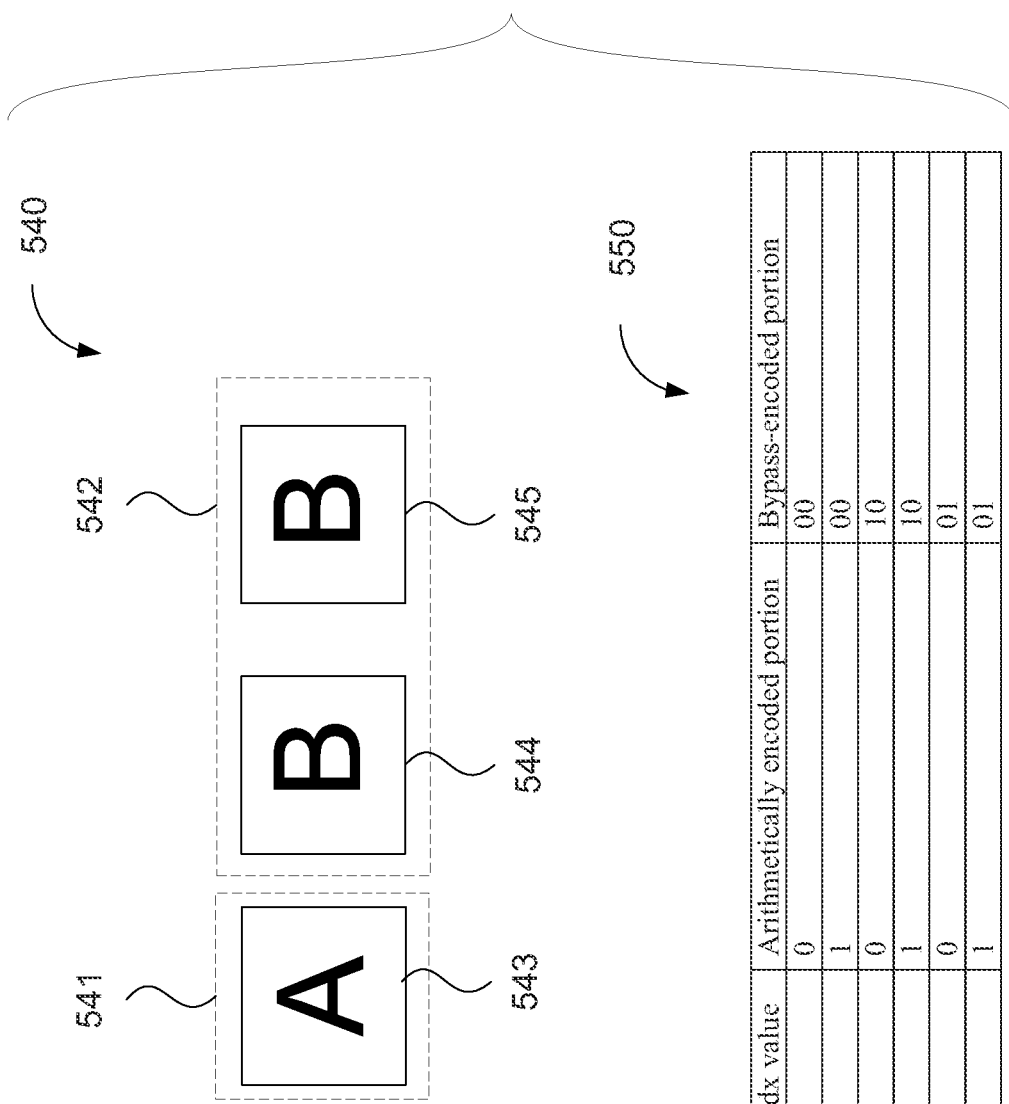

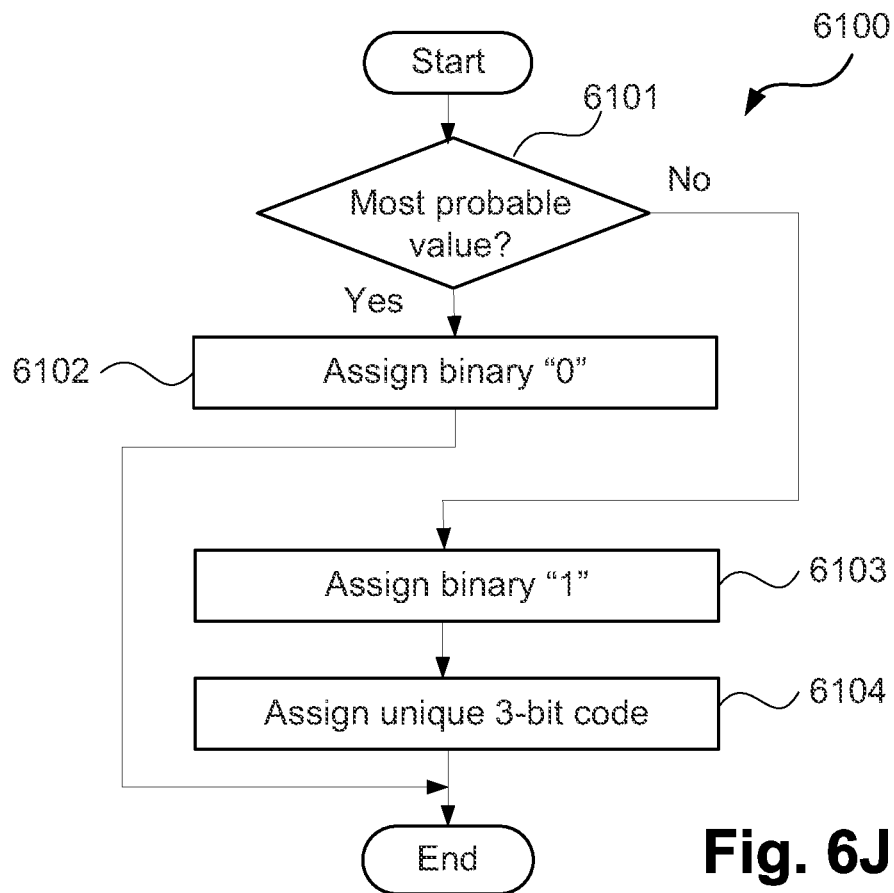
Fig. 6J(1)
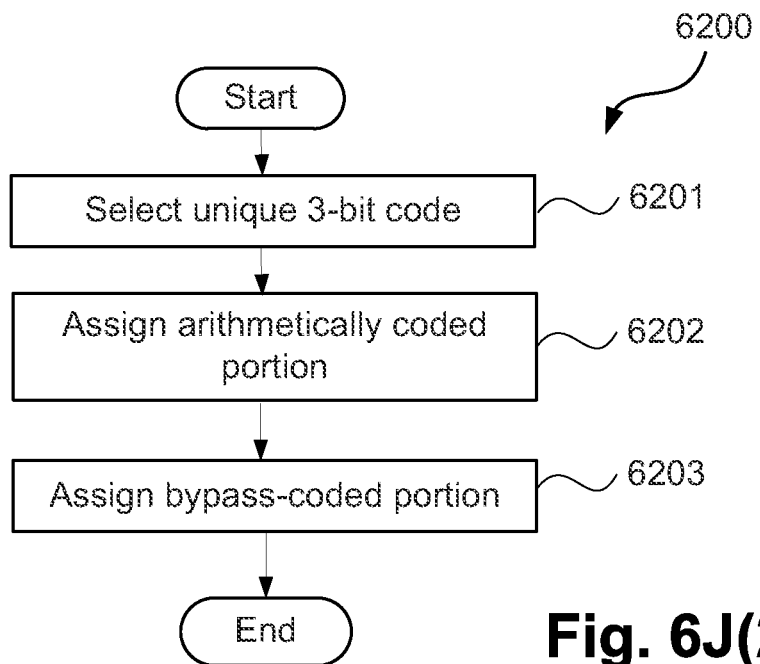
Fig. 6J(2)

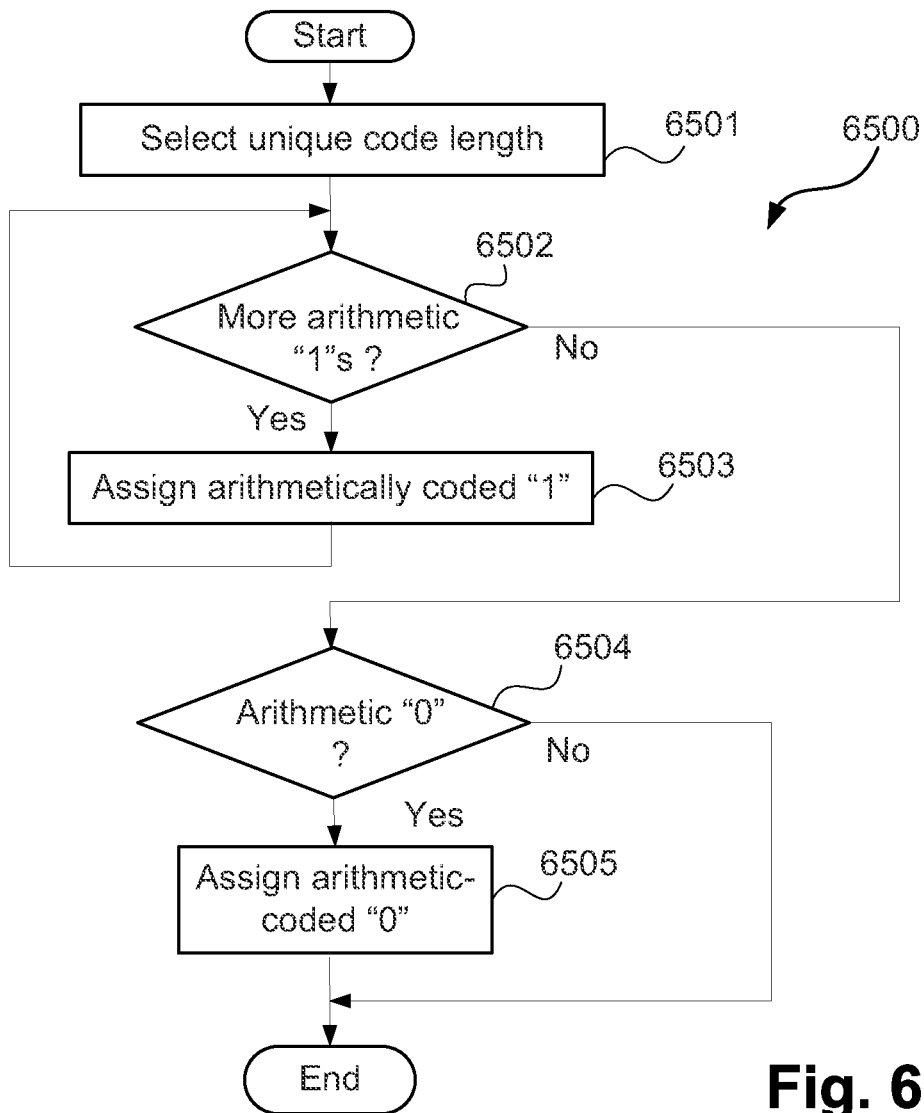
Fig. 6L(1)
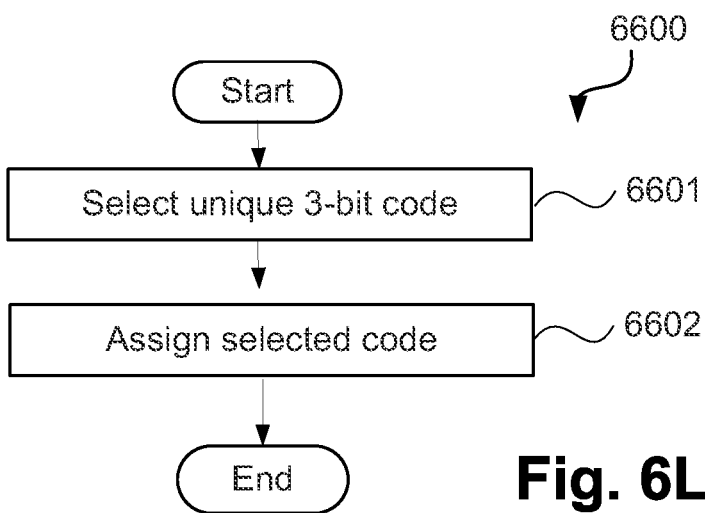
Fig. 6L(2)

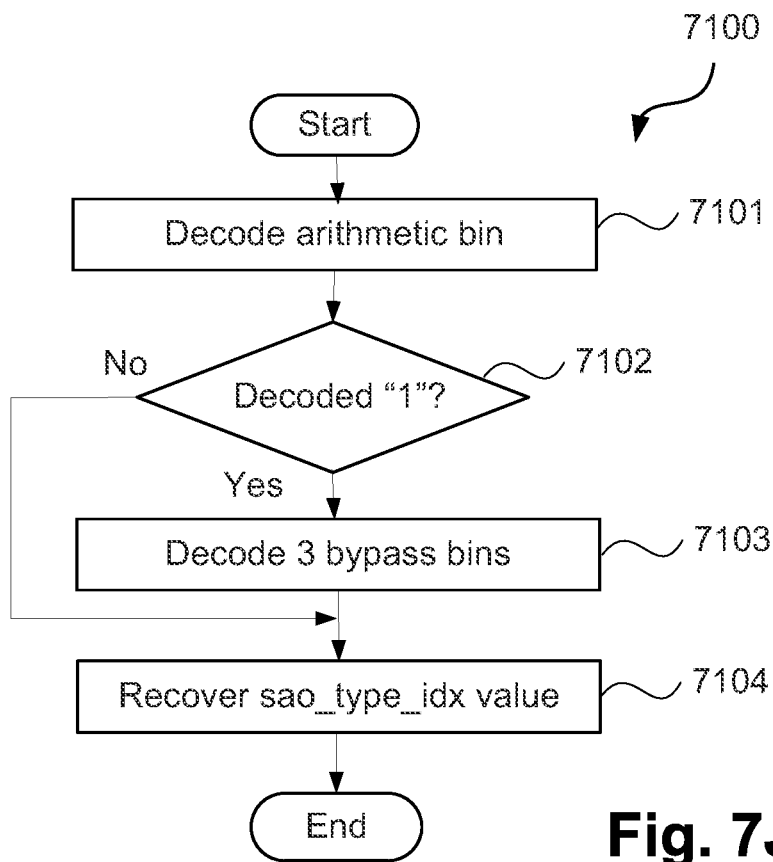
Fig. 7J(1)
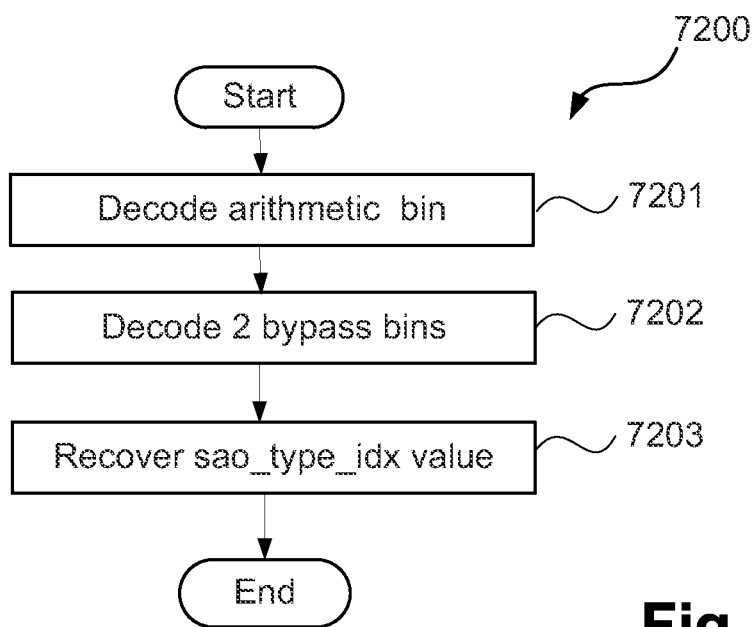
Fig. 7J(2)

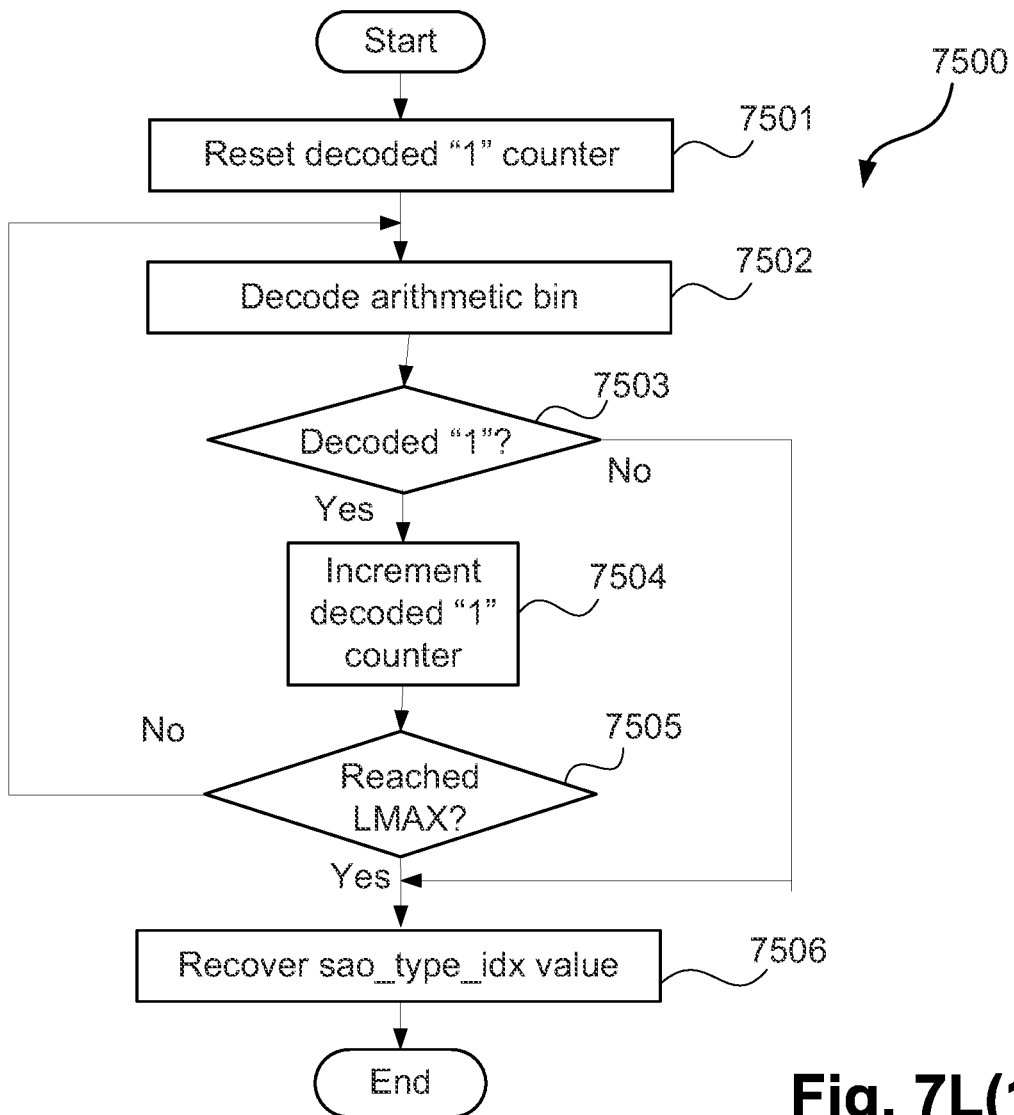
Fig. 7L(1)
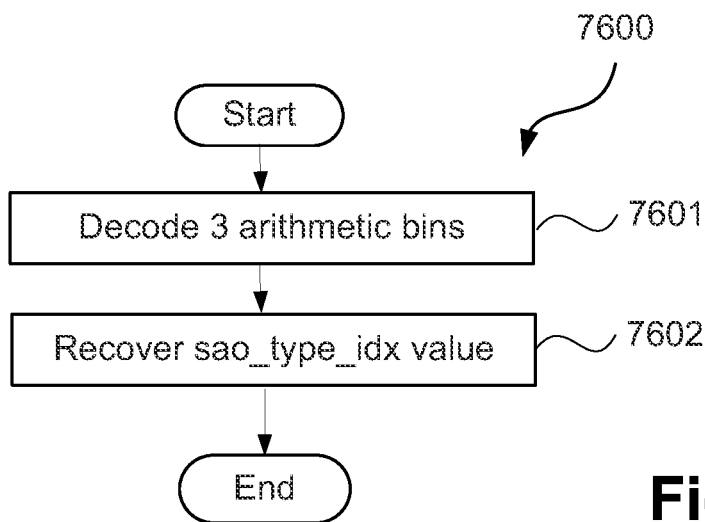
Fig. 7L(2)

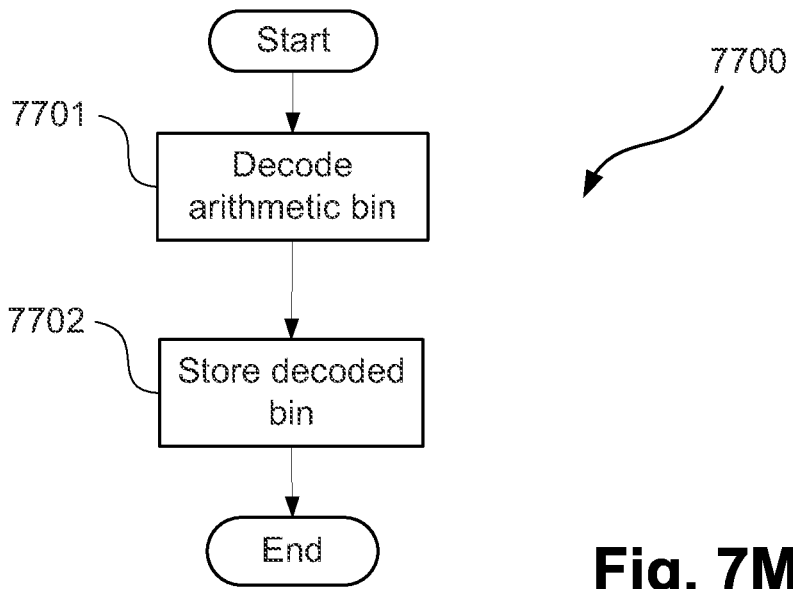
Fig. 7M(1)
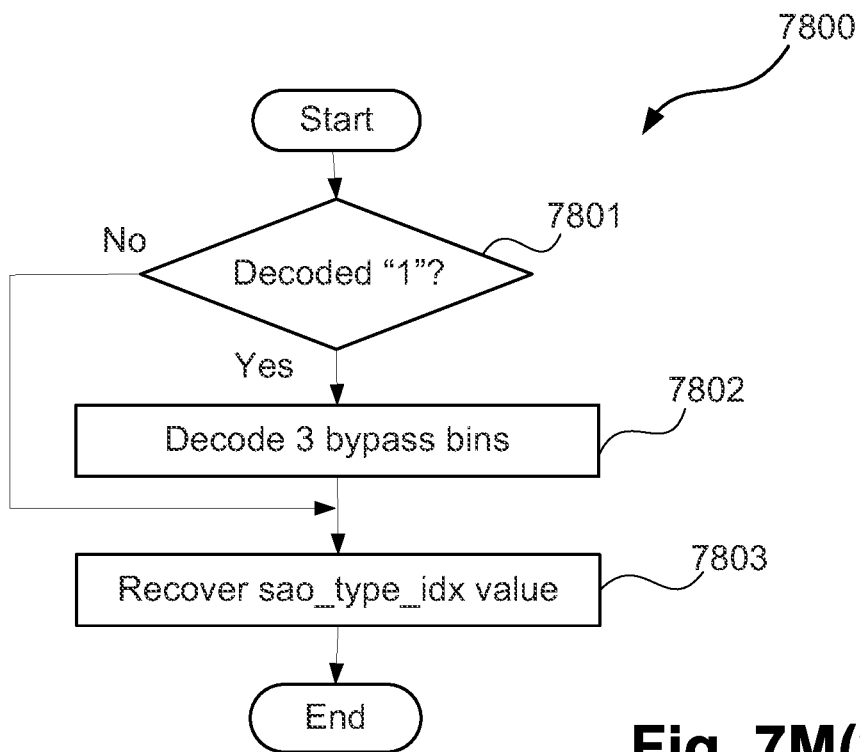
Fig. 7M(2)

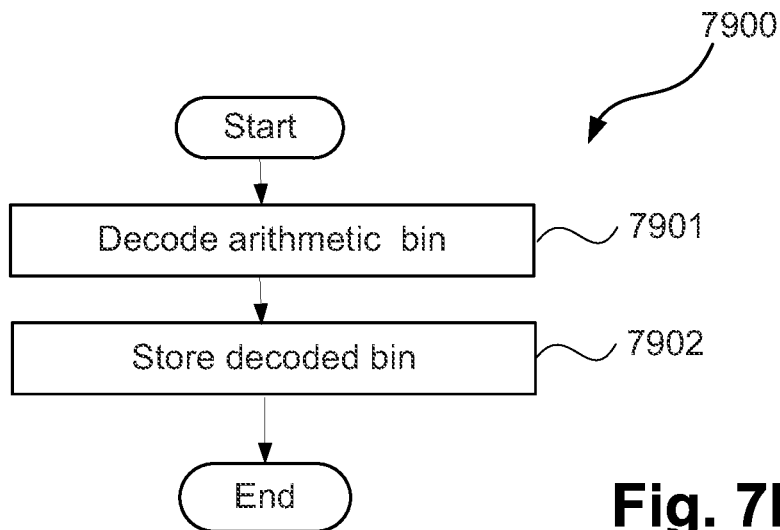
Fig. 7N(1)
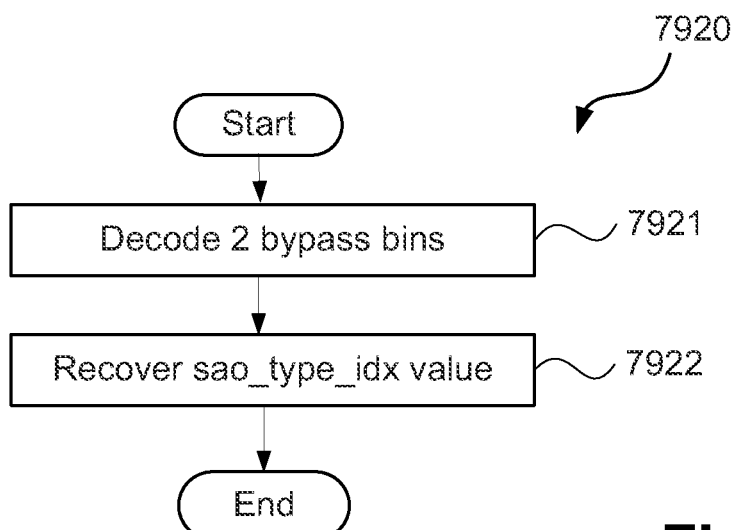
Fig. 7N(2)

METHOD, APPARATUS AND SYSTEM FOR ENCODING AND DECODING A SAMPLE ADAPTIVE OFFSET DATA OF ENCODED VIDEO DATA

CROSS-REFERENCE TO RELATED APPLICATION(S)

This application is a continuation of U.S. patent application Ser. No. 14/411,010, filed on Dec. 23, 2014, which is a National Phase application of PCT Application No. PCT/AU2013/000706, filed on Jun. 28, 2013, all of which claim the benefit under 35 U.S.C. § 119 of the filing date of Australian Patent Application No. 2012203828, filed Jun. 28, 2012, hereby incorporated by reference in its entirety as if fully set forth herein.

TECHNICAL FIELD

The present invention relates generally to digital video signal processing and, in particular, to a method, apparatus and system for encoding and decoding sample adaptive offset data of video data.

BACKGROUND

Many applications for video coding currently exist, including applications for transmission and storage of video data. Many video coding standards have also been developed and others are currently under development. Recent developments in video coding standardisation have led to the formation of a group called the "Joint Collaborative Team on Video Coding" (JCT-VC). The Joint Collaborative Team on Video Coding (JCT-VC) includes members of Study Group 16, Question 6 (SG16/Q6) of the Telecommunication Standardisation Sector (ITU-T) of the International Telecommunication Union (ITU), known as the Video Coding Experts Group (VCEG), and members of the International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG).

The Joint Collaborative Team on Video Coding (JCT-VC) has the goal of producing a new video coding standard to significantly outperform a presently existing video coding standard, known as "H.264/MPEG-4 AVC". The H.264/MPEG-4 AVC standard is itself a large improvement on previous video coding standards, such as MPEG-4 and ITU-T H.263. The new video coding standard under development has been named "high efficiency video coding (HEVC)". The Joint Collaborative Team on Video Coding JCT-VC is also considering implementation challenges arising from technology proposed for high efficiency video coding (HEVC) that create difficulties when scaling implementations of the standard to operate at high resolutions or high frame rates.

The H.264/MPEG-4 AVC video coding standard presents difficulties for achieving high compression efficiency when coding residual coefficients to represent video data.

Video data is formed by a sequence of frames, with each frame having a two-dimensional array of samples. Typically, frames include one luminance (luma) and two chrominance (chroma) channels. Colour information is typically represented using a colour space such as YUV, with Y being the luma channel and UV being two chroma channels. A colour space such as YUV gives the advantage that the majority of frame content is contained in the luma channels and a relatively smaller amount of content stored in the UV channels is sufficient to reconstruct a colour frame. The chroma channels may also be down-sampled to a lower spatial resolution with negligible perceptual quality loss.

A commonly used chroma format known as 4:2:0 results in each chroma channel having half the vertical and horizontal resolution. Each frame is decomposed into an array of largest coding units (LCUs). The largest coding units (LCUs) have a fixed size, with edge dimensions being a power of two and having equal width and height, such as 64 luma samples. A coding tree enables the subdivision of each largest coding unit (LCU) into four coding units (CUs), each having half the width and height of a parent largest coding unit (LCU). Each of the coding units (CUs) may be further subdivided into four equally-sized coding units (CUs). Such a subdivision process may be applied recursively until a smallest coding unit (SCU) size is reached, enabling coding units (CUs) to be defined down to a minimum supported size. The recursive subdivision of a largest coding unit, into a hierarchy of coding units, has a quad-tree structure and is referred to as the coding tree. The subdivision process is encoded in a communications bit-stream as a sequence of flags, coded as bins. Coding units therefore have a square shape.

A set of coding units exist in a coding tree that are not further sub-divided, occupying leaf nodes of the coding tree. Transform trees exist at the coding units. A transform tree may further decompose a coding unit using a quad-tree structure as used for the coding tree. At leaf nodes of the transform tree, residual data is encoded using transform units (TUs). In contrast to the coding tree, the transform tree may subdivide coding units into transform units having a non-square shape. Further, the transform tree structure does not require that transform units (TUs) occupy all of the area provided by the parent coding unit.

Each coding unit at leaf nodes of the coding trees are subdivided into one or more arrays of predicted data samples, each known as a prediction unit (PU). Each prediction unit (PU) contains a prediction of a portion of input video frame data, derived by applying an intra-prediction or an inter-prediction process.

Several methods may be used for coding prediction units (PUs) within a coding unit (CU). A single prediction unit (PU) may occupy an entire area of a coding unit (CU), or the coding unit (CU) may be split into two equal-sized rectangular prediction units (PUs), either horizontally or vertically. Additionally, the coding units (CU) may be split into four equal-sized square prediction units (PUs).

A video encoder compresses the video data into a bitstream by converting the video data into a sequence of syntax elements. A context adaptive binary arithmetic coding (CABAC) scheme is defined within the high efficiency video coding (HEVC) standard under development, using an identical arithmetic coding scheme as to that defined in the MPEG4-AVC/H.264 video compression standard. In the high efficiency video coding (HEVC) standard under development, when context adaptive binary arithmetic coding (CABAC) is in use, each syntax element is expressed as a sequence of bins. Each bin is either bypass-coded or arithmetically coded. Bypass coding is used where the bin is equally likely to be 0 or 1. In this case, there is no further compression achievable. Arithmetic coding is used for bins which have an unequal probability distribution. Each arithmetically coded bin is associated with information known as a 'context'. Contexts contain a likely bin value (the 'valMPS') and a probability state, an integer which maps to an estimated probability of the likely bin value. Creating such a sequence of bins, comprising combinations of bypass-coded bins and arithmetic-coded bins, from a syntax element is known as "binarising" the syntax element.

In a video encoder or video decoder, as separate context information is available for each bin, context selection for bins provides a means to improve coding efficiency. In particular, coding efficiency may be improved by selecting a particular bin such that statistical properties from previous instances of the bin, where the associated context information was used, correlate with statistical properties of a current instance of the bin. Such context selection frequently utilises spatially local information to determine the optimal context.

SUMMARY

According to one aspect of the present disclosure, there is provided a method of decoding sample adaptive offset type index data from a received stream of encoded video data. The method determines an arithmetically encoded first portion of a sample adaptive offset type index value from the stream of video data. The method determines a bypass encoded second portion of the sample adaptive offset type index value when the first portion indicates that the second portion will be present in the stream of video data. The method decodes the sample adaptive offset type index from a combination of the decoded first and second portions of the sample adaptive offset type index values. The sample adaptive offset type index data are used to select one of a plurality of offset types in video decoding.

Desirably the second portion of the sample adaptive offset type index value indicates that band position information is present in the received stream of encoded video data. Alternatively the second portion of the sample adaptive offset type index value indicates that edge offset information is present in the received stream of encoded video data.

Preferably the second portion has a fixed length. The length of the second portion can be determined by the first portion. In a specific implementation, a value of the determined first portion indicates the presence of the second portion. Also, the decoding may comprise decoding a 0 from the first portion to give a sample adaptive offset type index value of 0, and decoding a 1 from the first portion to determine the presence of the second portion having a binary value, said decoding then comprising decoding the binary value to give a sample adaptive offset type index value that is an integer and not 0. For example, when the binary value is in the range 000 to 111, and the decoded sample adaptive offset type index value is in the range 1 to 5.

In another implementation the second portion has a variable length.

In another implementation the first portion comprises multiple bits and a setting of one of those bits indicates the presence of the second portion.

Also disclosed is a method encoding sample adaptive offset type index valueinto a stream of encoded video data. This method comprises determining whether the sample adaptive offset type index value is a most probable value, and binarising a first binary value to an arithmetically coded first portion of a binarised sample adaptive offset type index value. The method also binarises, where the sample adaptive offset type index value is not the most probable value, a second binary value to the arithmetically coded first portion of the binarised sample adaptive offset type index value, and a unique binary code, dependent on the sample adaptive offset type index value, to a bypass encoded second portion of the binarised sample adaptive offset type index value such that the first portion indicates that the second portion will be present in the stream of encoded video data. The method then encodes the binarised sample adaptive offset type index value into the stream of encoded video data.

Other aspects are also disclosed.

BRIEF DESCRIPTION OF THE DRAWINGS

At least one embodiment of the present invention will be described with reference to the drawings, in which:

FIG. 4A is a schematic representation of a largest coding unit (LCU) structure using a binarisation scheme 500 of FIG. 5A;

FIG. 4C is a schematic representation of an LCU structure using a binarisation scheme 520 of FIG. 5B;

FIG. 4F is a schematic representation of an LCU structure using a binarisation scheme 560 of FIG. 5D;

FIG. 4G is a schematic representation of an LCU structure using a binarisation scheme 580 of FIG. 5E;

FIG. 4I is a schematic representation of an LCU structure using a concatenated layout of sao_merge_left_flag and sao_merge_up_flag elements;

FIG. 5B is structure diagram of the binarisation scheme 520;

FIG. 5C is structure diagram of the binarisation scheme 540;

FIG. 6J(1) is a flow diagram of the binarisation process for binarisation scheme 500;

FIG. 6J(2) is a flow diagram of the binarisation process for binarisation scheme 540;

FIG. 6L(1) is a flow diagram of a binarisation process for binarisation scheme 560;

FIG. 6L(2) is a flow diagrams of a binarisation process for binarisation scheme 520;

FIG. 7J(1) is a flow diagram of a decoding and de-binarisation process for the binarisation scheme 500;

FIG. 7J(2) is a flow diagram of a decoding and de-binarisation process for the binarisation scheme 540;

FIG. 7L(1) is a flow diagram of decoding and de-binarisation process for the binarisation scheme 560;

FIG. 7L(2) is a flow diagram of decoding and de-binarisation process for the binarisation scheme 520;

FIGS. 7M(1) and 7M(2) are flow diagrams of decoding and de-binarisation processes for the binarisation scheme 500;

FIGS. 7N(1) and 7N(2) are flow diagrams of the decoding and de-binarisation processes for the binarisation scheme 540.

DETAILED DESCRIPTION INCLUDING BEST MODE

Figure 1:
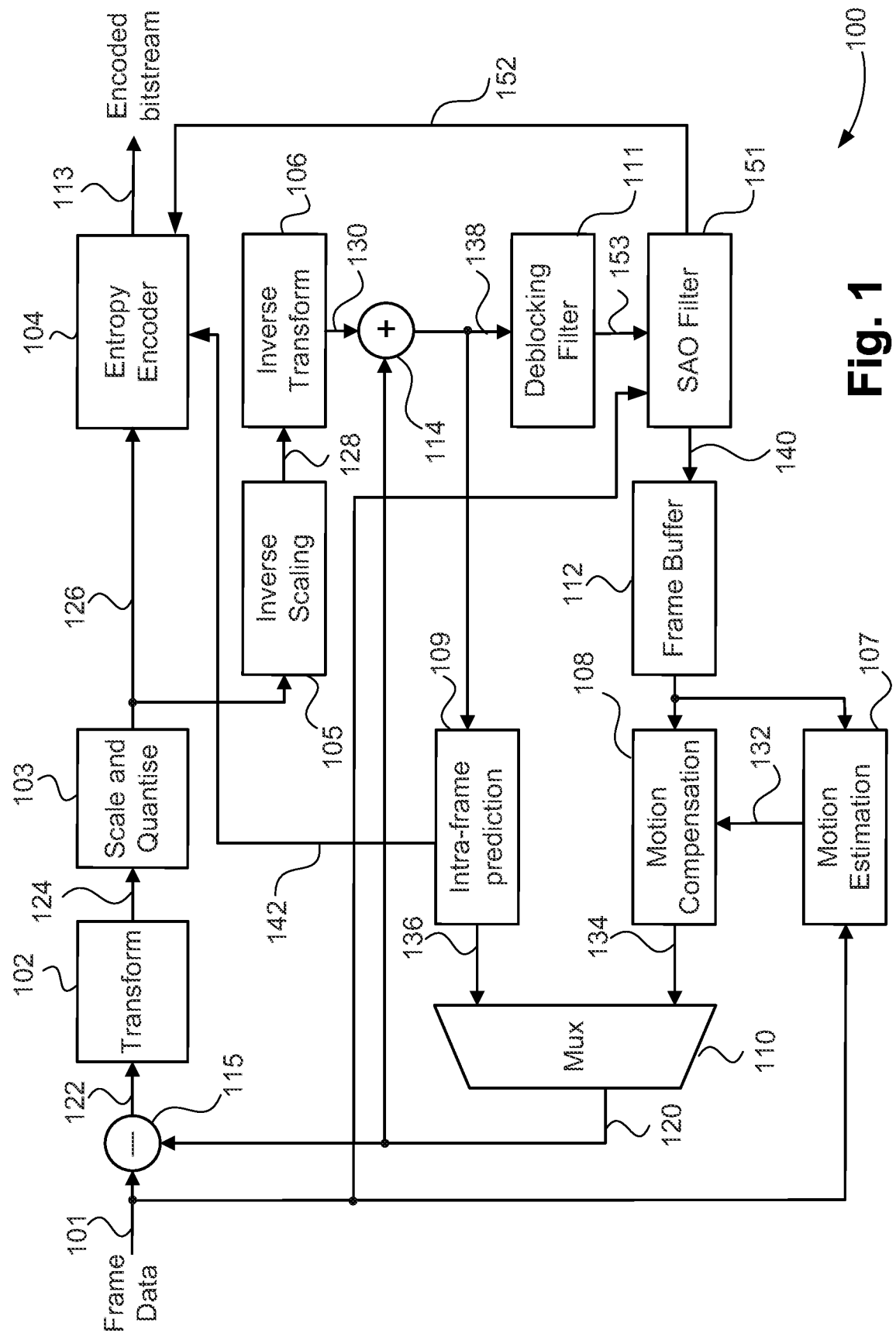
FIG. 1 is a schematic block diagram showing functional modules of a video encoder.

Where reference is made in any one or more of the accompanying drawings to steps and/or features, which have the same reference numerals, those steps and/or features have for the purposes of this description the same function(s) or operation(s), unless the contrary intention appears.

At each transform unit (TU), residual coefficient data may be encoded into a bit-stream. Each "residual coefficient" is a number representing image characteristics within a transform unit in the frequency (DCT) domain and occupying a unique location within the transform unit. A transform unit is a block of residual data samples that may be transformed between the spatial and the frequency domains. In the frequency domain, the transform unit (TU) encodes the residual data samples as residual coefficient data. Side dimensions of transform units are sized in powers of two (2), ranging from 4 samples to 32 samples for a "Luma" channel, and 2 to 16 samples for a "Chroma" channel. The leaf nodes of the transform unit (TU) tree may contain either a transform unit (TU) or nothing at all, in the case where no residual coefficient data is required.

As the spatial representation of the transform unit is a two-dimensional array of residual data samples, as described in detail below, a frequency domain representation resulting from a transform, such as a modified discrete cosine transform (DCT), is also a two-dimensional array of residual coefficients. The spectral characteristics of typical sample data within a transform unit (TU) are such that the frequency domain representation is more compact than the spatial representation. Further, the predominance of lower-frequency spectral information typical in a transform unit (TU) results in a clustering of larger-valued residual coefficients towards the upper-left of the transform unit (TU), where low-frequency residual coefficients are represented.

Modified discrete cosine transforms (DCTs) or modified discrete sine transforms (DSTs) may be used to implement the residual transform. Implementations of the residual transform are configured to support each required transform unit (TU) size. In a video encoder, the residual coefficients from the residual transform are scaled and quantised. The scaling and quantisation reduces the magnitude of the residual coefficients, reducing the size of the data coded into the bit-stream at the cost of reducing the image quality.

After performing the residual transform, a quantization process is performed. The purpose of the quantization process is to achieve a higher compression ratio by reducing the precision of the magnitude of the residual coefficients. This reduction in magnitude precision is a lossy process and thus has an impact on visual quality. The level of precision reduction is controlled by a quantization parameter (QP). The higher the value of the parameter the more visual quality is affected.

After quantization, in some video coding arrangements, a sample adaptive offset (SAO) filtering is applied to the frame data and SAO offset data collected by the encoder. SAO data contains information about differences in pixel value distribution between the original image and image reconstructed after quantization. SAO data is then binarized, encoded and transferred to decoder. The decoder may use SAO data to improve visual and objective quality of the reconstructed frame.

The high efficiency video coding (HEVC) standard under development is seeking to achieve a high efficiency compression of video data. Estimation and statistical data analysis may be used to achieve high efficiency compression of video data. The high efficiency video coding (HEVC) standard under development is seeking to encode or decode video data at high bit-rates. The context adaptive binary arithmetic coding (CABAC) scheme employed in the high efficiency video coding (HEVC) standard under development supports an 'equal probability' mode of operation referred to as 'bypass coding'. In this mode, a bin is not associated with a context from the context model, and so there is no context model update step. In such a mode, multiple adjacent bins may be read from a bit-stream in parallel, provided each bin is bypass coded which increases throughput. For example, hardware implementations may write/read groups of adjacent bypass coded data in parallel to increase the throughput of encoding/decoding the bit-stream.

One aspect of binarisation is selection of contexts to use for coding syntax elements corresponding to individual flags. One flag may use more than one context. Determining which context should be used for a particular instance of a flag depends on other already available information and is known as 'context modelling'. Context modelling is a process whereby a context that most accurately represents the statistical properties of the present instance of the flag is selected. For example, frequently the value of a flag is influenced by the values of neighbouring instances of the same flag, in which case a context can be selected based on the values of neighbouring instances of the flag. Due to the majority of frame information being contained in the luma channel, context modelling frequently uses separate contexts for the luma channel versus the chroma channels. However, contexts are typically shared between chroma channels, as the statistical properties of the two chroma channels are relatively similar.

The high efficiency video coding (HEVC) standard under development is seeking to achieve a high efficiency compression of video data. Estimation and statistical data analysis may be used to achieve high efficiency compression of video data. The high efficiency video coding (HEVC) standard under development is seeking to encode or decode video data at high bit-rates. The context adaptive binary arithmetic coding (CABAC) scheme employed in the high efficiency video coding (HEVC) standard under development supports an 'equal probability' mode of operation referred to as 'bypass coding'. In this mode, a bin is not associated with a context from the context model, and so there is no context model update step. In such a mode, multiple adjacent bins may be read from a bit-stream in parallel, provided each bin is bypass coded which increases throughput. For example, hardware implementations may write/read groups of adjacent bypass coded data in parallel to increase the throughput of encoding/decoding the bitstream.

Figure 2:
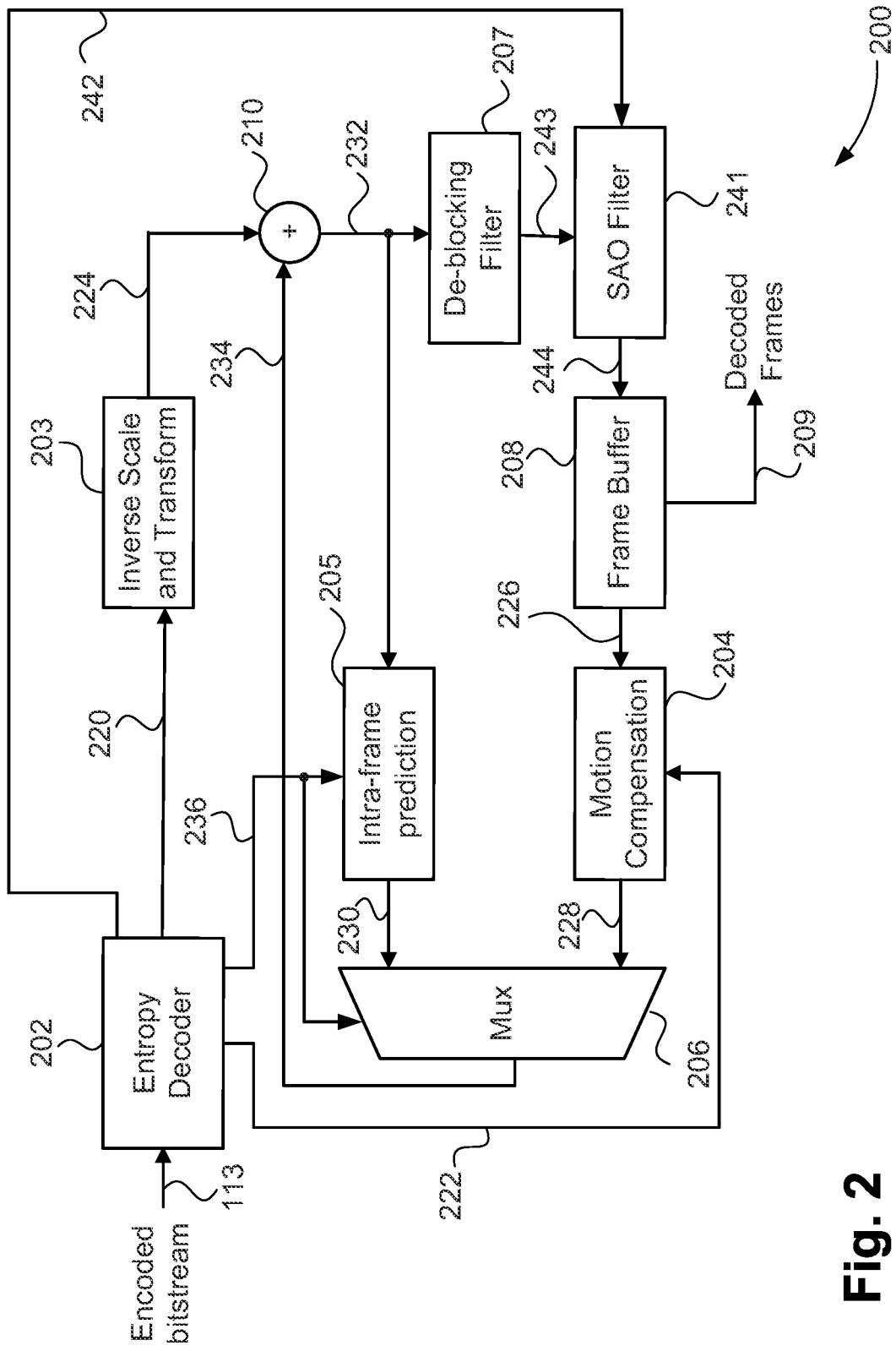
FIG. 2 is a schematic block diagram showing functional modules of a video decoder.

FIG. 1 is a schematic block diagram showing functional modules of a video encoder 100 according to the present disclosure. FIG. 2 is a schematic block diagram showing functional modules of a corresponding video decoder 200 according to the present disclosure. The video encoder 100 and video decoder 200 may be implemented using a general-purpose computer system 300, as shown in FIGS. 3A and 3B where the various functional modules may be implemented by dedicated hardware within the computer system 300, by software executable within the computer system 300, or alternatively by a combination of dedicated hardware and software executable within the computer system 300.

Figure 3A:
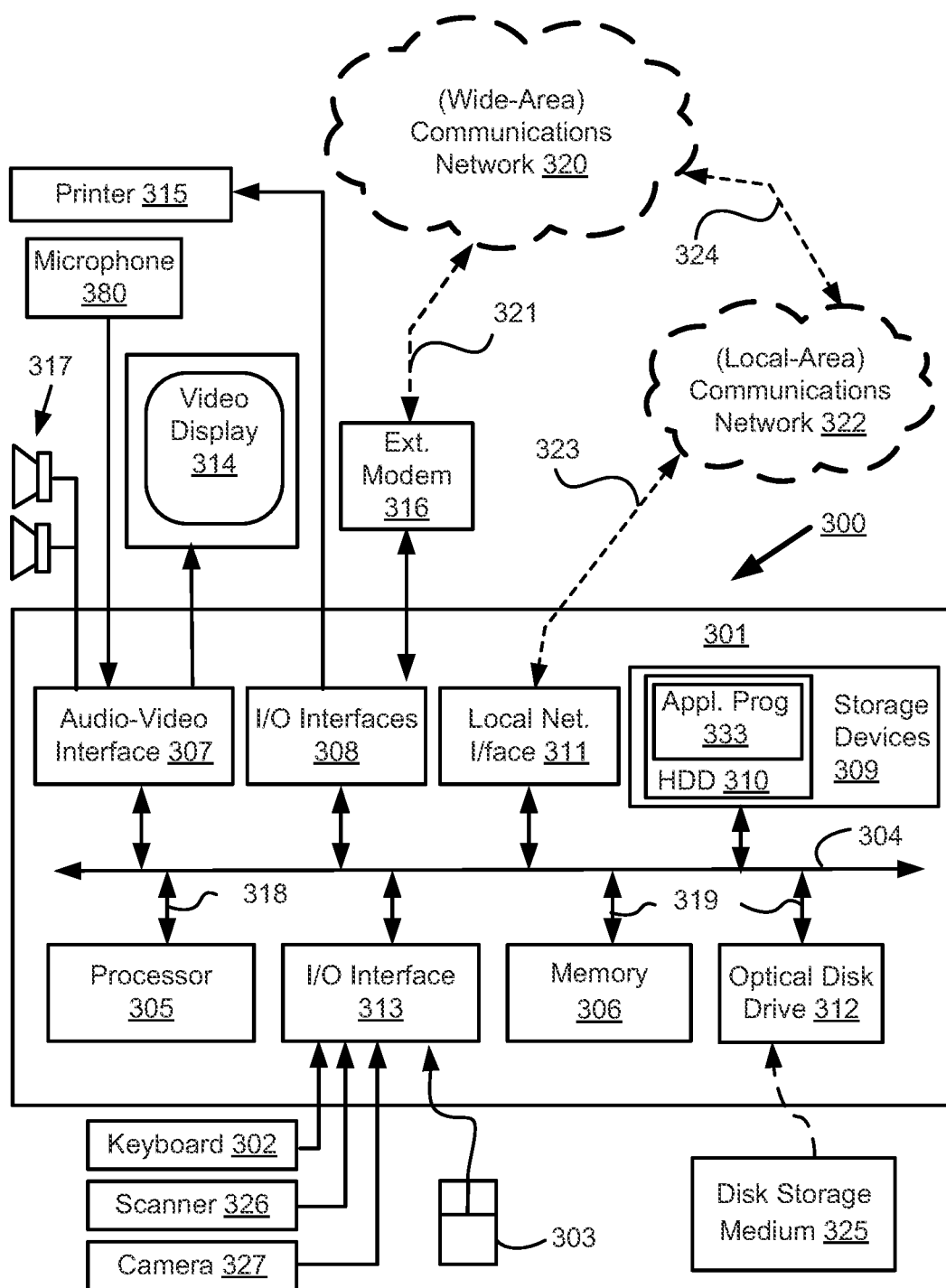
FIGS. 3A and 3B form a schematic block diagram of a general purpose computer system upon which the encoder and decoder of FIGS. 1 and 2, respectively, may be practiced.
Figure 3B:
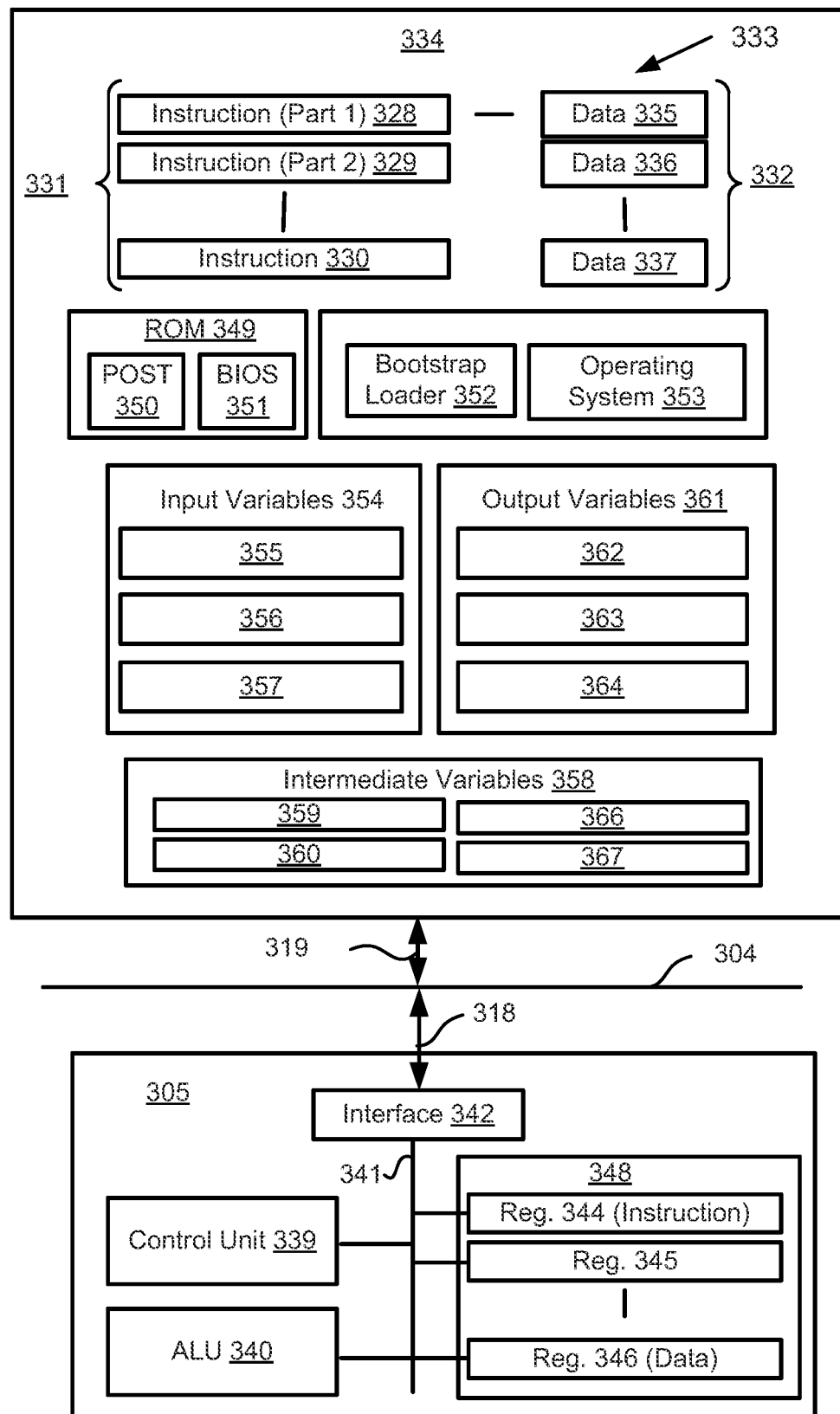

As seen in FIG. 3A, the computer system 300 includes: a computer module 301; input devices such as a keyboard 302, a mouse pointer device 303, a scanner 326, a camera 327, and a microphone 380; and output devices including a printer 315, a display device 314 and loudspeakers 317. An external Modulator-Demodulator (Modem) transceiver device 316 may be used by the computer module 301 for communicating to and from a communications network 320 via a connection 321. The communications network 320 may be a wide-area network (WAN), such as the Internet, a cellular telecommunications network, or a private WAN. Where the connection 321 is a telephone line, the modem 316 may be a traditional "dial-up" modem. Alternatively, where the connection 321 is a high capacity (e.g., cable) connection, the modem 316 may be a broadband modem. A wireless modem may also be used for wireless connection to the communications network 320.

The computer module 301 typically includes at least one processor unit 305, and a memory unit 306. For example, the memory unit 306 may have semiconductor random access memory (RAM) and semiconductor read only memory (ROM). The computer module 301 also includes an number of input/output (I/O) interfaces including: an audio-video interface 307 that couples to the video display 314, loudspeakers 317 and microphone 380; an I/O interface 313 that couples to the keyboard 302, mouse 303, scanner 326, camera 327 and optionally a joystick or other human interface device (not illustrated); and an interface 308 for the external modem 316 and printer 315. In some implementations, the modem 316 may be incorporated within the computer module 301, for example within the interface 308. The computer module 301 also has a local network interface 311, which permits coupling of the computer system 300 via a connection 323 to a local-area communications network 322, known as a Local Area Network (LAN). As illustrated in FIG. 3A, the local communications network 322 may also couple to the wide network 320 via a connection 324, which would typically include a so-called "firewall" device or device of similar functionality. The local network interface 311 may comprise an Ethernet™ circuit card, a Bluetooth™ wireless arrangement or an IEEE 802.11 wireless arrangement; however, numerous other types of interfaces may be practiced for the interface 311.

The I/O interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the system 300. Typically, any of the HDD 310, optical drive 312, networks 320 and 322, or camera 327 may for a source for video data to be encoded, or, with the display 314, a destination for decoded video data to be stored or reproduced.

The components 305 to 313 of the computer module 301 typically communicate via an interconnected bus 304 and in a manner that results in a conventional mode of operation of the computer system 300 known to those in the relevant art. For example, the processor 305 is coupled to the system bus 304 using a connection 318. Likewise, the memory 306 and optical disk drive 312 are coupled to the system bus 304 by connections 319. Examples of computers on which the described arrangements can be practised include IBM-PC's and compatibles, Sun SPARCstations, Apple Mac™ or alike computer systems.

Where appropriate or desired, the encoder 100 and the decoder 200, as well as methods described below, may be implemented using the computer system 300 wherein the encoder 100, the decoder 200 and the processes, to be described, may be implemented as one or more software application programs 333 executable within the computer system 300. In particular, the encoder 100, the decoder 200 and the steps of the described methods may be effected by instructions 331 (see FIG. 3B) in the software 333 that are carried out within the computer system 300. The software instructions 331 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 300 from the computer readable medium, and then executed by the computer system 300. A computer readable medium having such software or computer program recorded on the computer readable medium is a computer program product. The use of the computer program product in the computer system 300 preferably effects an advantageous apparatus for implementing the encoder 100, the decoder 200 and the described methods.

The software 333 is typically stored in the HDD 310 or the memory 306. The software is loaded into the computer system 300 from a computer readable medium, and executed by the computer system 300. Thus, for example, the software 333 may be stored on an optically readable disk storage medium (e.g., CD-ROM) 325 that is read by the optical disk drive 312.

In some instances, the application programs 333 may be supplied to the user encoded on one or more CD-ROMs 325 and read via the corresponding drive 312, or alternatively may be read by the user from the networks 320 or 322. Still further, the software can also be loaded into the computer system 300 from other computer readable media. Computer readable storage media refers to any non-transitory tangible storage medium that provides recorded instructions and/or data to the computer system 300 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 301. Examples of transitory or non-tangible computer readable transmission media that may also participate in the provision of the software, application programs, instructions and/or video data or encoded video data to the computer module 301 include radio or infra-red transmission channels as well as a network connection to another computer or networked device, and the Internet or Intranets including e-mail transmissions and information recorded on Websites and the like.

The second part of the application programs 333 and the corresponding code modules mentioned above may be executed to implement one or more graphical user interfaces (GUIs) to be rendered or otherwise represented upon the display 314. Through manipulation of typically the keyboard 302 and the mouse 303, a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

FIG. 3B is a detailed schematic block diagram of the processor 305 and a "memory" 334. The memory 334 represents a logical aggregation of all the memory modules (including the HDD 309 and semiconductor memory 306) that can be accessed by the computer module 301 in FIG. 3A.

When the computer module 301 is initially powered up, a power-on self-test (POST) program 350 executes. The POST program 350 is typically stored in a ROM 349 of the semiconductor memory 306 of FIG. 3A. A hardware device such as the ROM 349 storing software is sometimes referred to as firmware. The POST program 350 examines hardware within the computer module 301 to ensure proper functioning and typically checks the processor 305, the memory 334 (309, 306), and a basic input-output systems software (BIOS)module 351, also typically stored in the ROM 349, for correct operation. Once the POST program 350 has run successfully, the BIOS 351 activates the hard disk drive 310 of FIG. 3A. Activation of the hard disk drive 310 causes a bootstrap loader program 352 that is resident on the hard disk drive 310 to execute via the processor 305. This loads an operating system 353 into the RAM memory 306, upon which the operating system 353 commences operation. The operating system 353 is a system level application, executable by the processor 305, to fulfil various high level functions, including processor management, memory management, device management, storage management, software application interface, and generic user interface.

The operating system 353 manages the memory 334 (309, 306) to ensure that each process or application running on the computer module 301 has sufficient memory in which to execute without colliding with memory allocated to another process. Furthermore, the different types of memory available in the system 300 of FIG. 3A must be used properly so that each process can run effectively. Accordingly, the aggregated memory 334 is not intended to illustrate how particular segments of memory are allocated (unless otherwise stated), but rather to provide a general view of the memory accessible by the computer system 300 and how such is used.

As shown in FIG. 3B, the processor 305 includes a number of functional modules including a control unit 339, an arithmetic logic unit (ALU) 340, and a local or internal memory 348, sometimes called a cache memory. The cache memory 348 typically includes a number of storage registers 344-346 in a register section. One or more internal busses 341 functionally interconnect these functional modules. The processor 305 typically also has one or more interfaces 342 for communicating with external devices via the system bus 304, using a connection 318. The memory 334 is coupled to the bus 304 using a connection 319.

The application program 333 includes a sequence of instructions 331 that may include conditional branch and loop instructions. The program 333 may also include data 332 which is used in execution of the program 333. The instructions 331 and the data 332 are stored in memory locations 328, 329, 330 and 335, 336, 337, respectively. Depending upon the relative size of the instructions 331 and the memory locations 328-330, a particular instruction may be stored in a single memory location as depicted by the instruction shown in the memory location 330. Alternately, an instruction may be segmented into a number of parts each of which is stored in a separate memory location, as depicted by the instruction segments shown in the memory locations 328 and 329.

In general, the processor 305 is given a set of instructions which are executed therein. The processor 305 waits for a subsequent input, to which the processor 305 reacts to by executing another set of instructions. Each input may be provided from one or more of a number of sources, including data generated by one or more of the input devices 302, 303, data received from an external source across one of the networks 320, 302, data retrieved from one of the storage devices 306, 309 or data retrieved from a storage medium 325 inserted into the corresponding reader 312, all depicted in FIG. 3A. The execution of a set of the instructions may in some cases result in output of data. Execution may also involve storing data or variables to the memory 334.

The encoder 100, the decoder 200 and the described methods use input variables 354, which are stored in the memory 334 in corresponding memory locations 355, 356, 357. The encoder 100, the decoder 200 and the described methods produce output variables 361, which are stored in the memory 334 in corresponding memory locations 362, 363, 364. Intermediate variables 358 may be stored in memory locations 359, 360, 366 and 367.

Referring to the processor 305 of FIG. 3B, the registers 344, 345, 346, the arithmetic logic unit (ALU) 340, and the control unit 339 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328, 329, 330;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Each step or sub-process in the processes to be described is associated with one or more segments of the program 333 and is typically performed by the register section 344, 345, 347, the ALU 340, and the control unit 339 in the processor 305 working together to perform the fetch, decode, and execute cycles for every instruction in the instruction set for the noted segments of the program 333.

The encoder 100, the decoder 200 and the described methods may alternatively be implemented in dedicated hardware such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories.

As described above, the video encoder 100 may be implemented as one or more software code modules of the software application program 333 resident on the hard disk drive 310 and being controlled in its execution by the processor 305. In particular the video encoder 100 comprises modules 102 to 112, 114, 115 and 151 which may each be implemented as one or more software code modules of the software application program 333.

Although the video encoder 100 of FIG. 1 is an example of a high efficiency video coding (HEVC) video decoding pipeline, processing stages performed by the modules 102 to 112, 114, 115 and 151 are common to other video codecs such as VC-1 or H.264/MPEG-4 AVC. The video encoder 100 receives unencoded frame data 101 as a series of frames including luminance and chrominance samples. The video encoder 100 divides each frame of the frame data 101 into hierarchical sets of coding units (CUs) which may be represented, for example, as a coding unit (CU) tree.

The video encoder 100 operates by outputting, from a multiplexer module 110, an array of predicted data samples known as a prediction unit (PU) 120. A difference module 115 outputs the difference between the prediction unit (PU) 120 and a corresponding array of data samples received from the frame data 101, the difference being known as residual data samples 122.

The residual data samples 122 from the difference module 115 are received by a transform module 102, which converts the difference from a spatial representation to a frequency domain representation to create transform coefficients 124 for each transform unit (TU) in the transform tree. For the high efficiency video coding (HEVC) standard under development, the conversion to the frequency domain representation is implemented using a modified discrete cosine transform (DCT), in which a traditional DCT is modified to be implemented using shifts and additions. The transform coefficients 124 are then input to a scale and quantise module 103 and are scaled and quantised to produce residual coefficients 126. The scale and quantisation process results in a loss of precision.

The residual coefficients 126 are taken as input to an inverse scaling module 105 which reverses the scaling performed by the scale and quantise module 103 to produce rescaled transform coefficients 128, which are rescaled versions of the residual coefficients 126. The residual coefficients 126 are also taken as input to an entropy encoder module 104 which encodes the residual coefficients in an encoded bit-stream 113. Due to the loss of precision resulting from the scale and quantise module 103, the rescaled transform coefficients 128 are not identical to the original transform coefficients 124. The rescaled transform coefficients 128 from the inverse scaling module 105 are then output to an inverse transform module 106. The inverse transform module 106 performs an inverse transform from the frequency domain to the spatial domain to produce a spatial-domain representation 130 of the rescaled transform coefficients 128 identical to a spatial domain representation that is produced at a decoder.

A motion estimation module 107 produces motion vectors 132 by comparing the frame data 101 with previous frame data stored in a frame buffer module 112 configured within the memory 306. The motion vectors 132 are then input to a motion compensation module 108 which produces inter-predicted reference samples 134 by filtering samples stored in the frame buffer module 112, taking into account a spatial offset derived from the motion vectors 132. Not illustrated in FIG. 1, the motion vectors 132 are also passed as syntax elements to the entropy encoder module 104 for coding in the encoded bit-stream 113. An intra-frame prediction module 109 produces intra-predicted reference samples 136 using samples 138 obtained from a summation module 114, which sums the output 120 of the multiplexer module 110 and the output 130 from the inverse transform module 106.

Prediction units (PUs) may be coded using intra-prediction or inter-prediction methods. The decision as to whether to use intra-prediction or inter-prediction is made according to a rate-distortion trade-off between desired bit-rate of the resulting encoded bit-stream 113 and the amount of image quality distortion introduced by either the intra-prediction or inter-prediction method. If intra-prediction is used, one intra-prediction mode is selected from a set of possible modes, also according to a rate-distortion trade-off. One intra-prediction mode is selected for each prediction unit.

The multiplexer module 110 selects either the intra-predicted reference samples 136 from the intra-frame prediction module 109 or the inter-predicted reference samples 134 from the motion compensation block 108, depending on a current prediction mode 142, determined by control logic not illustrated but well-known in the art. The prediction mode 142 is also provided to the entropy encoder 104 and as such is used to determine or otherwise establish the scan order of transform units as will be described. Inter-frame prediction uses only a diagonal scan order, whereas intra-frame prediction may use the diagonal scan, a horizontal scan or a vertical scan order.

The summation module 114 produces a sum 138 that is input to a de-blocking filter module 111. The de-blocking filter module 111 performs filtering along block boundaries, producing de-blocked samples 153 which, together with the input frame data 101, are input to a sample adaptive offset (SAO) filter module 151. The SAO filter module 151 performs filtering inside the block, producing SAO filtered samples 140 and SAO offset data 152. The filtered samples 140 are written to the frame buffer module 112 configured within the memory 306. The SAO offset data 152 is passed to the entropy encoder module 104 where the data 152 is entropy encoded into the bitstream 113 as discussed below. The frame buffer module 112 is a buffer with sufficient capacity to hold data from multiple past frames for future reference.

In the video encoder 100, the residual data samples 122 within one transform unit (TU) are determined by finding the difference between data samples of the input frame data 101 and the prediction 120 of the data samples of the input frame data 101. The difference provides a spatial representation of the residual coefficients of the transform unit (TU). The residual coefficients of a transform unit (TU) are converted to the two-dimensional significance map.

The significance map of the residual coefficients in the transform unit (TU) is then scanned in a particular order, known as a scan order, to form a one-dimensional list of flag values, called a list of significant coefficient flags. The scan order may be described or otherwise specified by a scan pattern, such as that received with the prediction mode 142 from the intra-prediction module 109. The scan pattern may be horizontal, vertical, diagonal or zig-zag.

As described above, the video encoder 100 also comprises an entropy encoder module 104 that implements an entropy encoding method. The entropy encoder module 104 produces syntax elements from incoming residual coefficient data (or residual coefficients) 126 received from the scale and quantise module 103 and the SAO data 152 received from the SAO module 151. The entropy encoder module 104 outputs encoded bit-stream 113 and will be described in more detail below. For the high efficiency video coding (HEVC) standard under development, the encoded bit-stream 113 is delineated into network abstraction layer (NAL) units. Each slice of a frame is contained in one NAL unit.

There are several alternatives for the entropy encoding method implemented in the entropy encoder module 104. The high efficiency video coding (HEVC) standard under development supports context adaptive binary arithmetic coding (CABAC), a variant of context adaptive binary arithmetic coding (CABAC) found in H.264/MPEG-4 AVC. An alternative entropy coding scheme is known as the probability interval partitioning entropy (PIPE) coder.

For the video encoder 100 supporting multiple video coding methods, one of the supported entropy coding methods is selected according to the configuration of the encoder 100. Further, in encoding the coding units from each frame, the entropy encoder module 104 writes the encoded bit-stream 113 such that each frame has one or more slices per frame, with each slice containing image data for part of the frame. Producing one slice per frame reduces overhead associated with delineating each slice boundary. However, dividing the frame into multiple slices is also possible.

The video decoder 200 of FIG. 2 may be implemented as one or more software code modules of the software application program 333 resident on the hard disk drive 310 and being controlled in its execution by the processor 305. In particular the video decoder 200 comprises modules 202 to 208 and 210 which may each be implemented as one or more software code modules of the software application program 333. Although the video decoder 200 is described with reference to a high efficiency video coding (HEVC) video decoding pipeline, processing stages performed by the modules 202 to 208 and 209 are common to other video codecs that employ entropy coding, such as H.264/MPEG-4 AVC, MPEG-2 and VC-1.

An encoded bit-stream, such as the encoded bit-stream 113, is received by the video decoder 200. The encoded bit-stream 113 may be read from memory 306, the hard disk drive 310, a CD-ROM, a Blu-ray Disk™ or other computer readable storage medium. Alternatively the encoded bit-stream 113 may be received from an external source such as a server connected to the communications network 320 or a radio-frequency receiver. The encoded bit-stream 113 contains encoded syntax elements representing frame data to be decoded.

The encoded bit-stream 113 is input to an entropy decoder module 202 which extracts the syntax elements 220 and SAO offset data 242 from the encoded bit-stream 113 and passes the values of the syntax elements 220 to other blocks in the video decoder 200. There may be multiple entropy decoding methods implemented in the entropy decoder module 202, such as those described with reference to the entropy encoder module 104. Syntax element data 220 representing residual coefficient data is passed to an inverse scale and transform module 203 and syntax element data 222 representing motion vector information is passed to a motion compensation module 204. The inverse scale and transform module 203 performs inverse scaling on the residual coefficient data to create reconstructed transform coefficients. The module 203 then performs an inverse transform to convert the reconstructed transform coefficients from a frequency domain representation to a spatial domain representation, producing residual samples 224, such as the inverse transform described with reference to the inverse transform module 106.

The motion compensation module 204 uses the motion vector data 222 from entropy decoder module 202, combined with previous frame data 226 from a frame buffer block 208, configured within the memory 306, to produce inter-predicted reference samples 228 for a prediction unit (PU), being a prediction of output decoded frame data. When a syntax element indicates that the current coding unit was coded using intra-prediction, the intra-frame prediction module 205 produces intra-predicted reference samples 230 for the prediction unit (PU) using samples spatially neighbouring the prediction unit (PU). The spatially neighbouring samples are obtained from a sum 232 output from a summation module 210. The multiplexer module 206 selects intra-predicted reference samples or inter-predicted reference samples for the prediction unit (PU) depending on the current prediction mode, which is indicated by a syntax element in the encoded bit-stream 113. The array of samples 234 output from the multiplexer module 206 is added to the residual samples 224 from the inverse scale and transform module 203 by the summation module 210 to produce the sum 232 which is then input to each of a de-blocking filter module 207 and the intra-frame prediction module 205. In contrast to the encoder 100, the intra-frame prediction module 205 receives a prediction mode 236 from the entropy decoder 202. The multiplexer 206 receives an intra-frame prediction/inter-frame prediction selection signal from the entropy decoder 202. The de-blocking filter module 207 performs filtering along data block boundaries to smooth artefacts visible along the data block boundaries. The output of the de-blocking filter module 207 together with the SAO offset data 242 from the entropy decoder 202 is input to a SAO filter module 241. The SAO filter module 241 performs filtering inside the block using the SAO offset data 242 to improve both visual and objective quality of the image. The output 244 of the SAO filter module 241 is written to the frame buffer module 208 configured within the memory 306. The frame buffer module 208 provides sufficient storage to hold multiple decoded frames for future reference. Decoded frames 209 are also output from the frame buffer module 208.

SAO data 242 for the luminance and two chrominance channels in the stream 113 includes the following syntax elements: sao_merge_left_flag, sao_merge_up_flag, sao_type_idx, sao_band_position, sao_offset_abs and sao_offset_sign.

Sao_merge_left_flag is a binary value and is present in the stream 113 only if the current LCU is not on the left-most position in the frame otherwise sao_merge_left_flag is assumed to be zero. The sao_merge_left_flag is coded on a per LCU and per colour channel basis and indicates the derivation of the sao_type_idx, sao_band_position and sao_offset elements the from left neighbour LCU. Syntactically, the sao_merge_left_flag is a binary flag such that:

TABLE 1

| sao_merge_left_flag | Meaning |
| --- | --- |
| 0 | Not derive from left neighbour LCU |
| 1 | Derive from left neighbour LCU |

Sao_merge_up_flag is a binary value and is present in the stream 113 only if the value of sao_merge_left_flag is zero and the current LCU is not on the topmost position in the frame otherwise sao_merge_up_flag is assumed to be zero.

Syntax element sao_type_idx, representing sample adaptive offset type index data, is an integer value in range zero to five inclusive and is present in the stream 113 only if sao_merge_left_flag and sao_merge_up_flag values are both zero, otherwise sao_type_idx value is assumed to be zero. Sao_type_jdx indicates the edge offset type of the current coding tree block, and is coded on a per CU and per channel basis, and describes the following:

TABLE 2

| sao_type_idx | Edge type |
| --- | --- |
| 0 | Not applied |
| 1 | 0-degree edge |
| 2 | 90-degree edge |
| 3 | 135-degree edge |
| 4 | 45-degree edge |
| 5 | Band |

Traditional video coding approaches use unary CABAC coding having two (2) context models and at worst case six (6) CABAC bins and the following coding for sao_type_idx:

TABLE 3

| sao_type_idx value | unary code |
| --- | --- |
| 0 | 0 |
| 1 | 10 |
| 2 | 110 |
| 3 | 1110 |
| 4 | 11110 |
| 5 | 111110 |

In the above unary coding, the first bin is encoded using the first context model, and all other bins are encoded using the second context model.

Syntax element sao_band_position is an integer value and is present in the stream only if sao_type_idx value equals five.

Syntax element sao_offset_abs is a sequence of four integer values and is present in the stream only if the sao_type_idx value is not equal to zero.

Syntax element sao_offset_sign is a sequence of four integer values and is present in the stream 113 only if sao_type_idx value equals five.

The inventors have determined that problems exist with binarisation of the SAO syntax elements. Sao_type_idx binarisation is suboptimal—unary coding is useful where the value can have an unknown range of magnitudes, whereas truncated unary coding is more efficient where the maximum possible range of magnitudes is known. The inventors have also determined that the value of 0 has probability >0.9, and that other values do not significantly influence coding efficiency. Further, experiments by the inventors have shown that the context assignment of the sao_merge_left_flag is also suboptimal. Context reduction can lead to coding gains, generally due to correlations between channels.

According to one aspect of the present disclosure, the inventors propose an alternate binarisation approach for the sao_type_idx element, such as:

TABLE 4

| sao_type_idx value | Coding |
| --- | --- |
| 0 | 0 |
| 1 | 1000 |
| 2 | 1100 |
| 3 | 1010 |
| 4 | 1001 |
| 5 | 1111 |

According to this coding, sao_type_idx syntax elements which belong to the same LCU are merged, so that CABAC and bypass bins are not interleaved. Also in this coding the first bit represents a single CABAC bin, being an arithmetically encoded portion, and the following bits represent bypass encoded data of corresponding bypass bins. For the sao_merge_left_flag, a single context is shared between all channels, and thus the number of context models is reduced from 3 to 1. Preliminary experiments by the inventors have shown this affords a coding gain of −0.1% in random access test conditions, 0.0% in all intra-test conditions. According to this revised binarisation, in the worst case the number of CABAC bins is reduced from 3 to 1, and one redundant context is removed, thus providing for improved coding efficiency. Preliminary experiments by the inventors show no coding loss. Variations of this coding approach are also described.

Figure 5A:
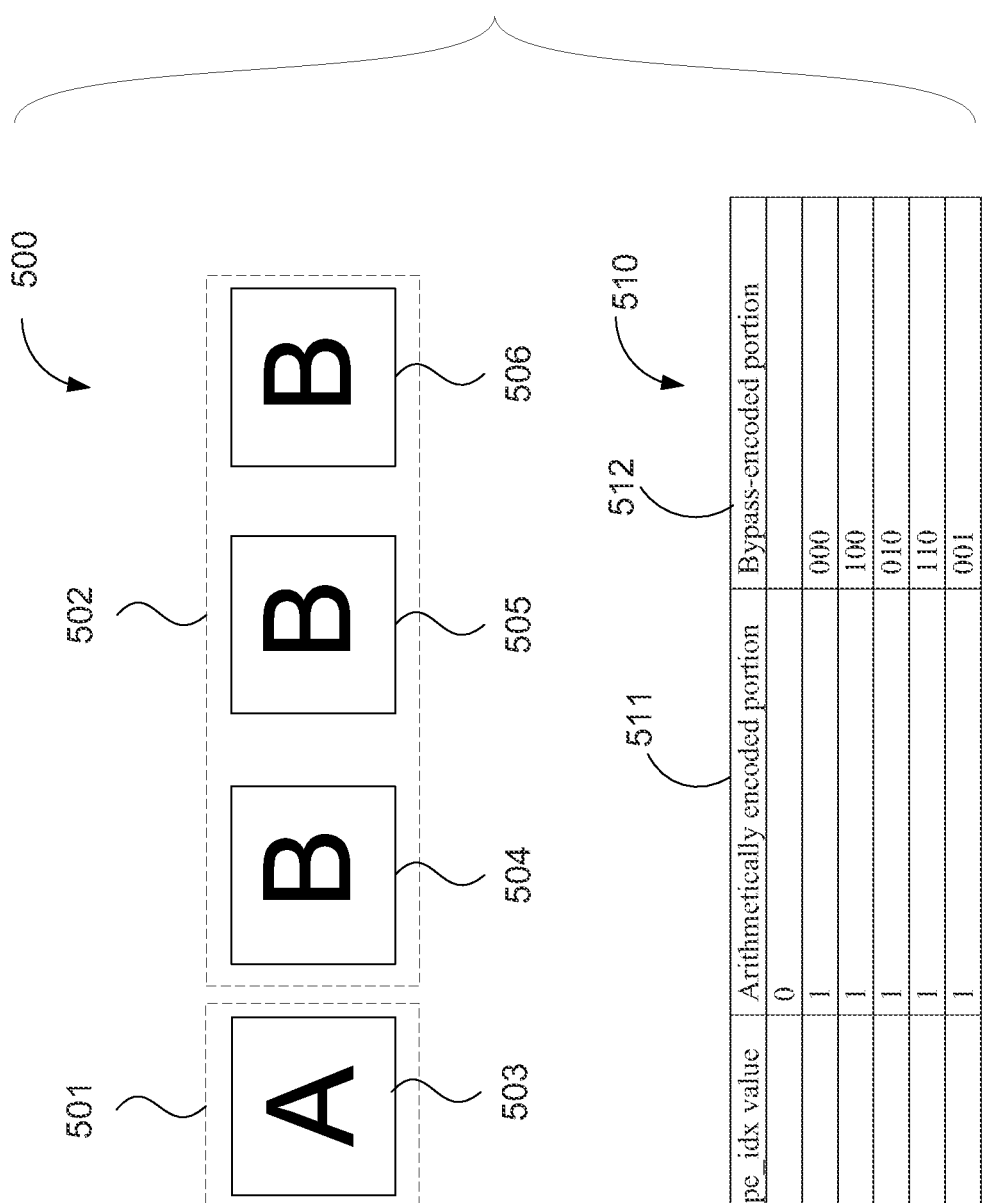
FIG. 5A is structure diagram of the binarisation scheme 500.

A binarisation scheme 500 for syntax element sao_type_idx is described below with the reference to FIG. 5A. The binarisation scheme 500 is one variation of that provided in Table 4, appreciating that when three bits (giving eight options) are used to encode five values, three of the available options will not be used. As such, the approach of Table 4 may have up to 6670 (=8*7*6*5*4) variations of which the scheme 500 is but one.

The binarisation scheme 500 includes an arithmetically encoded portion 501 and optional bypass-encoded portion 502. Portion 501 is formed of one binary element 503. The binary element 503 is assigned value "0" for one of the binarised values and "1" for all other values. Usually the value "0" is assigned to the element which has the highest estimated probability. Portion 502 is present only if the value of element 503 is "1". Portion 502 is formed of three bypass-encoded binary elements 504, 505, 506. The binary elements 504, 505, 506 are assigned a unique three bit binary value for each binarised value which has element 503 equal to "1". Binary elements 503, 504, 505, 506 may be stored in the stream 113 either adjacently one after another or be interleaved with other syntax elements. An exemplary binarisation 510 for sao_type_idx implements the binarisation scheme 500. As seen, the example 510 includes a single bit arithmetically encoded first portion 511, which corresponds to the arithmetically encoded portion 501, and fixed length (3 bits) bypass-encoded second portion 512 which corresponds to the bypass encoded portion 502. Here, the size or length of the second portion 512 is determined by the first portion 511. The presence of a one value in the first portion 511 indicates that the bypass encoded portion 512 is present. The length of the bypass encoded portion 512 may be predetermined and known to both the encoder and decoder. Alternatively a value of the first portion 511 may indicate the length of the second portion 512, however the first portion 511 is required to be at least two bits in length to encoded different lengths for the bypass encoded section portion 512. An example would be that an arithmetically encoded value of 10 indicates a bypass encoded portion of 3 bits, while an arithmetically encoded value of 11 indicates a bypass encoded portion of 4 bits.

A syntax structure 400 of a largest coding unit (LCU) will be described with the reference to FIG. 4A.

The syntax structure 400 is formed of a block 401 representing SAO information and a block 402 representing LCU structural, residual, prediction and other information. The block 401 contains three blocks 403, 404 and 405. Block 403 contains SAO information for the luminance channel, and blocks 404 and 405 contain SAO information for the two chrominance channels. The blocks 403, 404 and 405 have the same syntactical structure, so that syntax elements 406 to 411 shown on FIG. 4A for the block 403 can be also present in the blocks 404 and 405. Block 406 contains sao_merge_left_flag syntax element. Block 407 contains sao_merge_up_flag syntax element. Block 408 contains sao_type_idx syntax element binarised using binarisation scheme 500 with arithmetically encoded portion 413 and bypass-encoded portion 414 stored in an order 412. Block 409 contains sao_band_position syntax element. Block 410 contains sao_offset_abs syntax element. Block 411 contains sao_offset_sign syntax element. The order 412 relates to a particular order (of bins) because the binarisation schema 500 (and some others) allows interleaving of binary elements.

Figure 4B:
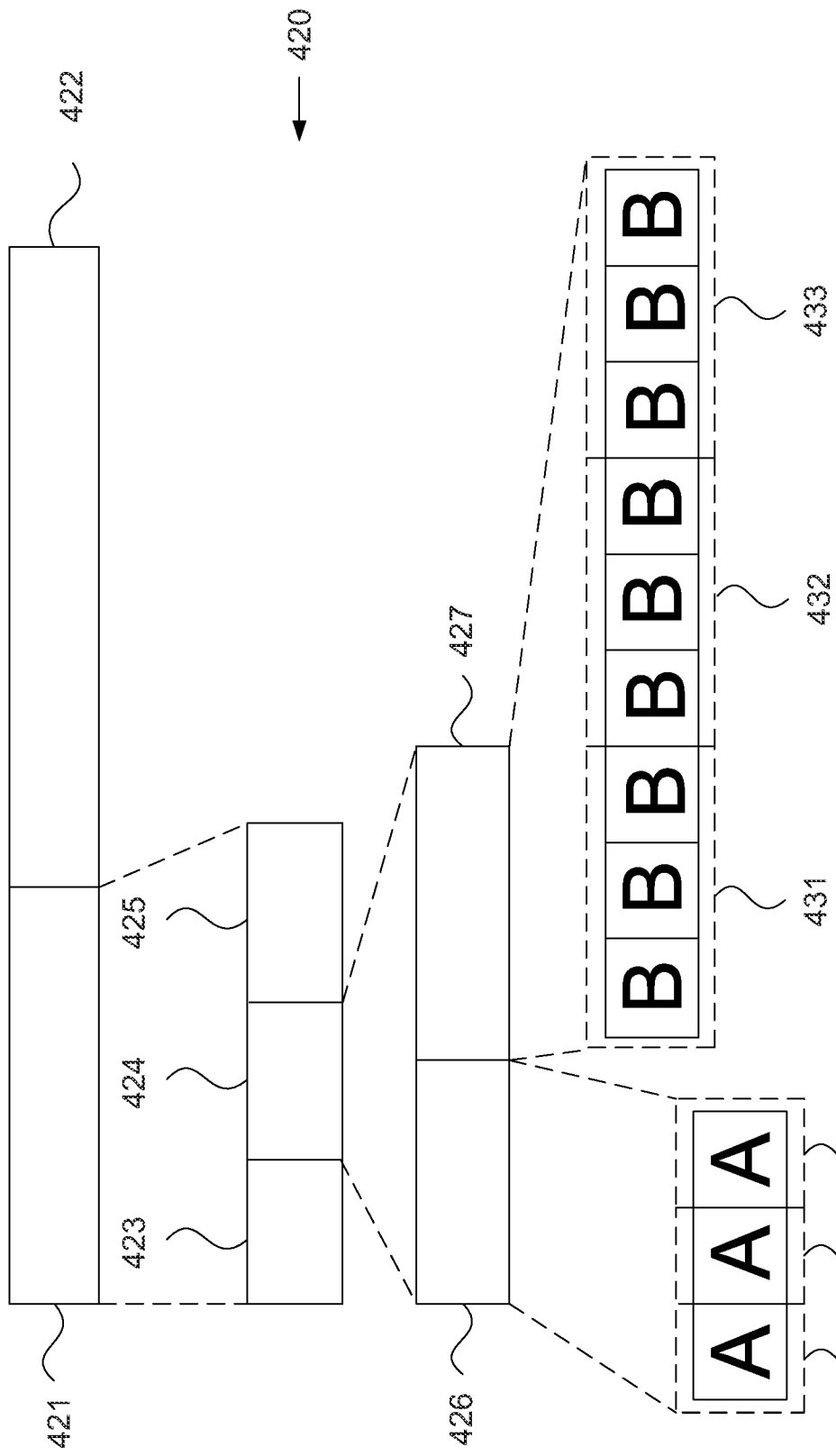
FIG. 4B is a schematic representation of an LCU structure using binarisation 500 with concatenated bypass bins.

An alternative syntax structure 420 of a largest coding unit (LCU) will be described with the reference to FIG. 4B.

The syntax structure 420 includes a block 421 representing SAO information and a block 422 representing LCU structural, residual, prediction and other information. The block 421 contains blocks 423, 424 and 425. Block 423 contains sao_merge_left_flag and sao_merge_up_flag syntax elements for the three channels. Block 424 contains sao_type_idx syntax elements for the three channels encoded using the binarisation scheme 500. Block 425 contains sao_band_position, sao_offset_abs and sao_offset_sign syntax elements for the three channels.

The block 424 is formed of blocks 426 and 427. Block 426 contains three arithmetically encoded portions 428, 429 and 430 of sao_type_idx syntax elements for the luminance channel and two chrominance channels correspondingly. Block 427 contains three bypass-encoded portions 431, 432 and 433 of sao_type_idx syntax elements for the luminance channel and two chrominance channels correspondingly. Portions 431, 432 and 433 are present only if the corresponding portions 428, 429 and 430 indicate their presence. The total bit length of the block 427 is determined based on the values of arithmetically encoded portions 428, 429 and 430.

An alternative binarisation scheme 520 for syntax element sao_type_idx is described below with the reference to FIG. 5B.

The binarisation scheme 520 comprises three arithmetically encoded binary elements 521, 522, 523 stored in the stream 113 adjacently one after another. An exemplary binarisation 530 for sao_type_idx implements the binarisation scheme 520.

An alternative syntax structure 440 of a largest coding unit (LCU) will be described with the reference to FIG. 4C.

The syntax structure 440 has a block 441 representing SAO information and a block 442 representing LCU structural, residual, prediction and other information. The block 441 contains three blocks 443, 444 and 445. Block 443 contains SAO information for the luminance channel, and blocks 444 and 445 contain SAO information for the two chrominance channels. The blocks 443, 444 and 445 have the same syntactical structure, so that syntax elements 446 to 451 shown on FIG. 4C for block 443 can be also present in the blocks 444 and 445. Block 446 contains sao_merge_left_flag syntax element. Block 447 contains sao_merge_up_flag syntax element. Block 448 contains sao_type_idx syntax element binarised using binarisation scheme 520 with all bins encoded arithmetically. Block 449 contains sao_band_position syntax element. Block 450 contains sao_offset_abs syntax element. Block 451 contains sao_offset_sign syntax element.

An alternative binarisation scheme 540 for syntax element sao_type_idx is described below with the reference to FIG. 5C.

The binarisation scheme 540 is formed of an arithmetically encoded portion 541 and bypass-encoded portion 542. Portion 541 contains one binary element 543. Portion 542 has two bypass-encoded binary elements 544, 545. Binary elements 543, 544, 545 uniquely identify each sao_type_idx value. Binary elements 543, 544, 545 may be stored in the stream 113 either adjacently one after another or be interleaved with other syntax elements. An exemplary binarisation 550 for sao_type_idx implements the binarisation scheme 540.

Figure 4D:
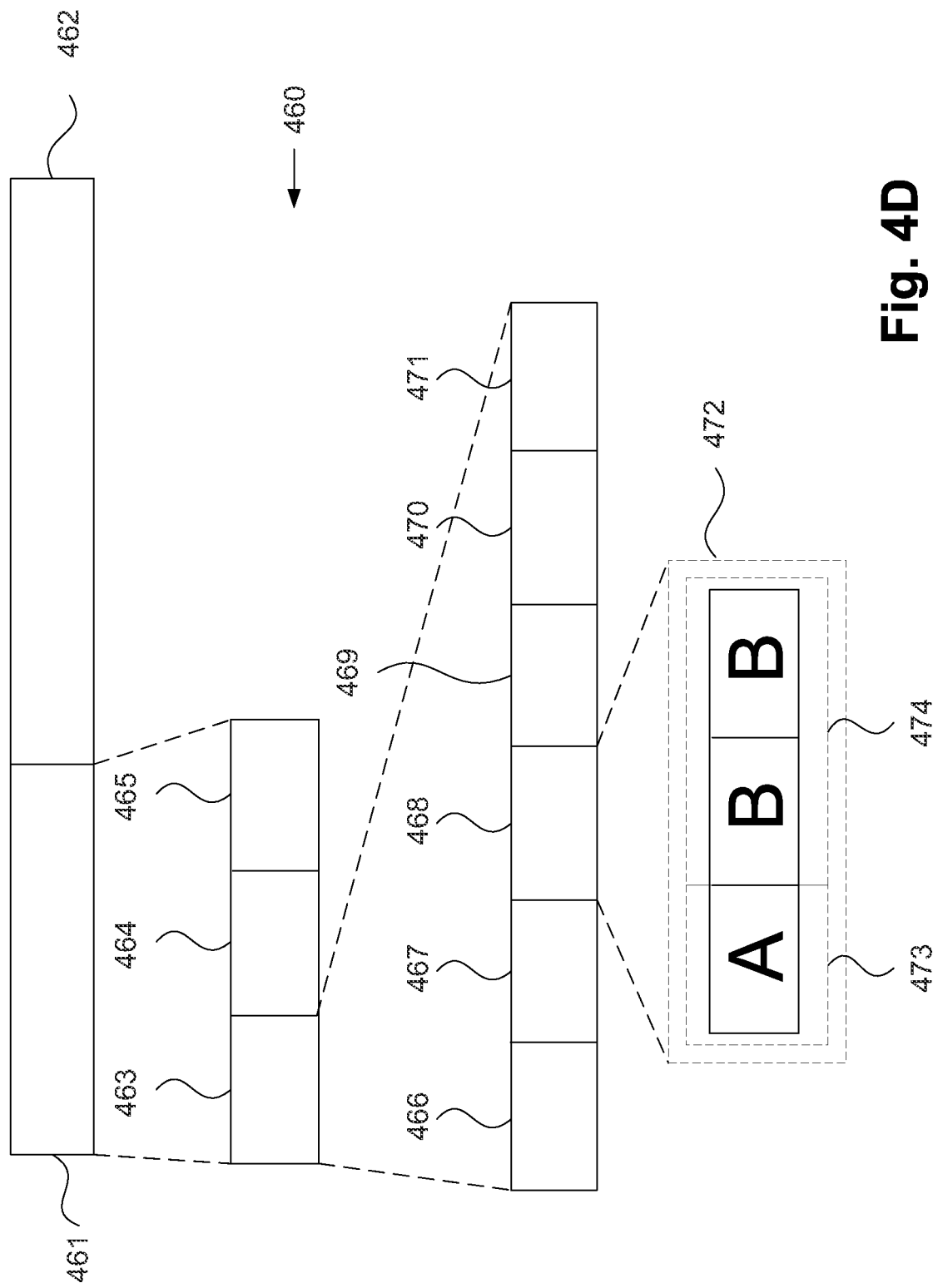
FIG. 4D is a schematic representation of an LCU structure using binarisation scheme 540 of FIG. 5C.

An alternative syntax structure 460 of a largest coding unit (LCU) will be described with the reference to FIG. 4D.

The syntax structure 460 has a block 461 representing SAO information and a block 462 representing LCU structural, residual, prediction and other information. The block 461 contains three blocks 463, 464 and 465. Block 463 contains SAO information for the luminance channel, and blocks 464 and 465 contain SAO information for the two chrominance channels. The blocks 463, 464 and 465 have the same syntactical structure, so that syntax elements 466 to 471 shown on FIG. 4D for block 463 can be also present in the blocks 464 and 465. Block 466 contains sao_merge_left_flag syntax element. Block 467 contains sao_merge_up_flag syntax element. Block 468 contains sao_type_idx syntax element binarised using binarisation scheme 540 with arithmetically encoded portion 473 and bypass-encoded portion 474 stored in an order 472, similar to that described above. Block 469 contains sao_band_position syntax element. Block 470 contains sao_offset_abs syntax element. Block 471 contains sao_offset_sign syntax element.

Figure 4E:
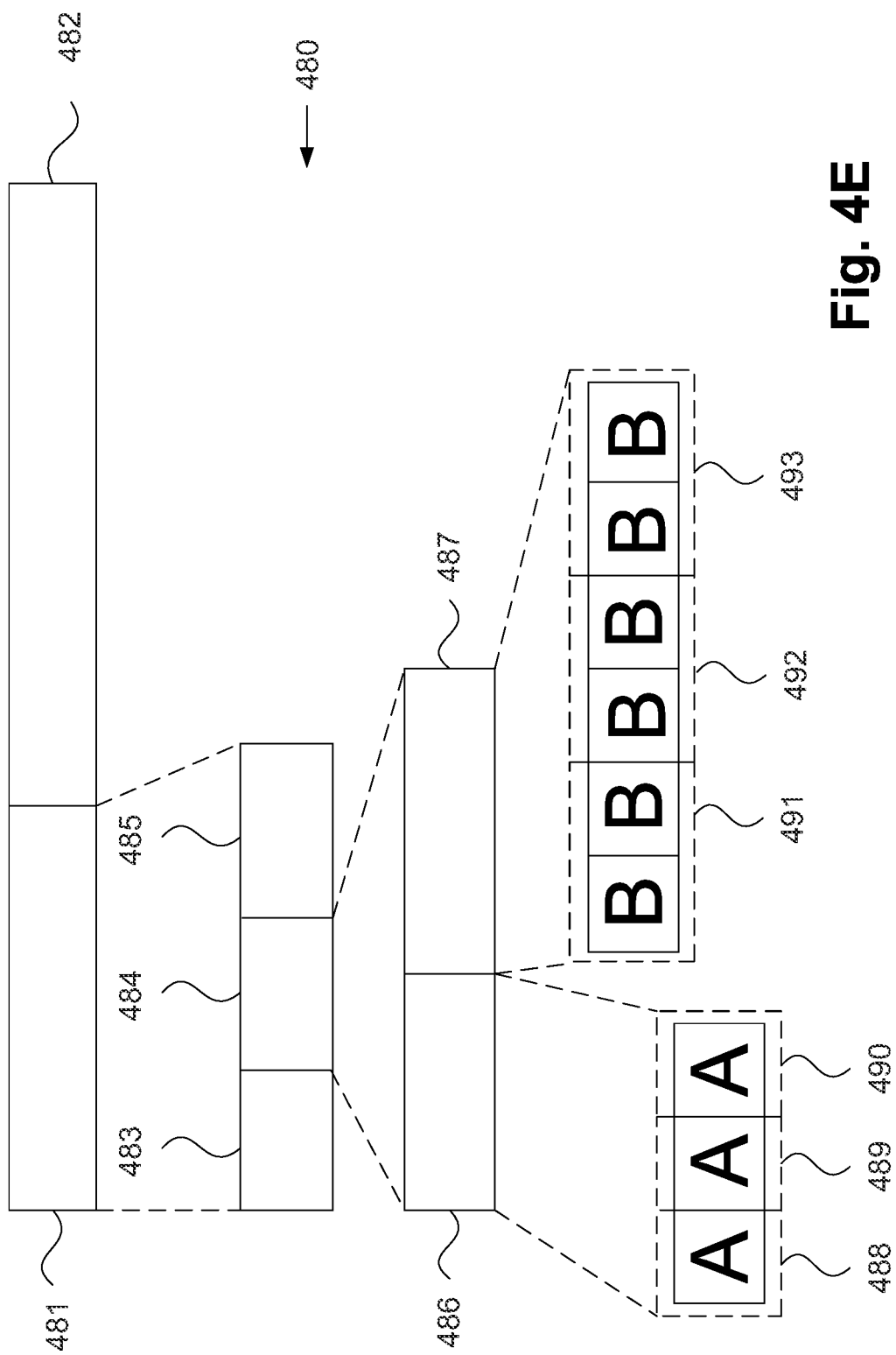
FIG. 4E is a schematic representation of an LCU structure using the binarisation scheme 540 with concatenated bypass bins.

An alternative syntax structure 480 of a largest coding unit (LCU) will be described with the reference to FIG. 4E.

The syntax structure 480 is formed of a block 481 representing SAO information and block 482 representing LCU structural, residual, prediction and other information. The block 481 includes blocks 483, 484 and 485. Block 483 contains sao_merge_left_flag and sao_merge_up_flag syntax elements for the three channels. Block 484 contains sao_type_idx syntax elements for the three channels encoded using the binarisation scheme 540. Block 485 contains sao_band_position, sao_offset_abs and sao_offset_sign syntax elements for the three channels.

The block 484 includes blocks 486 and 487. Block 486 contains three arithmetically encoded portions 488, 489 and 490 of sao_type_idx syntax elements for the luminance channel and two chrominance channels respectively. Block 487 contains three bypass-encoded portions 491, 492 and 493 of sao_type_idx syntax elements for the luminance channel and two chrominance channels correspondingly.

Figure 5D:
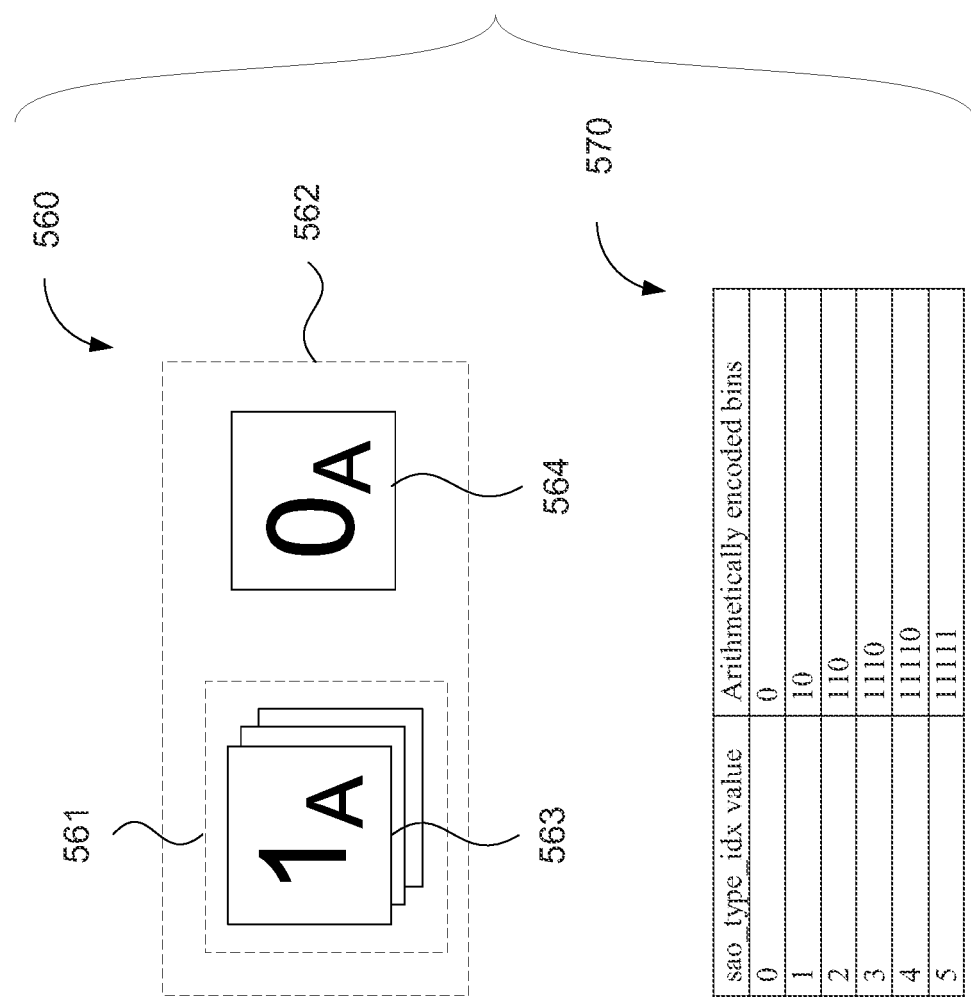
FIG. 5D is structure diagram of the binarisation scheme 560.

A binarisation scheme 560 for syntax element sao_type_idx is described below with the reference to FIG. 5D, and represents an example of a truncated unary implementation.

In the binarisation scheme 560 the maximum length of binarised sequence 562 is determined as the number of possible distinct values of the sao_type_idx syntax element, minus one. For the case of six possible values of the sao_type_idx syntax element, the maximum length of binarised sequence 562 is five. In the binarisation scheme 560 every sao_type_idx value is assigned a unique sequence 561 of arithmetically encoded "1" values 563 followed by an optional arithmetically encoded terminating "0" value 564. The sequence 561 can have length in range from zero to the maximum length of binarised sequence 562. A terminating "0" value 564 is encoded only if the number of previously encoded "1" values 563 for a given binarised value is less than the maximum length of the binarised sequence 562. An exemplary binarisation 570 for sao_type_idx implements the binarisation scheme 560.

An alternative syntax structure 4100 of a largest coding unit (LCU) will be described with the reference to FIG. 4F.

The syntax structure 4100 is formed of a block 4101 representing SAO information and a block 4102 representing LCU structural, residual, prediction and other information. The block 4101 is formed of three blocks 4103, 4104 and 4105. Block 4103 contains SAO information for the luminance channel, and blocks 4104 and 4105 contain SAO information for the two chrominance channels. The blocks 4103, 4104 and 4105 have the same syntactical structure, so that syntax elements 4106 to 4111 shown on FIG. 4F for block 4103 can be also present in the blocks 4104 and 4105. Block 4106 contains sao_merge_left_flag syntax element. Block 4107 contains sao_merge_up_flag syntax element. Block 4108 contains sao_type_idx syntax element 562 binarised using binarisation scheme 560. Block 4109 contains sao_band_position syntax element. Block 4110 contains sao_offset_abs syntax element. Block 4111 contains sao_offset_sign syntax element.

Figure 5E:
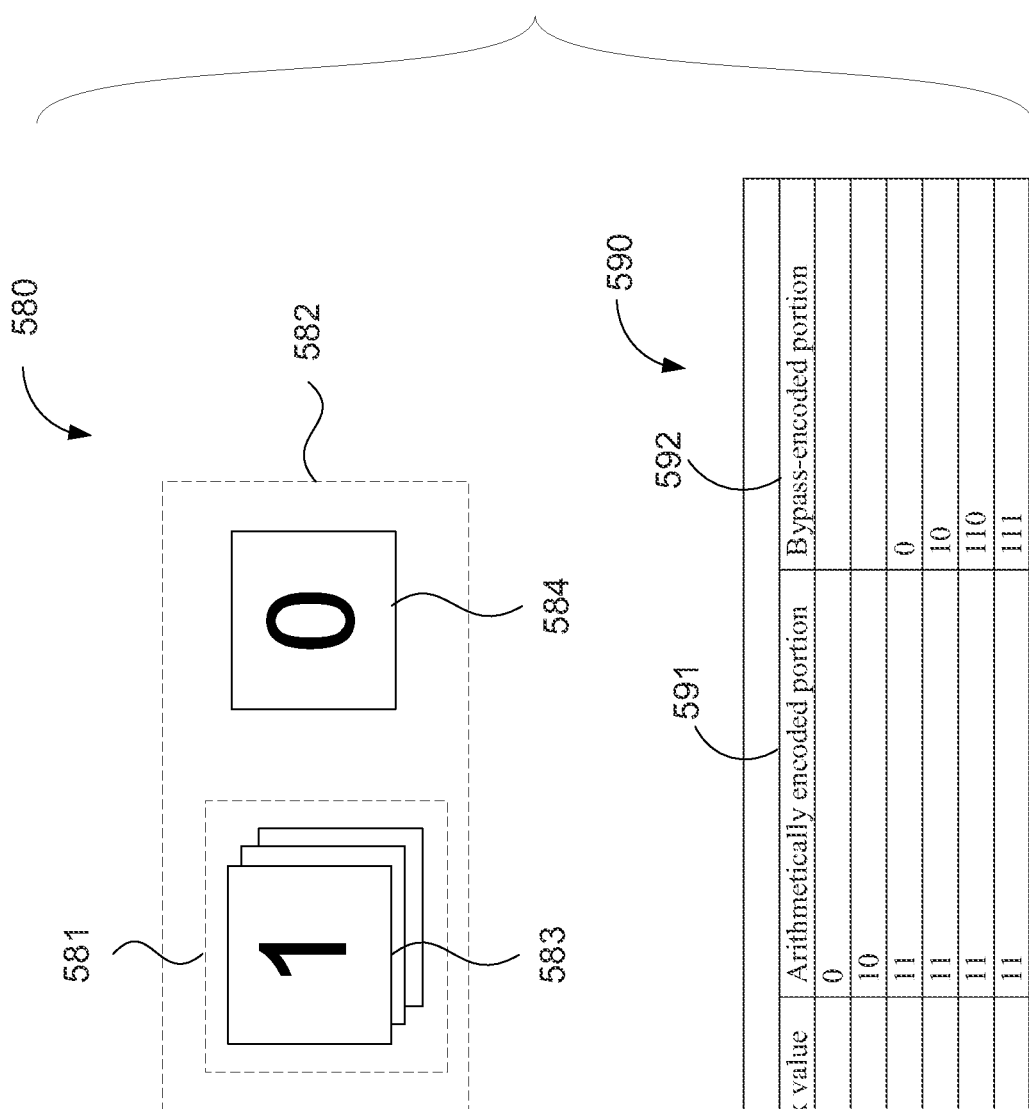
FIG. 5E is structure diagram of the binarisation scheme 580.

A binarisation scheme 580 for syntax element sao_type_idx is described below with the reference to FIG. 5E.

In the binarisation scheme 580 the maximum length of binarised sequence 582 is determined as the number of possible distinct values of sao_type_idx syntax element minus one. For the case of six possible values of the sao_type_idx syntax element the maximum length of binarised sequence 582 is five.

In the binarisation scheme 580 every sao_type_idx value is assigned a unique sequence 581 of "1" values 583 followed by an optional terminating "0" value 584. In the binarisation scheme 580 all bins of a binarised value are bypass-encoded except the first T bins which are encoded arithmetically, where T is a value in range from zero to the maximum length of binarised sequence 582 minus one. For the case of six possible values of the sao_type_idx syntax elements, the parameter T can take any integer value in range from zero to four. The sequence of binary elements 581 and the binary element 584 may be stored in the stream 113 either adjacently one after another or be interleaved with other syntax elements.

An exemplary binarisation 590 for sao_type_idx implements the binarisation scheme 580 with parameter T=2. The binarisation 590 has an arithmetically encoded first portion 591 and a variable length bypass encoded second portion 592. As will be seen from FIG. 5E, the first portion 591 can have multiple bits and can include (for values 1-5) a second bit that, when set (for values 2-5), indicates that the second portion 592 will be present in the stream of video data.

An alternative syntax structure 4200 of a largest coding unit (LCU) will be described with the reference to FIG. 4G.

The syntax structure 4200 is formed of a block 4201 representing SAO information and a block 4202 representing LCU structural, residual, prediction and other information. The block 4201 includes three blocks 4203, 4204 and 4205. Block 4203 contains SAO information for the luminance channel, and blocks 4204 and 4205 contain SAO information for the two chrominance channels. The blocks 4203, 4204 and 4205 have the same syntactical structure, so that syntax elements 4206 to 4211 shown in FIG. 4G for block 4203 can be also present in the blocks 4204 and 4205. Block 4206 contains sao_merge_left_flag syntax element. Block 4207 contains sao_merge_up_flag syntax element. Block 4208 contains sao_type_idx syntax element binarised using binarisation scheme 580 with all bins stored adjacently in an order 4212, as discussed above. Block 4209 contains sao_band_position syntax element. Block 4210 contains sao_offset_abs syntax element. Block 4211 contains sao_offset_sign syntax element.

Figure 4H:
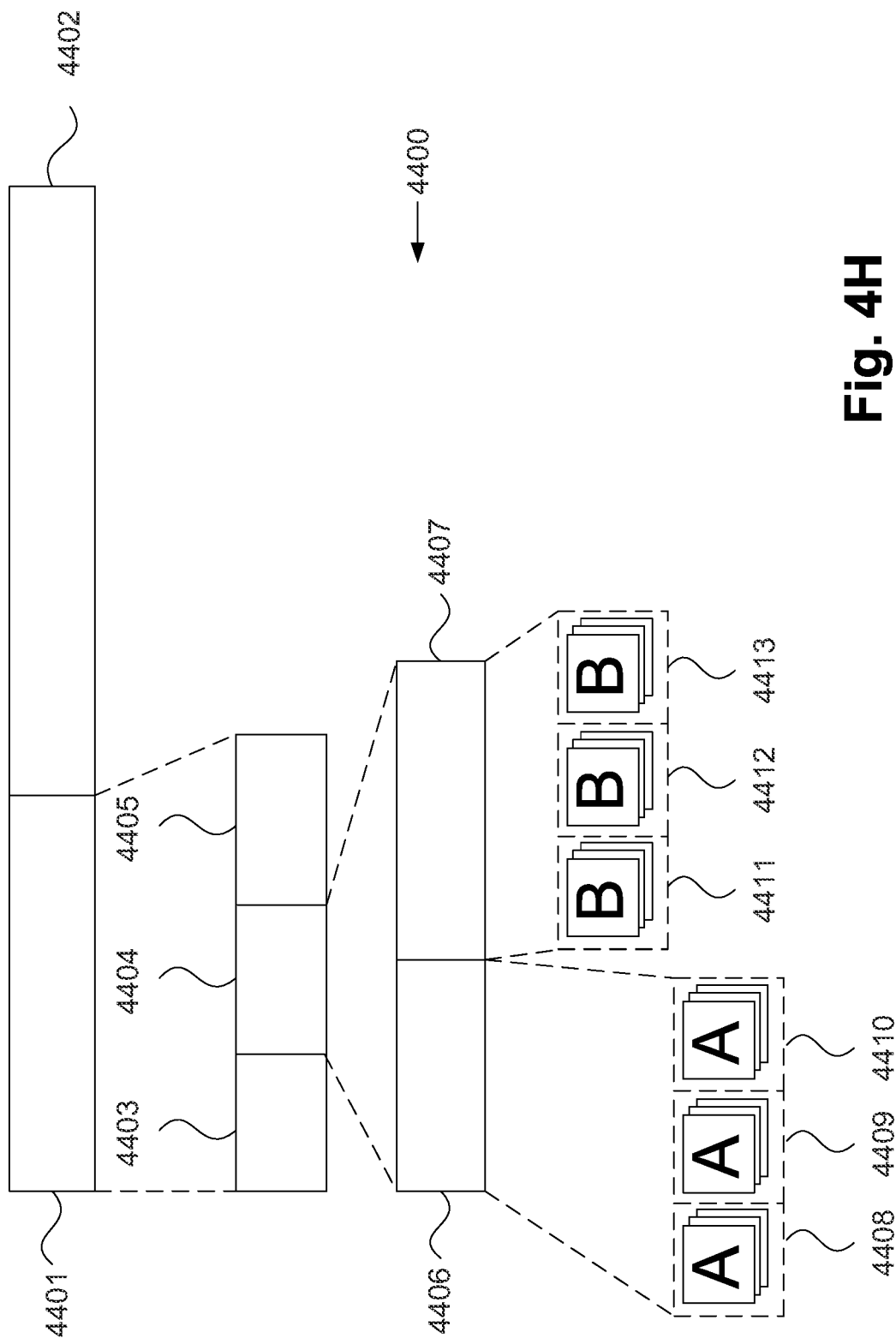
FIG. 4H is a schematic representation of an LCU structure using the binarisation scheme 580 with concatenated bypass bins.

An alternative syntax structure 4400 of a largest coding unit (LCU) will be described with the reference to FIG. 4H.

The syntax structure 4400 is formed of a block 4401 representing SAO information and a block 4402 representing LCU structural, residual, prediction and other information. The block 4401 is formed of blocks 4403, 4404 and 4405. Block 4403 contains sao_merge_left_flag and sao_merge_up_flag syntax elements for the three channels. Block 4404 contains sao_type_idx syntax elements for the three channels encoded using the binarisation scheme 580. Block 4405 contains sao_band_position, sao_offset_abs and sao_offset_sign syntax elements for the three channels.

Block 4404 is formed of blocks 4406 and 4407. Block 4406 contains three arithmetically encoded portions 4408, 4409 and 4410 of sao_type_idx syntax elements corresponding to the luminance channel and two chrominance channels. The maximum bit length of the block 4406 is determined by the value of the parameter T of the binarisation scheme 580. Block 427 contains three bypass-encoded portions 4411, 4412 and 4413 of sao_type_idx syntax elements for the luminance channel and two chrominance channels correspondingly. Portions 4411, 4412 and 4413 are present only if the corresponding portions 4408, 4409 and 4410 indicate their presence. The maximum bit length of the block 4406 is determined by the value of the parameter T of the binarisation scheme 580 and by the values of arithmetically encoded portions 4408, 4409 and 4410.

An alternative syntax structure 4600 of a largest coding unit (LCU) will be described with the reference to FIG. 4I.

The syntax structure 4600 is formed of a block 4601 representing SAO information and block 4602 representing LCU structural, residual, prediction and other information. The block 4601 contains two blocks 4603 and 4604. Block 4603 contains sao_merge_left_flag and sao_merge_up_flag syntax elements for the three channels, and block 4604 contains other SAO syntax elements for the three channels such as sao_type_idx, sao_band_position, sao_offset_abs, sao_offset_sign. Block 4603 contains blocks 4606 and 4607. The block 4606 contains the sao_merge_left_flag syntax elements for the three channels, and block 4607 contains the sao_merge_up_flag syntax elements for the three channels. The block 4606 is present in the stream 113 only if the LCU is not on the leftmost position in the frame. The block 4607 is present only if the LCU is not on the topmost position in the frame. The blocks 4606 and 4607 can have a different order in the block 4603.

In an alternative implementation the sao_merge_left_flag syntax elements can be grouped into a single block, while the sao_merge_up_flag can be coded separately for each channel.

Sao_merge_left_flag and sao_merge_up_flag syntax elements in syntax structures 400, 420, 440, 460, 480, 4100, 4200 and 4400 are arithmetically encoded. Probability modelling may be performed for each of the three channels. The modelling can be performed either independently for each channel, or the two chrominance channels may use a joint context model, or the three channels may use a joint context model.

Figure 6A:
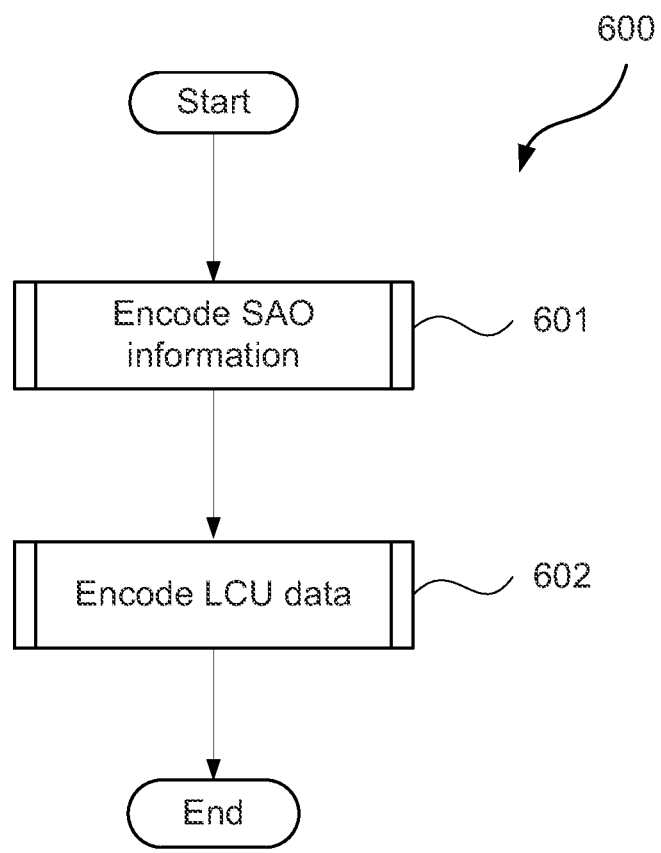
FIG. 6A is a flow diagram of an LCU encoder.

A method 600 of encoding an LCU data into the stream 113 will be described with the reference to FIG. 6A. In an initial step 601,SAO information is encoded In another step 602,LCU structural, residual, prediction and other information is encoded.

Figure 6B:
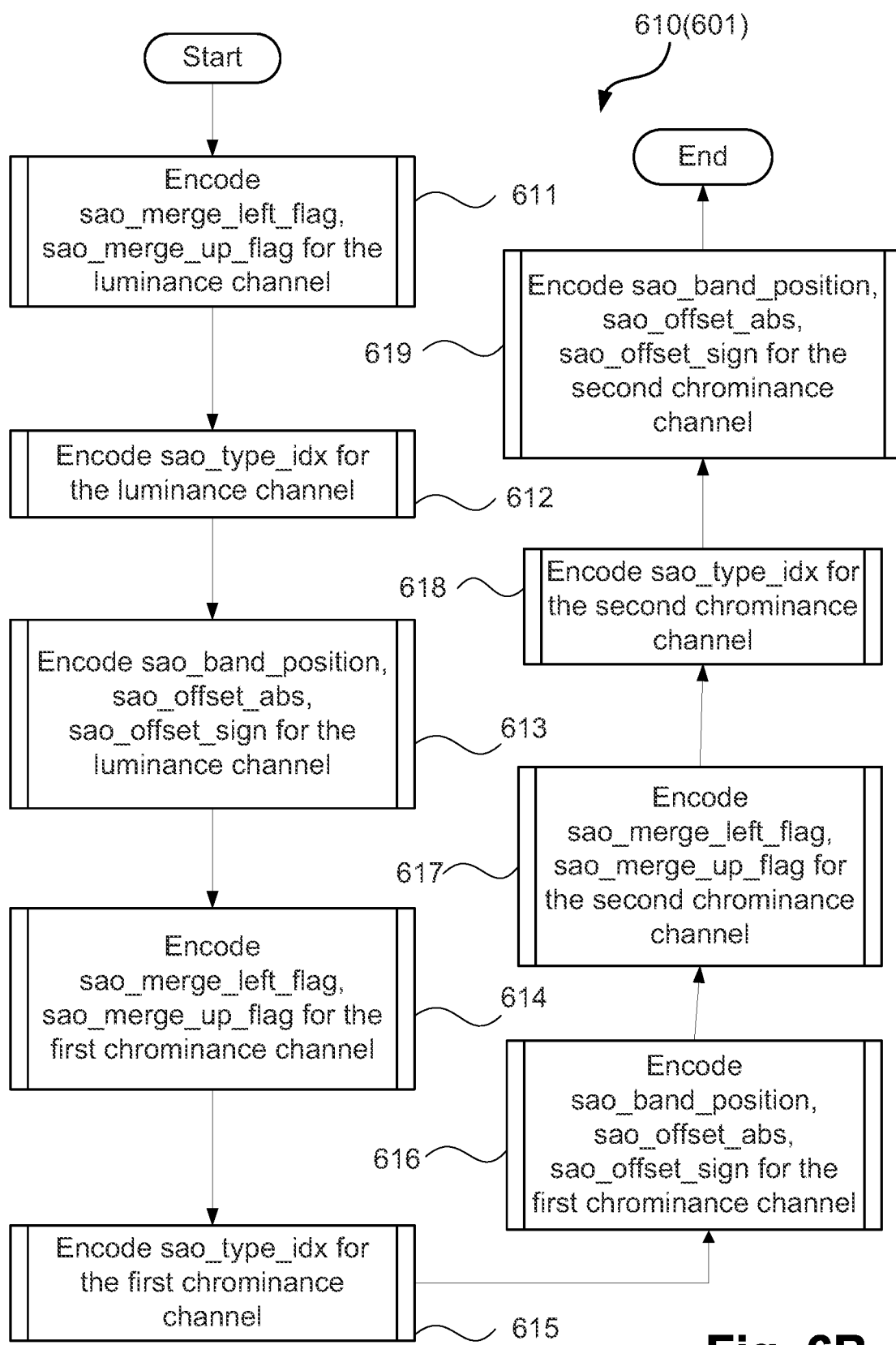
FIG. 6B is a flow diagram of an LCU SAO information encoder.

An exemplary method 610 of encoding SAO information will be described with the reference to FIG. 6B. The method 610 may be used to implement the step 601 of the method 600 to encode the blocks 401, 441, 461, 4101, 4201 described above. The method 610 starts with step 611 where the sao_merge_left_flag and sao_merge_up_flag values for the luminance channel are encoded. Step 612 encodes sao_type_idx value for the luminance channel Step 613 encodes sao_band_position, sao_offset_abs and sao_offset_sign values for the luminance channel Step 614 encodes sao_merge_left_flag and sao_merge_up_flag values for the first chrominance channel. Step 615 encodes sao_type_idx value for the first chrominance channel. Step 616 encodes sao_band_position, sao_offset_abs and sao_offset_sign values for the first chrominance channel. Step 617 encodes sao_merge_left_flag and sao_merge_up_flag values for the second chrominance channel Step 618 encodes sao_type_idx value for the second chrominance channel Step 619 encodes sao_band_position, sao_offset_abs and sao_offset_sign values for the second chrominance channel. The order of the steps 611-619 may be altered as desired by any particular implementation.

Figure 6C:
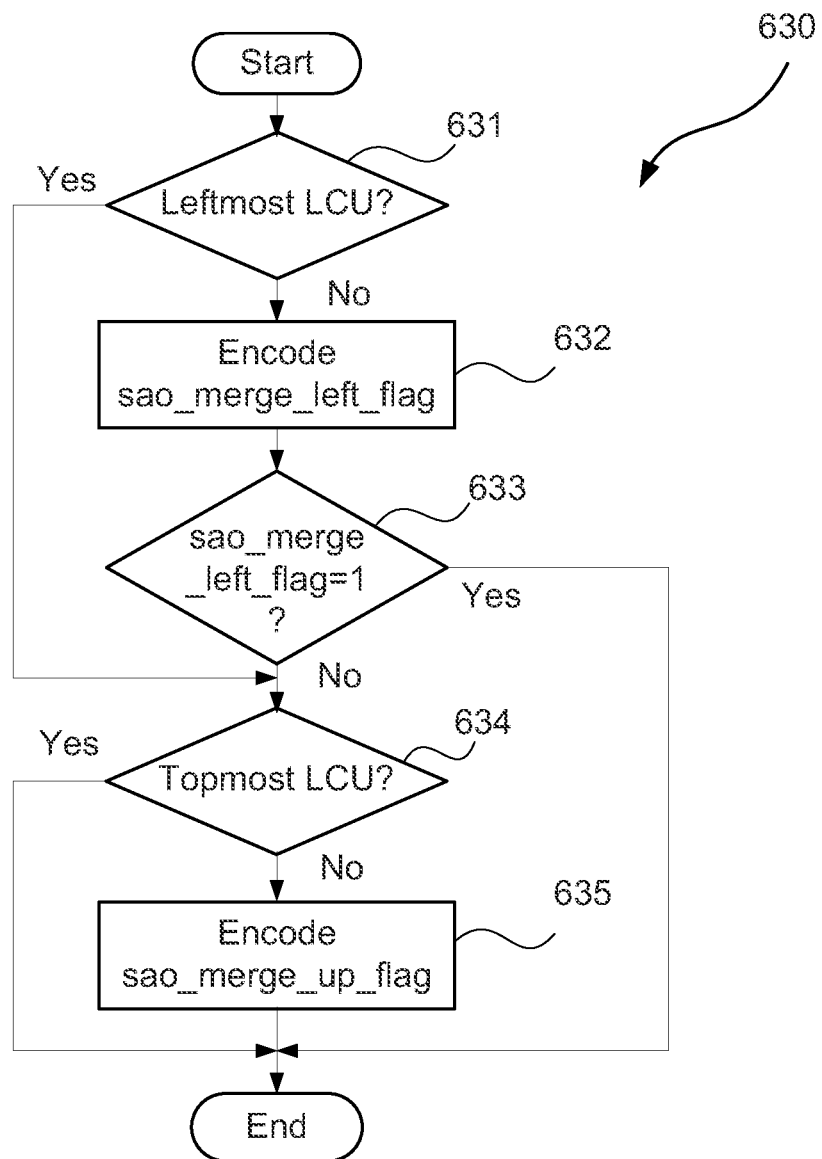
FIG. 6C is a flow diagram of sao_merge_left_flag and sao_merge_up_flag syntax elements encoder.

A method 630 of encoding sao_merge_left_flag and sao_merge_up_flag values for a single channel will be described with the reference to FIG. 6C. The method 630 may be used to implement steps 611, 614, 617 of the method 610 to encode sao_merge_left_flag and sao_merge_up_flag syntax elements in syntax structures 400, 440, 460, 4100, 4200, 4600 described above. The method 630 starts by step 631 which checks whether the LCU is at the leftmost position in the frame. If this condition is true then control is passed to step 634, otherwise control is passed to step 632. The step 632 encodes sao_merge_left_flag into the stream 113. Step 633 tests whether the value of sao_merge_left_flag equals one. If this condition is true, the control leaves the method 630. Otherwise the control is passed to step 634. Step 634 encodes sao_merge_up_flag into the stream 113. After this step the control leaves the method 630.

Figure 6D:
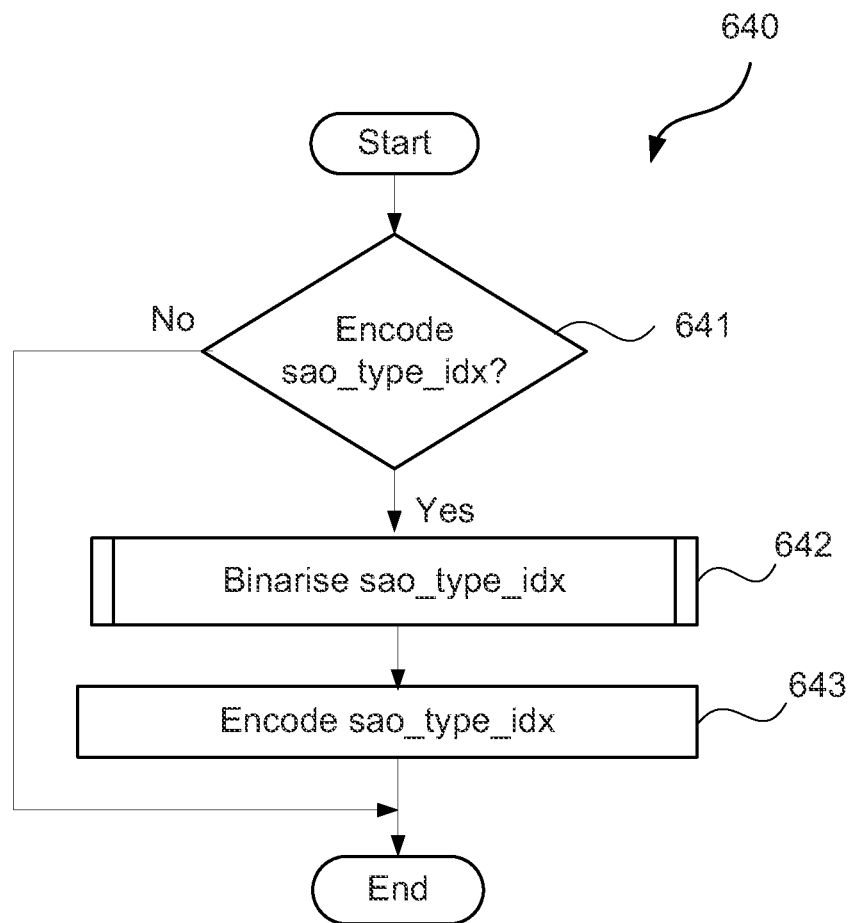
FIG. 6D is a flow diagram of sao_type_idx syntax element encoder.

A method 640 of encoding sao_type_idx syntax element for a single channel will be described next with the reference to FIG. 6D. The method 640 may be used to implement steps 612, 615, 618 of the method 610 to encode sao_type_idx syntax element in syntax structures 400, 440, 460, 4100, 4200, 4600 described above. The method 640 starts by step 641. The step 641 checks whether sao_merge_left_flag and sao_merge_up_flag values for the given channel are both equal to zero. If this is true then the control is passed to step 642, otherwise the control leaves method 640. The step 642 binarises sao_type_idx value. Next, step 643 encodes the binary representation of the sao_type_idx value into the stream 113. After the step 643 the control leaves the method 640.

Figure 6E:
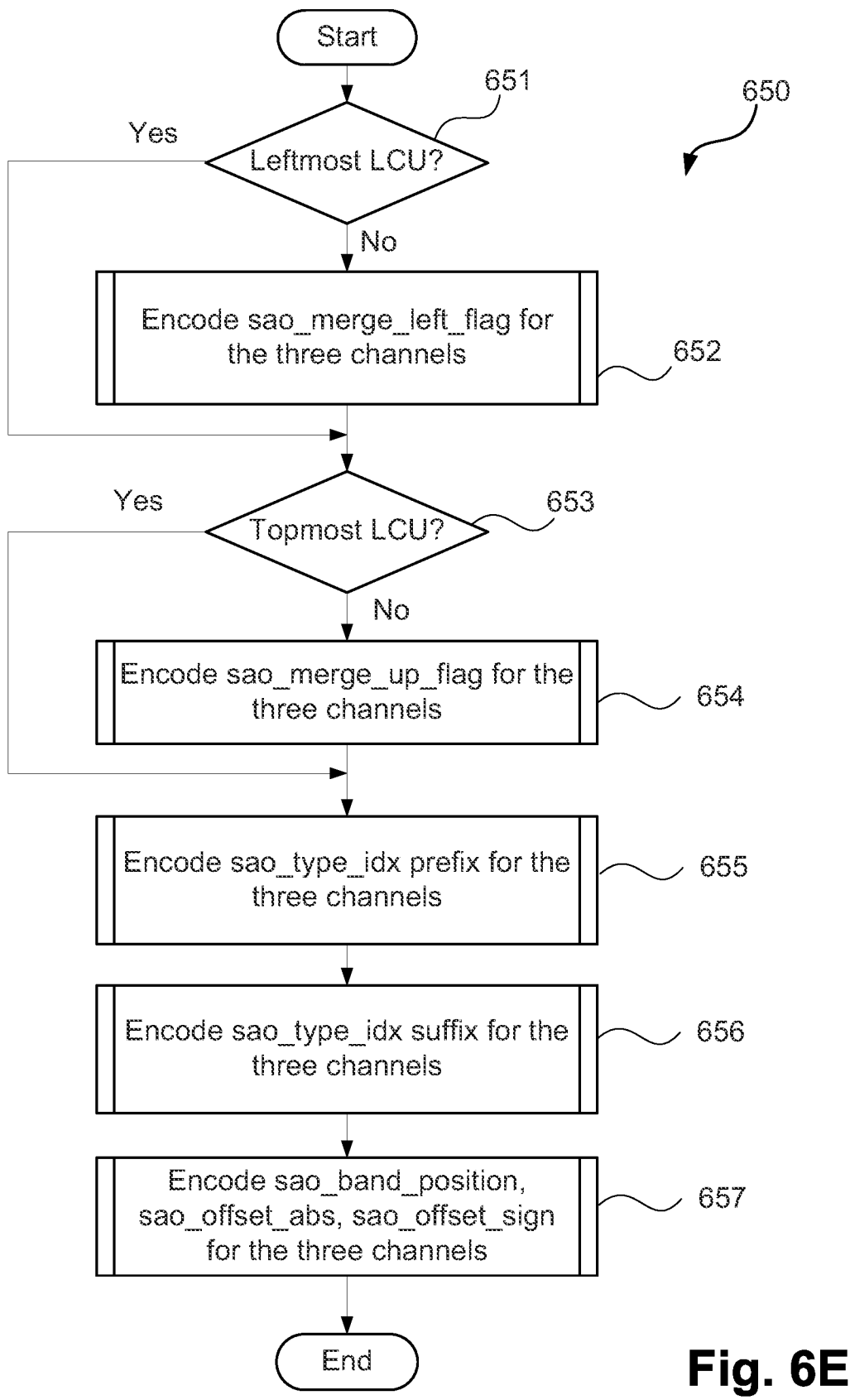
FIG. 6E is a flow diagram of an LCU SAO information encoder.

A method 650 of encoding SAO information will be described with the reference to FIG. 6E. The method 650 may be used to implement the step 601 of the method 600 to encode the blocks 421, 481, 4401, 4601 described above. The method 650 starts with step 651 which checks whether this is the leftmost LCU in the frame. If this is true then control is passed to step 653, otherwise control is passed to step 652. Step 652 encodes sao_merge_left_flag values for the three channels. The step 653 checks whether this is the topmost LCU in the frame. If this is true then control is passed to step 655, otherwise control is passed to step 654. The step 654 encodes sao_merge_up_flag values for the three channels. The step 655 encodes the arithmetically encoded portions of sao_type_idx values for the three channels. The step 656 encodes the bypass-encoded portions of sao_type_idx values for the three channels. Next, step 657 encodes sao_band_position, sao_offset_abs and sao_offset_sign values for the three channels.

Figure 6F:
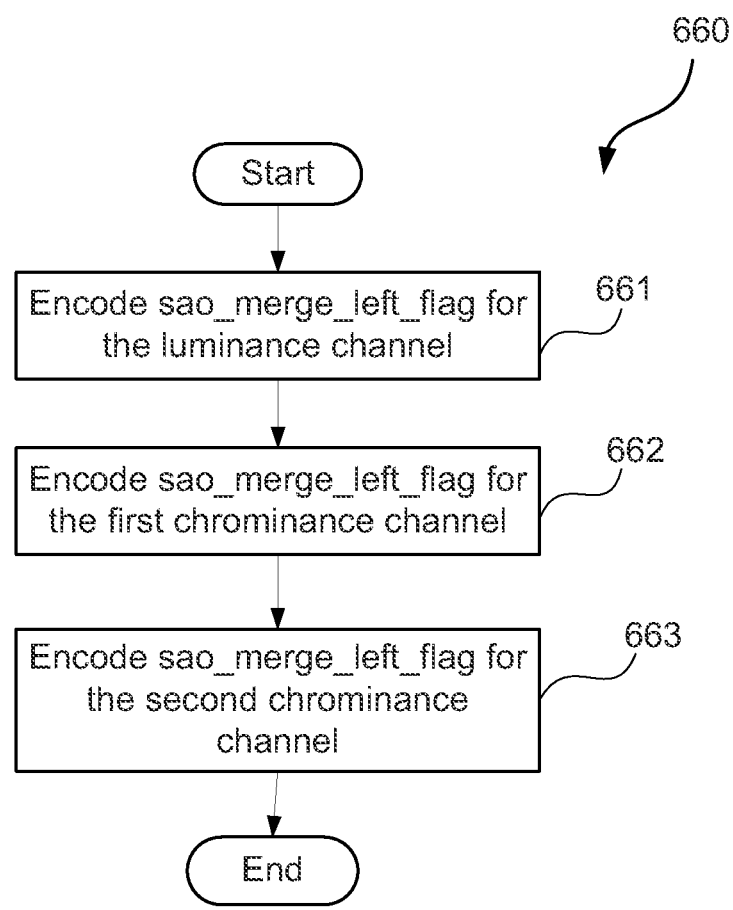
FIG. 6F is a flow diagram of sao_merge_left_flag syntax elements encoder.

A method 660 of encoding sao_merge_left_flag values for the three channels will be described with the reference to FIG. 6F. The method 660 may be used to implement step 652 of the method 650 to encode sao_merge_left_flag syntax elements in syntax structures 420, 480, 4400, 4600 described above. The method 660 starts by step 661 which encodes sao_merge_left_flag value for the luminance channel. Next, step 662 encodes sao_merge_left_flag value for the first chrominance channel Next, step 663 encodes sao_merge_left_flag value for the second chrominance channel After this the control leaves the method 660.

Figure 6G:
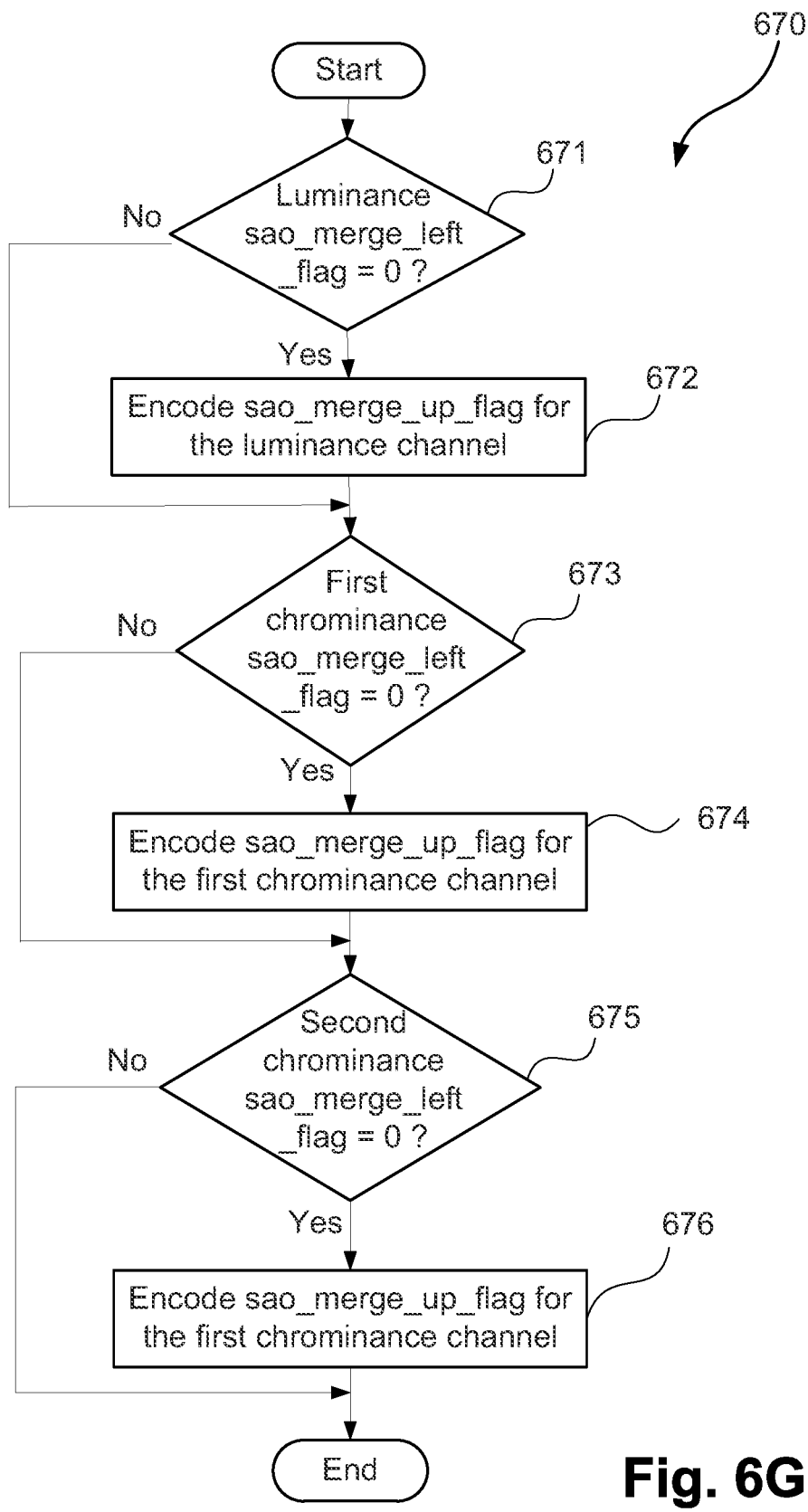
FIG. 6G is a flow diagram of sao_merge_up_flag syntax elements encoder.

A method 670 of encoding sao_merge_up_flag values for the three channels will be described with the reference to FIG. 6G. The method 670 may be used to implement step 654 of the method 650 to encode sao_merge_up_flag syntax elements in syntax structures 420, 480, 4400, 4600 described above. The method 670 starts with step 671. The step 671 checks whether the sao_merge_left_flag value for the luminance channel equals zero. If this is true then control is passed to step 672, otherwise control is passed to step 673. The step 672 encodes sao_merge_up_flag for the luminance channel. The step 673 checks whether the sao_merge_left_flag value for the first chrominance channel equals zero. If this is true then control is passed to step 674, otherwise control is passed to step 675. The step 674 encodes sao_merge_up_flag for the first chrominance channel. The step 675 checks whether the sao_merge_left_flag value for the second chrominance channel equals zero. If this is true then control leaves the method 670, otherwise control is passed to step 676. The step 676 encodes sao_merge_up_flag for the second chrominance channel After this the control leaves the method 670.

Figure 6H:
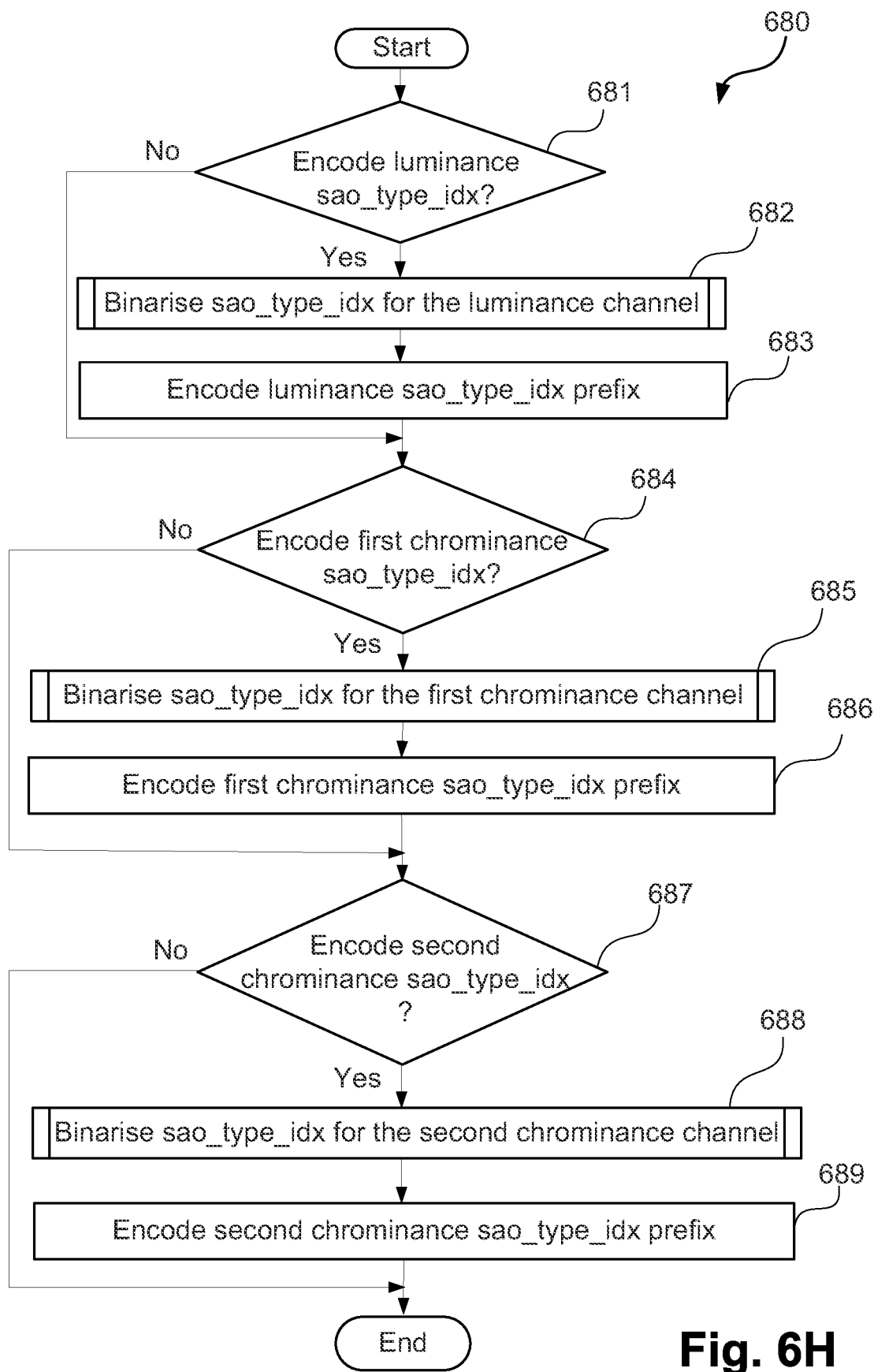
FIG. 6H is a flow diagram of sao_type_idx syntax element encoder.

A method 680 for encoding arithmetically coded portions of sao_type_idx values for the three channels will be described with the reference to FIG. 6H. The method 680 may be used to implement step 655 of the method 650 to encode arithmetically coded portions of sao_type_idx syntax elements in syntax structures 420, 480, 4400, 4600 described above. The method 680 starts with step 681. The step 681 checks whether the sao_merge_left_flag and sao_merge_up_flag values for the luminance channel are both zero. If this is true then control is passed to step 682, otherwise control is passed to step 684. The step 682 binarises sao_type_idx value for the luminance channel Next, step 683 encodes arithmetically coded portion of the binarised value such as portion 428, 488, 4408 into the stream 113. The step 684 checks whether the sao_merge_left_flag and sao_merge_up_flag values for the first chrominance channel are both zero. If this is true then control is passed to step 685, otherwise control is passed to step 687. The step 685 binarises sao_type_idx value for the first chrominance channel. Next, step 686 encodes arithmetically coded portion of the binarised value, such as portion 429, 489, 4409, into the stream 113. The step 687 checks whether the sao_merge_left_flag and sao_merge_up_flag values for the second chrominance channel are both zero. If this is true then control is passed to step 688, otherwise control leaves the method 680. The step 688 binarises sao_type_idx value for the second chrominance channel Next, step 689 encodes arithmetically coded portion of the binarised value, such as portion 430, 490, 4410, into the stream 113.

Figure 6I:
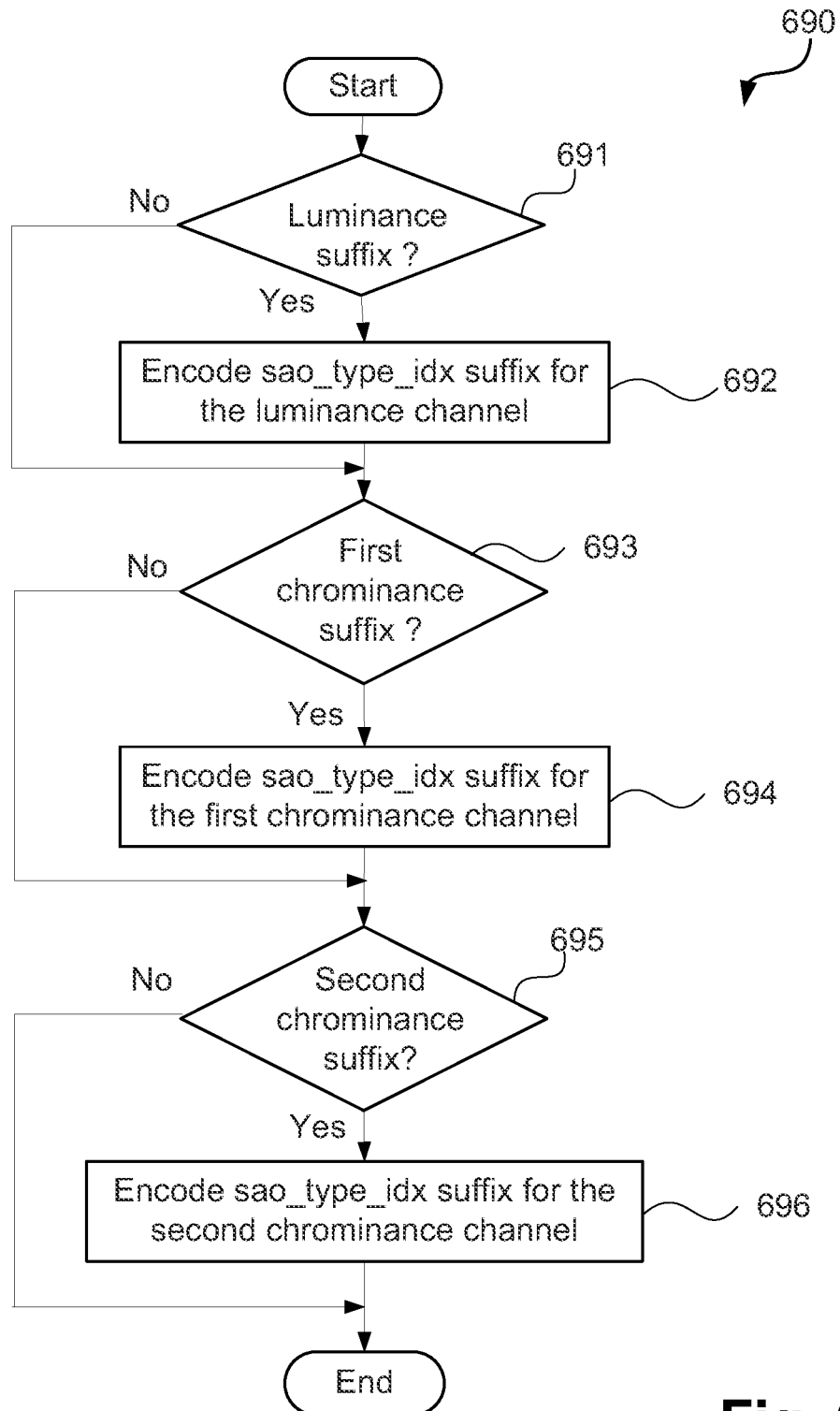
FIG. 6I is a flow diagram of sao_type_idx syntax element encoder.

A method 690 of encoding bypass-coded portions of sao_type_idx values for the three channels will be described with the reference to FIG. 6I. The method 690 may be used to implement step 656 of the method 650 to encode bypass-coded portions of sao_type_idx syntax elements in syntax structures 420, 480, 4400, 4600 described above. The method 690 accepts input of the binarised sao_type_idx values produced on the steps 682, 685, 688 of the method 680. The method 690 starts with step 691. The step 691 checks whether the sao_merge_left_flag and sao_merge_up_ flag values for the luminance channel are both zero. If this is true then control is passed to step 692, otherwise control is passed to step 693. The step 692 encodes bypass-coded portion of the value binarised on step 682, such as portions 431, 491, 4411, into the stream 113. The step 693 checks whether the sao_merge_left_flag and sao_merge_up_ flag values for the first chrominance channel are both zero. If this is true then control is passed to step 694, otherwise control is passed to step 695. The step 694 encodes the bypass-coded portion of the value binarised by step 685, such as portions 432, 492, 4412, into the stream 113. The step 695 checks whether the sao_merge_left_flag and sao_merge_up_flag values for the second chrominance channel are both zero. If this is true then control is passed to step 696, otherwise control leaves the method 690. The step 696 encodes the bypass-coded portion of the value binarised in step 688, such as portions 433, 493, 4413, into the stream 113.

A method 6100 of binarising a sao_type_idx value using the binarisation scheme 500 will be described with the reference to FIG. 6J(1). The method 6100 may be used to implement the steps 682, 685, 688 of the method 680 to binarise sao_type_idx values in syntax structure 420 described above. The method 6100 may also be used to implement step 642 of the method 600 to binarise sao_type_idx in syntax structure 400 described above. The method 6100 starts with the step 6101. The step 6101 checks whether given sao_type_idx value is estimated to be the most probable sao_type_idx value. If this is true then control is passed to step 6102, otherwise control is passed to step 6103. The step 6102 assigns the binary value "0" to the binary element 503 of the portion 501. After the step 6102 the control leaves the method 6100. The step 6103 assigns the binary value "1" to the binary element 503 of the arithmetically coded portion 501. Next, the step 6104 assigns a unique three bit binary code to the binary elements 504, 505, 506 of the bypass-coded portion 502. After this step the control leaves the method 6100.

A method 6200 of binarising a sao_type_idx value using binarisation scheme 540 will be described with the reference to FIG. 6J(2). The method 6200 may be used to implement the steps 682, 685, 688 of the method 680 to binarise sao_type_idx values in syntax structure 480 described above. The method 6200 may also be used to implement the step 642 of the method 640 to binarise sao_type_idx values in syntax structure 460 described above. The method 6200 starts with the step 6201. The step 6201 assigns a unique three bit binary code to given sao_type_idx value. Next, step 6202 assigns one bit value of the assigned three bit code—usually based on the bit position, such as the least significant bit—to the binary element 543 of arithmetically coded portion 541. Next, step 6203 assigns two remaining bits of the assigned binary value to binary elements 544, 545 of the bypass-coded portion 542. After this step the control leaves the method 6200.

Figure 6K:
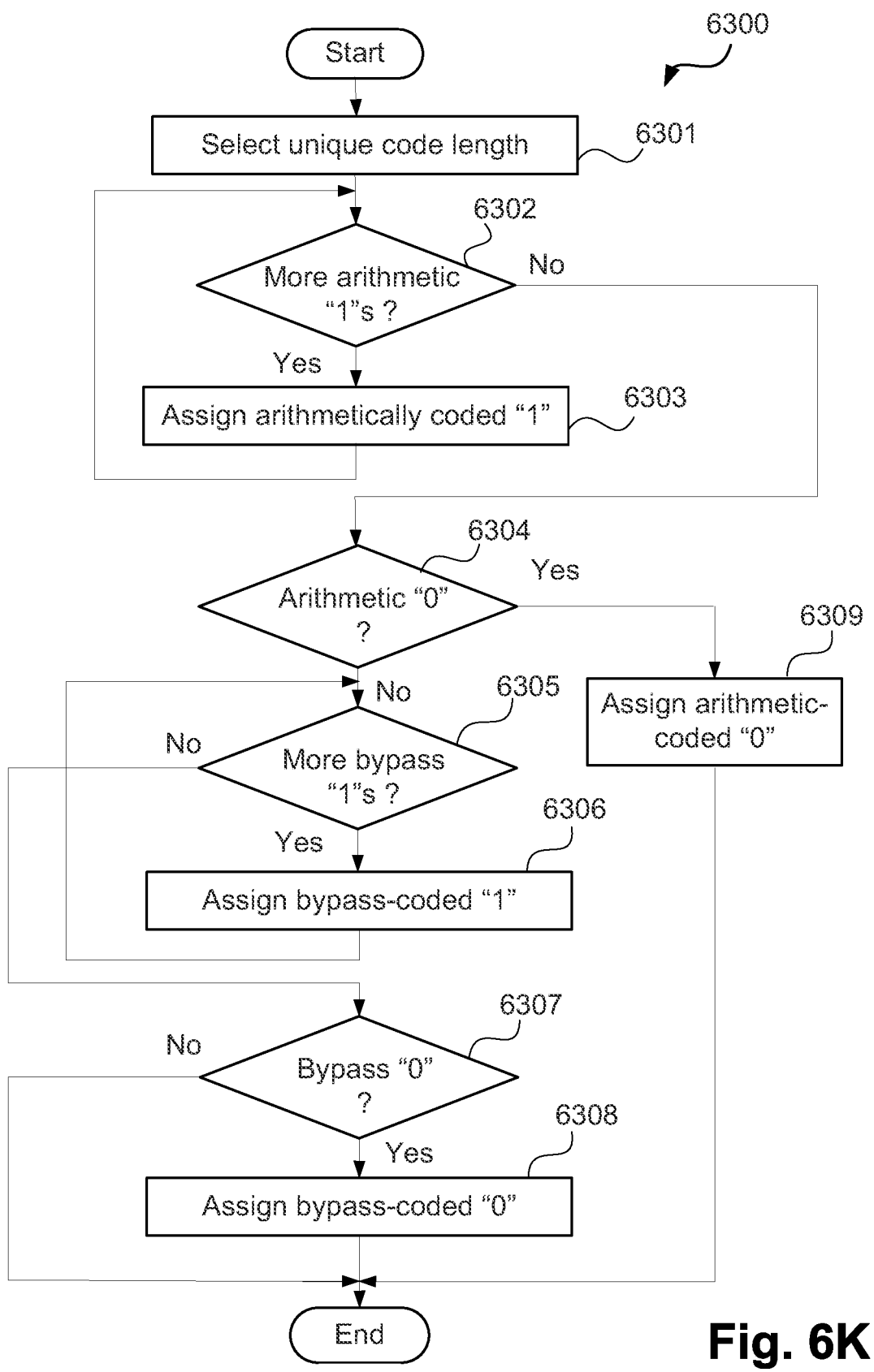
FIG. 6K is a flow diagram of a binarisation process for the binarisation scheme 580.

A method 6300 of binarising a sao_type_idx value using binarisation scheme 580 will be described with the reference to FIG. 6K. The method 6300 may be used to implement the steps 682, 685, 688 of the method 680 to binarise sao_type_idx value in syntax structure 4400 described above. The method 6300 may also be used to implement the step 642 of the method 640 to binarise sao_type_idx value in syntax structure 4200 described above. The method 6300 starts with step 6301. The step 6301 assigns a unique code length L in the range from zero to the maximum length LMAX of binarised sequence 582 to the given sao_type_idx value. Usually L values are assigned so that a shorter L value is assigned to a sao_type_idx value with a higher estimated probability. A parameter T is being used to determine the maximum length of arithmetically coded portion of the binarised value. Next, step 6302 checks if the number ONES of binary "1" values added to the sequence 581 is less than L, and if ONES is less than T. If both conditions are true then the control is passed to step 6303, otherwise the control is passed to step 6304. The step 6303 adds an arithmetically coded binary "1" value 583 to the sequence 581. After the step 6303 the control is passed to the step 6302. The step 6304 checks if ONES is less than T and if ONES is less than LMAX. If these conditions are true the control is passed to step 6309, otherwise the control is passed to step 6305. The step 6309 assigns arithmetically coded binary "0" value to the element 584. After the step 6309 the control leaves the method 6300. The step 6305 checks if ONES is less than L. If this is true then the control is passed to step 6306, otherwise the control is passed to step 6307. The step 6306 adds a bypass-coded binary "1" value 583 to the sequence 581. After the step 6306 the control is passed to the step 6305. The step 6307 checks if ONES is less than LMAX. If this is true then the control is passed to step 6308, otherwise the control leaves the method 6300. The step 6308 assigns a bypass-coded binary "0" value to the element 584. After this step the control leaves the method 6300.

A method 6500 of binarising a sao_type_idx value using binarisation scheme 560 will be described with the reference to FIG. 6L(1). The method 6500 may be used to implement the step 642 of the method 640 to binarise sao_type_idx value in syntax structure 4100 described above. The method 6500 starts with step 6501. The step 6501 assigns a unique code length L in the range from zero to the maximum length LMAX of binarised sequence 582 to the given sao_type_idx value. Usually L values are assigned so that a shorter L value is assigned to a sao_type_idx value with a higher estimated probability. Next, step 6502 checks if the number ONES of binary "1" values added to the sequence 581 is less than L. If this condition is true then the control is passed to step 6503, otherwise the control is passed to step 6504. The step 6503 adds an arithmetically coded binary "1" value 583 to the sequence 581. After the step 6503 the control is passed back to the step 6502. The step 6504 checks if ONES is less than LMAX. If this condition is true then the control is passed to step 6505, otherwise the control leaves method 6500. The step 6505 assigns arithmetically coded binary "0" value to the element 584. After the step 6505 the control leaves the method 6300.

A method 6600 of binarising a sao_type_idx value using binarisation scheme 520 will be described with the reference to FIG. 6L(2). The method 6600 may be used to implement the step 642 of the method 640 to binarise sao_type_idx value in syntax structure 440 described above. The method 6600 starts by the step 6601. At the step 6601 a unique three bit code is assigned to the sao_type_idx value. Next, step 6602 assigns the assigned three bit code to the binary elements 521, 522, 523. After this step the control leaves the method 6600.

Figure 7A:
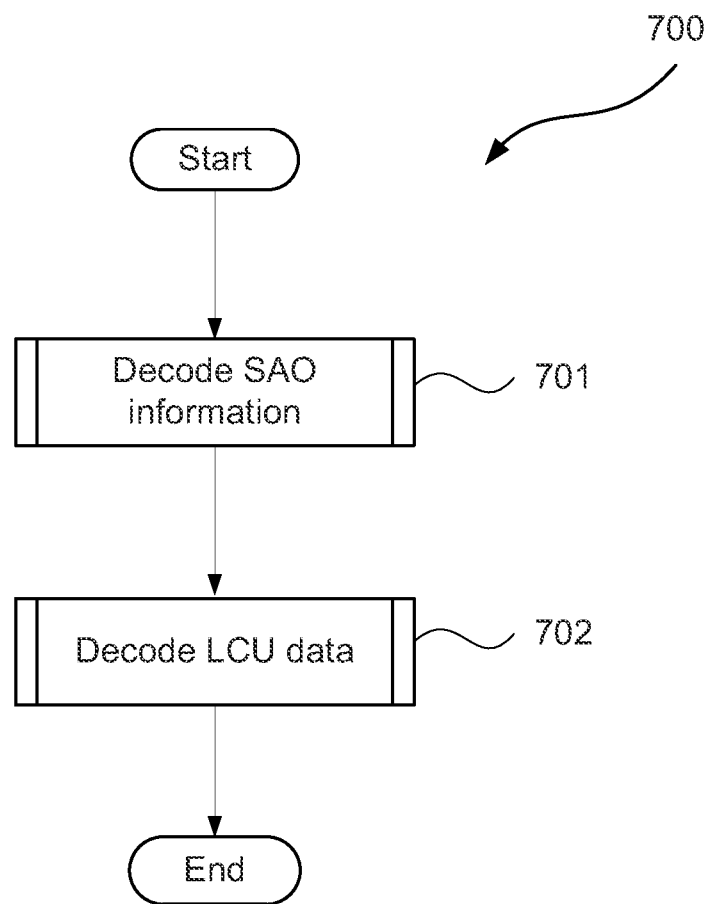
FIG. 7A is a flow diagram of an LCU decoder.

A method 700 of decoding LCU data from the stream 113 will be described with the reference to FIG. 7A. In step 701, SAO information is decoded. In step 702, LCU structural, residual, prediction and other information is decoded.

Figure 7B:
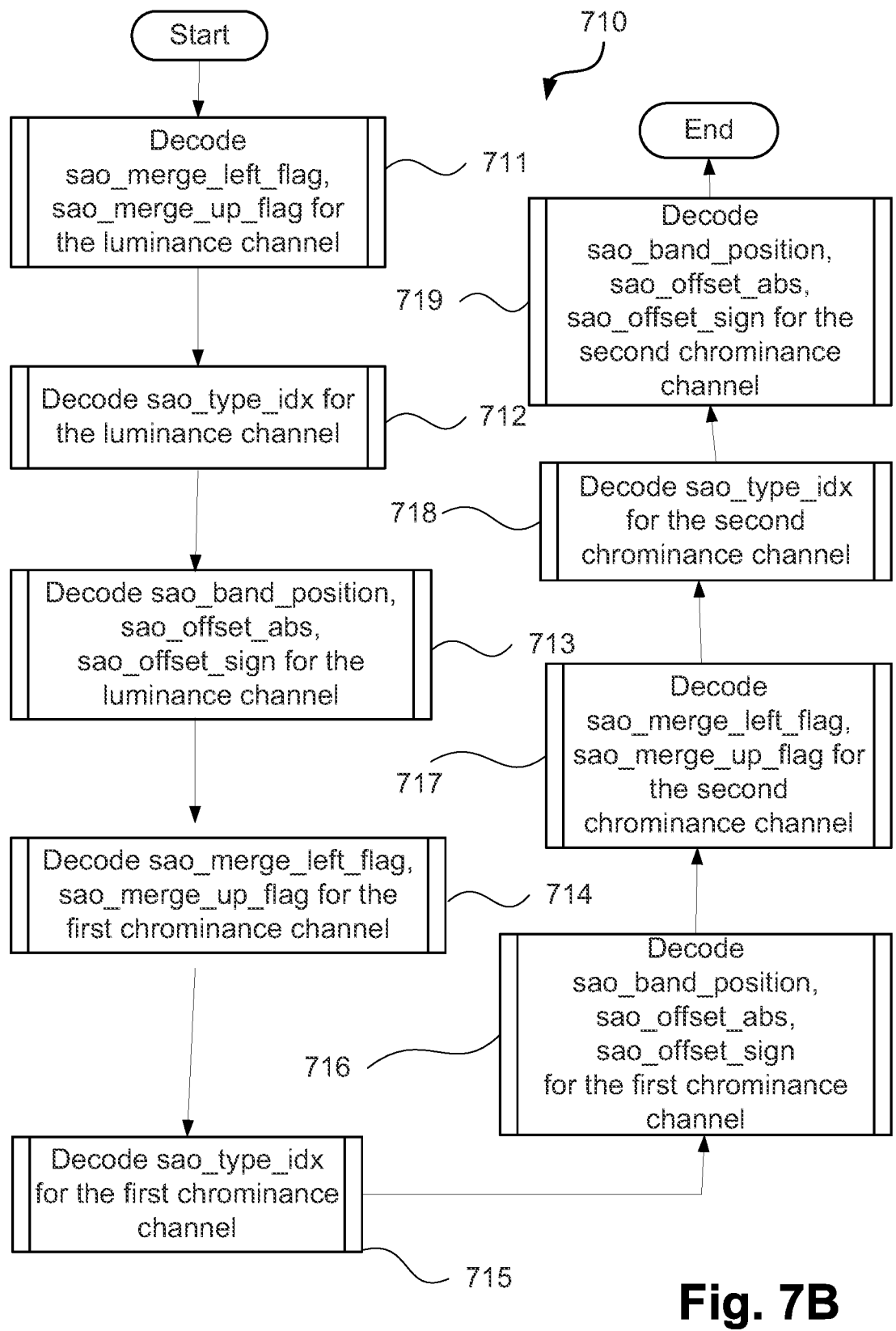
FIG. 7B is a flow diagram of an LCU SAO information decoder.

A method 710 of decoding SAO information will be described with the reference to FIG. 7B.

The method 710 may be used to implement the step 701 of the method 700 to decode the blocks 401, 441, 461, 4101, 4201 described above. The method 710 starts with step 711 where the sao_merge_left_flag and sao_merge_up_flag values for the luminance channel are decoded. Step 712 decodes sao_type_idx value for the luminance channel Step 713 decodes sao_band_position, sao_offset_abs and sao_offset_sign values for the luminance channel. Step 714 decodes sao_merge_left_flag and sao_merge_up_flag values for the first chrominance channel. Step 715 decodes sao_type_idx value for the first chrominance channel. Step 716 decodes sao_band_position, sao_offset_abs and sao_offset_sign values for the first chrominance channel. Step 717 decodes sao_merge_left_flag and sao_merge_up_flag values for the second chrominance channel Step 718 decodes sao_type_idx value for the second chrominance channel Step 719 decodes sao_band_position, sao_offset_abs and sao_offset_sign values for the second chrominance channel. The order or implementation of the steps 711-719 may be varied depending upon the particular implementation.

Figure 7C:
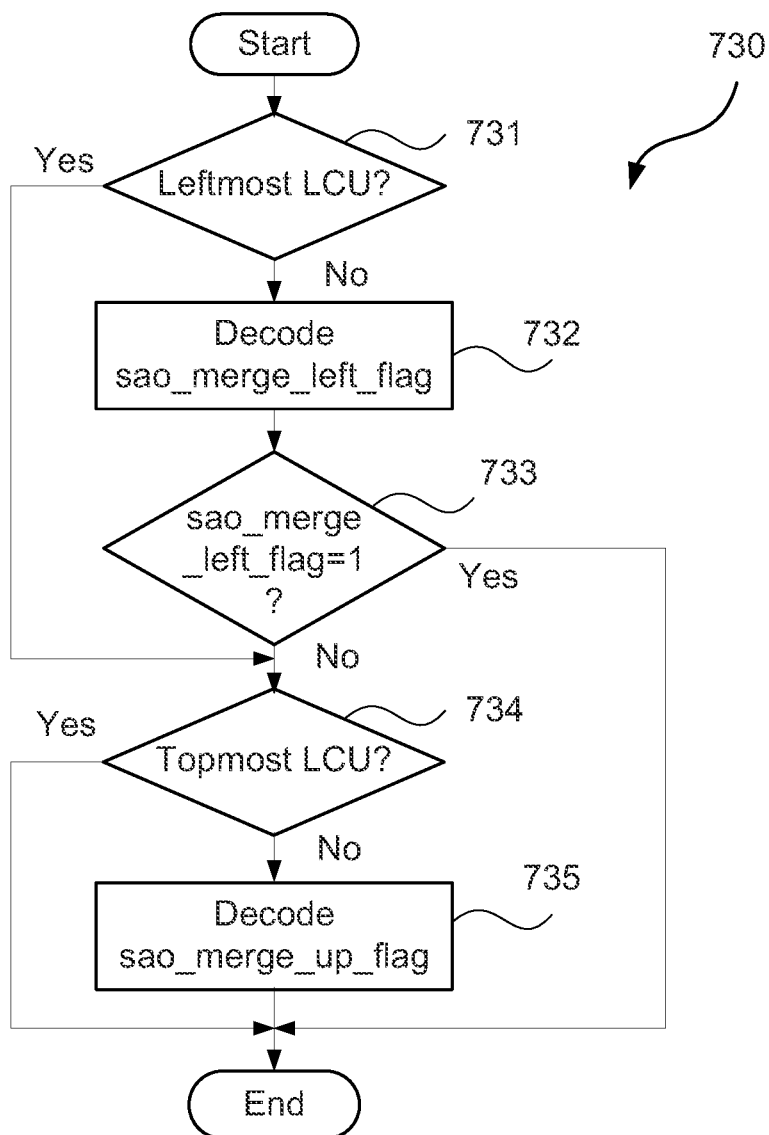
FIG. 7C is a flow diagram of sao_merge_left_flag and sao_merge_up_flag syntax elements decoder.

A method 730 of decoding sao_merge_left_flag and sao_merge_up_flag values for a single channel will be described with the reference to FIG. 7C. The method 730 may be used to implement steps 711, 714, 717 of the method 710 to decode sao_merge_left_flag and sao_merge_up_flag syntax elements in syntax structures 400, 440, 460, 4100, 4200, 4600 described above. The method 730 starts at step 731 which checks whether the LCU is at the leftmost position in the frame. If this condition is true then control is passed to step 734, otherwise control is passed to step 732. The step 732 decodes sao_merge_left_flag from the stream 113. Step 733 tests whether the value of sao_merge_left_flag equals one. If this condition is true the control leaves the method 730. Otherwise the control is passed to step 734. Step 734 decodes sao_merge_up_flag from the stream 113. After this step the control leaves the method 730.

Figure 7D:
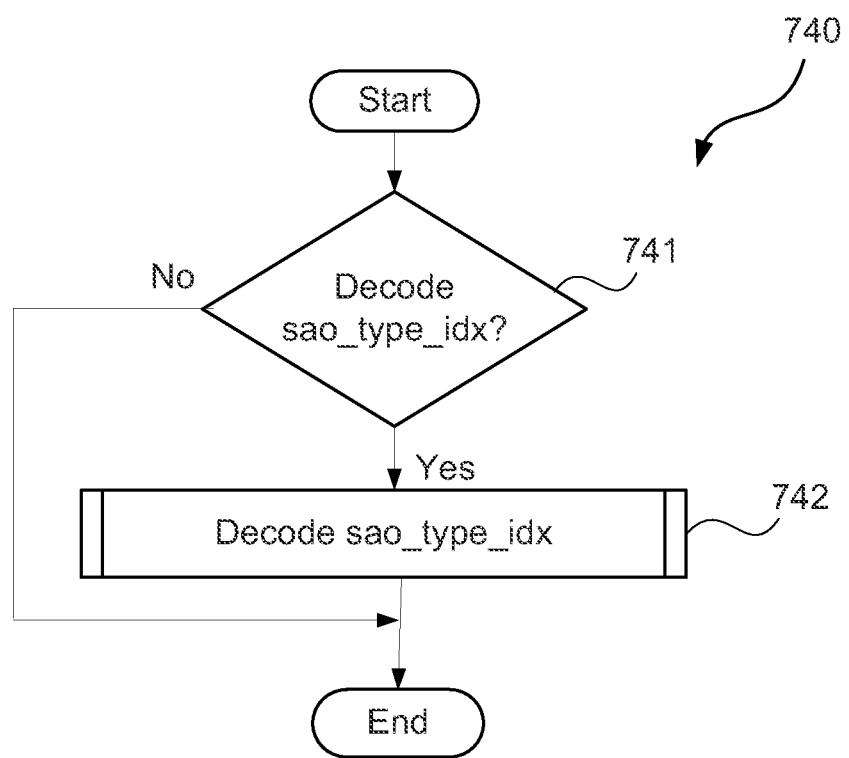
FIG. 7D is a flow diagram of sao_type_idx syntax element decoder.

A method 740 of decoding sao_type_idx syntax element for a single channel will be described next with the reference to FIG. 7D. The method 740 may be used to implement steps 712, 715, 718 of the method 710 to decode sao_type_idx syntax element in syntax structures 400, 440, 460, 4100, 4200, 4600 described above. The method 740 starts by step 741. The step 741 checks to determine whether decoding of sao_type_idx is required by checking whether the sao_merge_left_flag and sao_merge_up_flag values for the given channel are both equal to zero. If this is true then the control is passed to step 742, otherwise the control leaves method 740. The step 742 decodes and de-binarises sao_type_idx value. After the step 743 the control leaves the method 740.

Figure 7E:
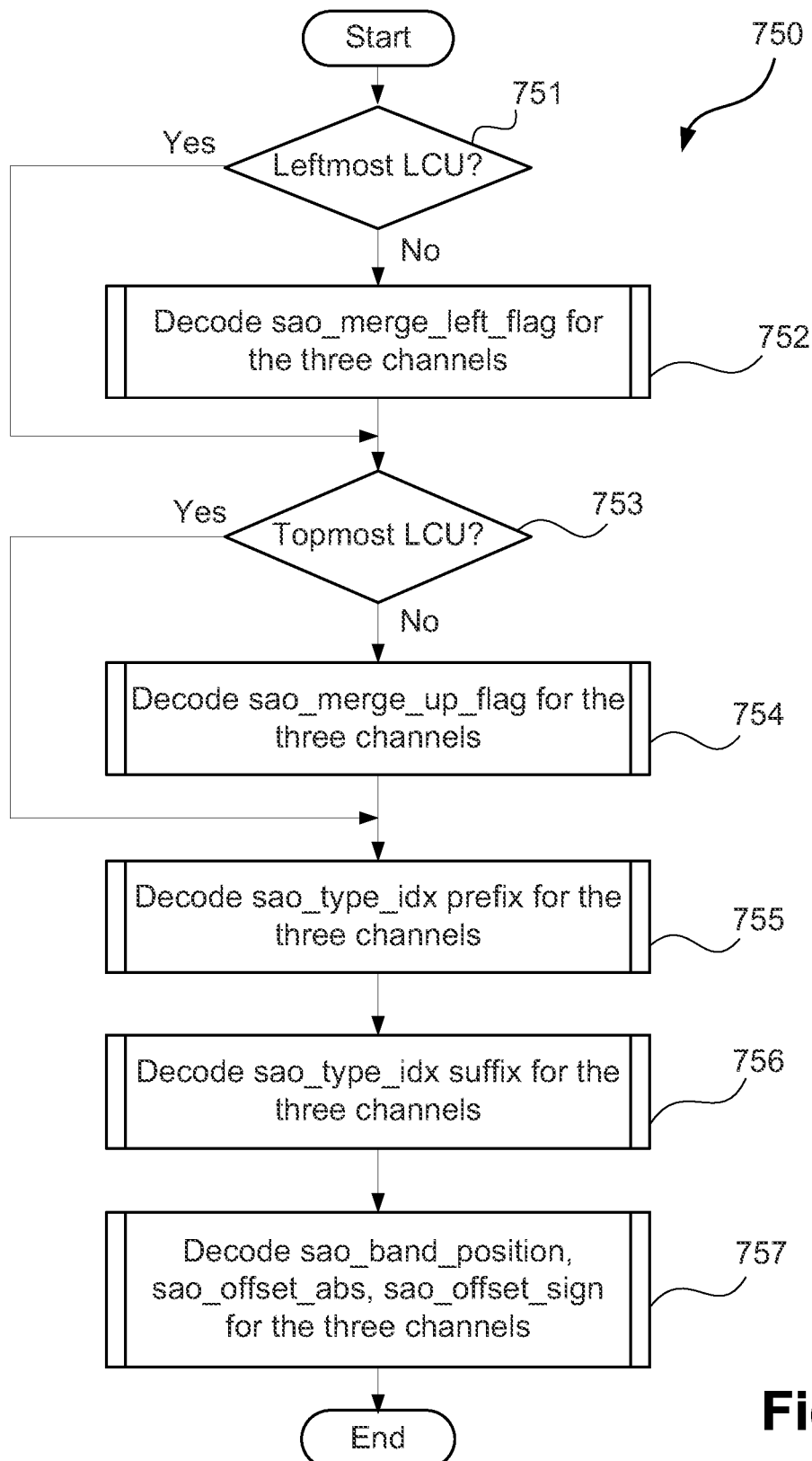
FIG. 7E is a flow diagram of an LCU SAO information decoder.

A method 750 of decoding SAO information will be described with the reference to FIG. 7E. The method 750 may be used to implement the step 701 of the method 700 to decode the blocks 421, 481, 4401, 4601 described above. The method 750 starts with step 751 which checks whether this is the leftmost LCU in the frame. If this is true then control is passed to step 753, otherwise control is passed to step 752. Step 752 decodes sao_merge_left_flag values for the three channels. The step 753 checks whether this is the topmost LCU in the frame. If this is true then control is passed to step 755, otherwise control is passed to step 754. The step 754 decodes sao_merge_up_flag values for the three channels. The step 755 decodes the arithmetically encoded portions of sao_type_idx values for the three channels. The step 756 decodes the bypass-encoded portions of sao_type_idx values for the three channels. Next, step 757 decodes sao_band_position, sao_offset_abs and sao_offset_sign values for the three channels.

Figure 7F:
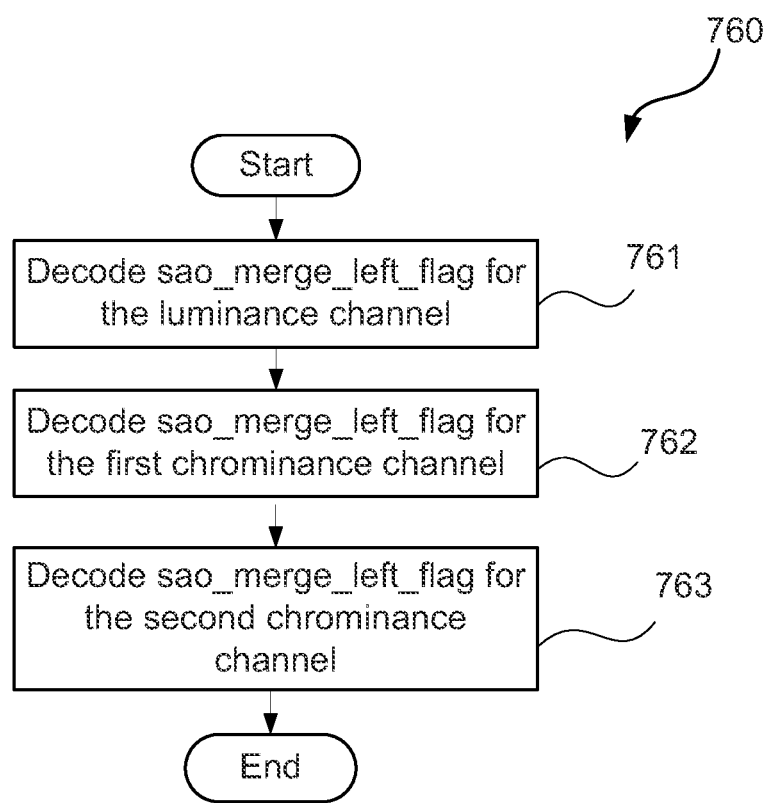
FIG. 7F is a flow diagram of sao_merge_left_flag syntax elements decoder.

A method 760 of decoding sao_merge_left_flag values for the three channels will be described with the reference to FIG. 7F. The method 760 may be used to implement step 752 of the method 750 to decode sao_merge_left_flag syntax elements in syntax structures 420, 480, 4400, 4600 described above. The method 760 starts by step 761 which decodes sao_merge_left_flag value for the luminance channel. Next, step 762 decodes sao_merge_left_flag value for the first chrominance channel Next, step 763 decodes sao_merge_left_flag value for the second chrominance channel After this the control leaves the method 760.

Figure 7G:
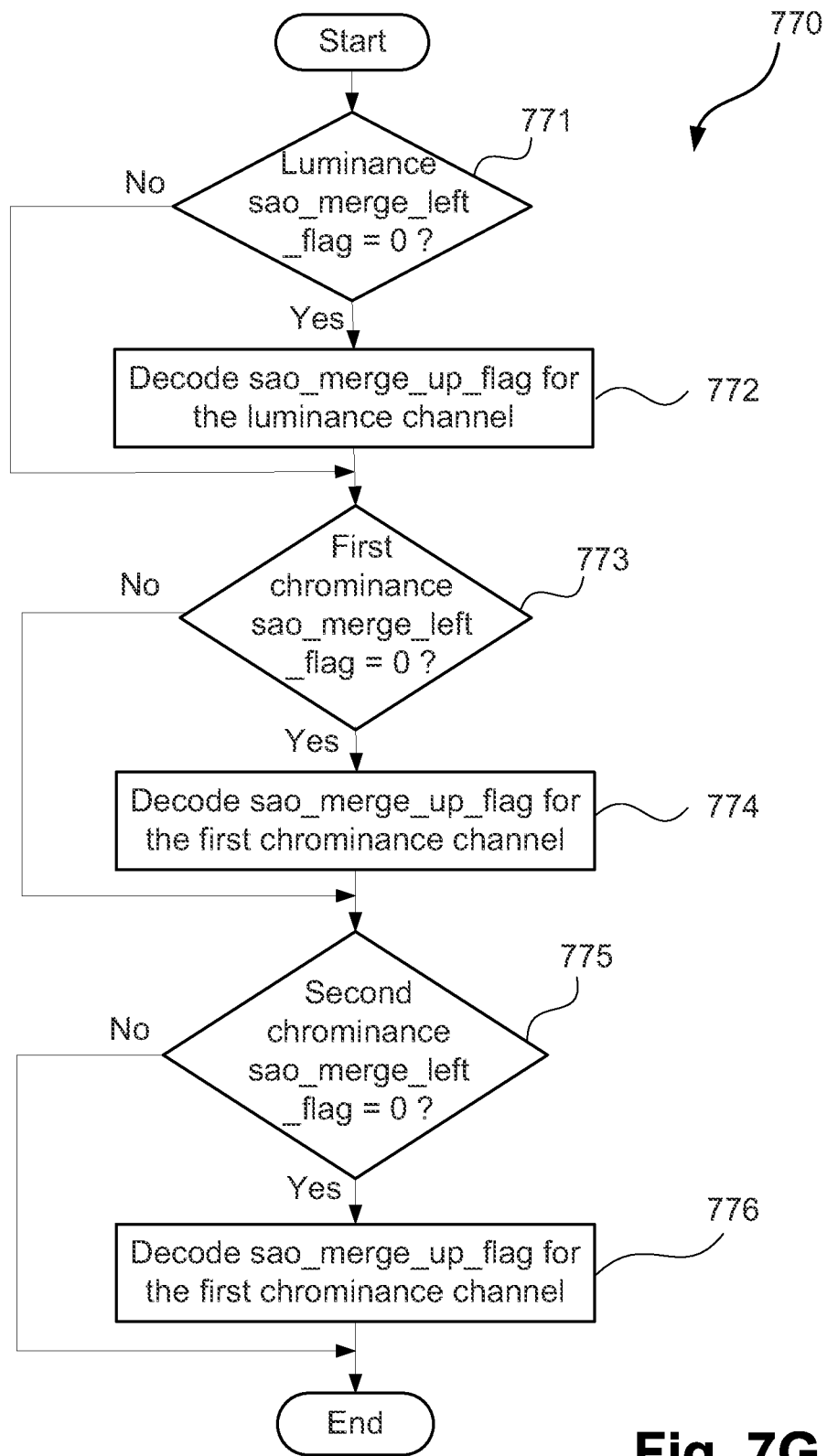
FIG. 7G is a flow diagram of sao_merge_up_flag syntax elements decoder.

A method 770 of decoding sao_merge_up_flag values for the three channels will be described with the reference to FIG. 7G. The method 770 may be used to implement step 754 of the method 750 to decode sao_merge_up_flag syntax elements in syntax structures 420, 480, 4400, 4600 described above. The method 770 starts with step 771. The step 771 checks whether the sao_merge_left_flag value for the luminance channel equals zero. If this is true then control is passed to step 772, otherwise control is passed to step 773. The step 772 decodes sao_merge_up_flag for the luminance channel. The step 773 checks whether the sao_merge_left_flag value for the first chrominance channel equals zero. If this is true then control is passed to step 774, otherwise control is passed to step 775. The step 774 decodes sao_merge_up_flag for the first chrominance channel. The step 775 checks whether the sao_merge_left_flag value for the second chrominance channel equals zero. If this is true then control leaves the method 770, otherwise control is passed to step 776. The step 776 decodes sao_merge_up_flag for the second chrominance channel After this the control leaves the method 770.

Figure 7H:
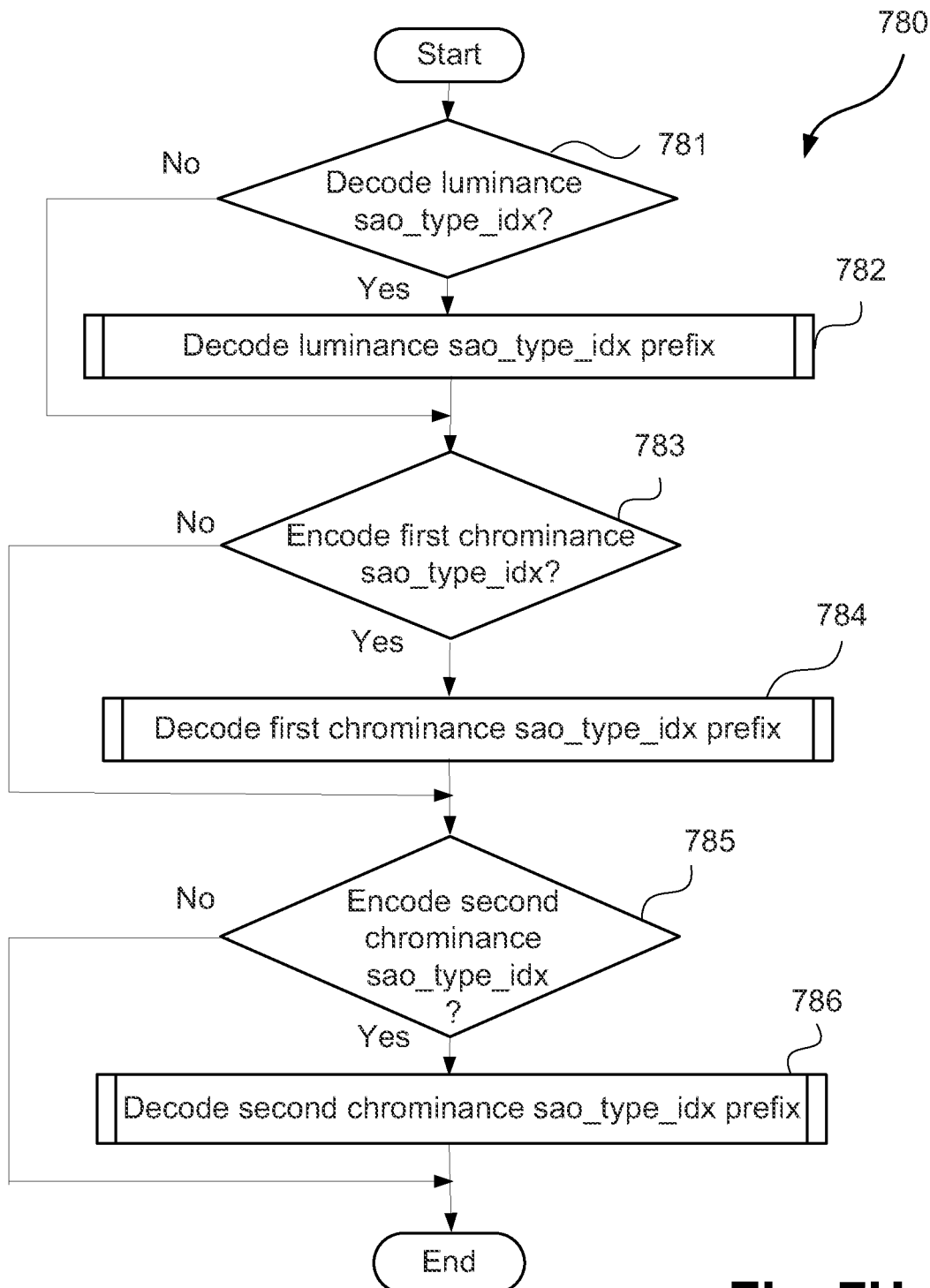
FIG. 7H is a flow diagram of sao_type_idx syntax element decoder.

A method 780 for decoding arithmetically coded portions of sao_type_idx values for the three channels will be described with the reference to FIG. 7H. The method 780 may be used to implement step 755 of the method 750 to decode arithmetically coded portions of sao_type_idx syntax elements in syntax structures 420, 480, 4400, 4600 described above. The method 780 starts with step 781. The step 781 checks whether the sao_merge_left_flag and sao_merge_up_flag values for the luminance channel are both zero. If this is true then control is passed to step 782, otherwise control is passed to step 783. The step 782 decodes arithmetically coded portion of sao_type_idx binarised value, such as portion 428, 488, 4408, from the stream 113 for the luminance channel. The step 783 checks whether the sao_merge_left_flag and sao_merge_up_flag values for the first chrominance channel are both zero. If this is true then control is passed to step 784, otherwise control is passed to step 785. The step 784 decodes arithmetically coded portion of sao_type_idx binarised value such as portion 429, 489, 4409 from the stream 113 for the first chrominance channel. The step 785 checks whether the sao_merge_left_flag and sao_merge_up_flag values for the second chrominance channel are both zero. If this is true then control is passed to step 786, otherwise control leaves the method 780. The step 786 decodes arithmetically coded portion of sao_type_idx binarised value, such as portion 430, 490, 4410, from the stream 113 for the second chrominance channel.

Figure 7I:
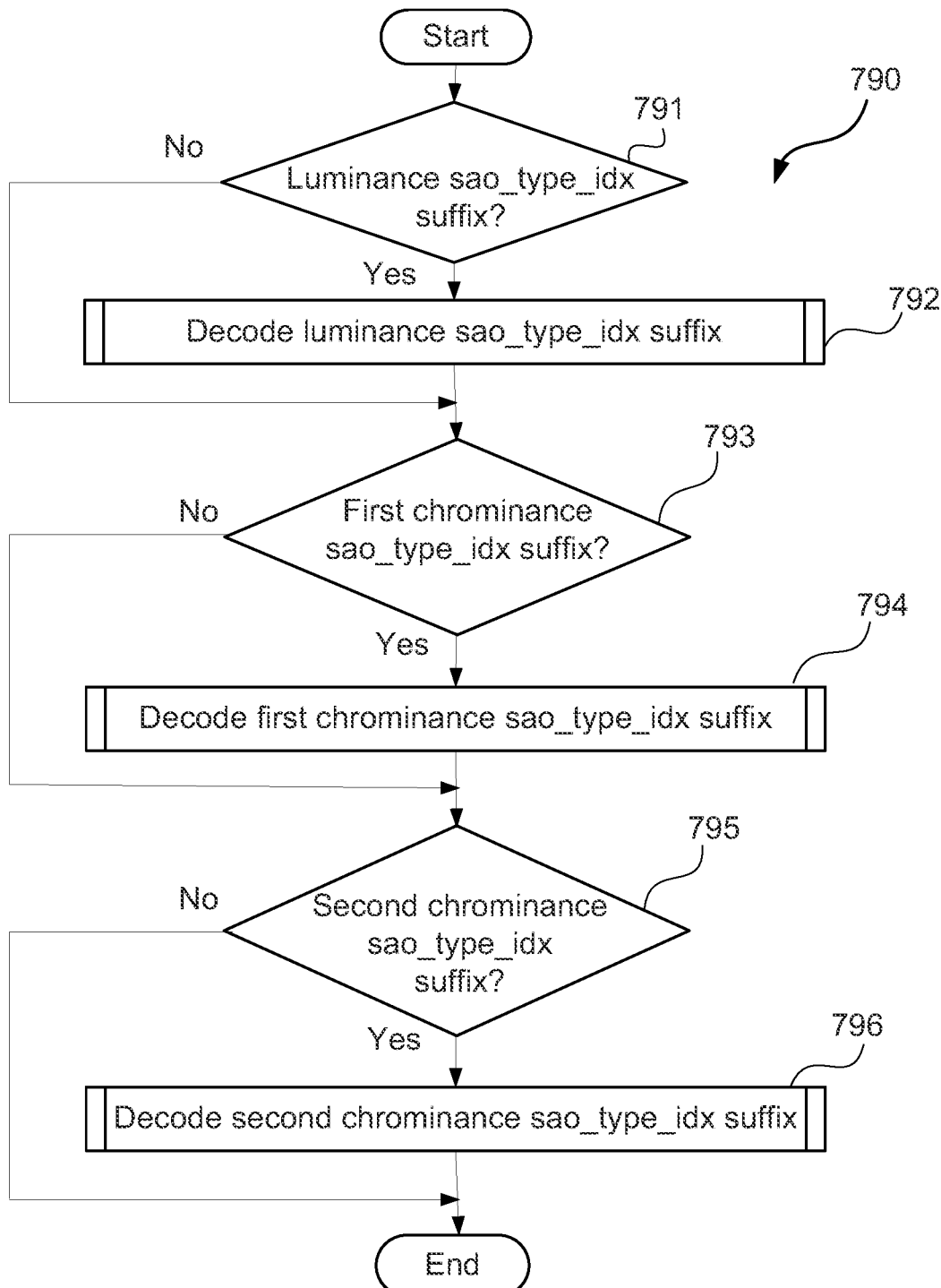
FIG. 7I is a flow diagram of sao_type_idx syntax element decoder.

A method 790 of decoding bypass-coded portions of sao_type_idx values for the three channels will be described with the reference to FIG. 7I. The method 790 may be used to implement step 756 of the method 750 to decode bypass-coded portions of sao_type_idx syntax elements in syntax structures 420, 480, 4400, 4600 described above. The method 790 accepts as input the portions of sao_type_idx values decoded on the steps 782, 784, 786 of the method 780. The method 790 starts with step 791. The step 791 checks whether the sao_merge_left_flag and sao_merge_up_ flag values for the luminance channel are both zero. If this is true then control is passed to step 792, otherwise control is passed to step 793. The step 792 decodes bypass-coded portion of the sao_type_idx value for the luminance channel, such as portion 431, 491, 4411, from the stream 113 and restores sao_type_idx value for the luminance channel. The step 793 checks whether the sao_merge_left_flag and sao_merge_up_flag values for the first chrominance channel are both zero. If this is true then control is passed to step 794, otherwise control is passed to step 795. The step 794 decodes bypass-coded portion of the sao_type_idx value for the first chrominance channel, such as portion 432, 492, 4412, from the stream 113 and restores sao_type_idx value for the first chrominance channel. The step 795 checks whether the sao_merge_left_flag and sao_merge_up_flag values for the second chrominance channel are both zero. If this is true then control is passed to step 796, otherwise the control leaves the method 790. The step 796 decodes bypass-coded portion of the sao_type_idx value for the second chrominance channel such as portions 433, 493, and 4413 from the stream 113 and restores sao_type_idx value for the second chrominance channel.

A method 7100 of decoding from the stream 113 and de-binarising a sao_type_idx value using binarisation scheme 500 with be described with the reference to FIG. 7J(1). The method 7100 may be used to implement step 742 of the method 700 to decode and de-binarise sao_type_idx value in syntax structure 400 described above. The method 7100 starts with the step 7101. The step 7101 decodes arithmetically encoded bin from the stream 113. Next, step 7102 check whether the decoded bin value is "1". If this is true then the control is passed to step 7103, otherwise control is passed to step 7104. The step 7103 decodes three bypass encoded bins from the stream 113. The step 7104 returns a sao_type_idx value that corresponds to the bins decoded on steps 7101, 7103 in accordance with the binarisation scheme 500.

A method 7200 of decoding from the stream 113 and de-binarising a sao_type_idx value using binarisation scheme 540 with be described with the reference to FIG. 7J(2). The method 7200 may be used to implement the step 742 of the method 740 to decode and de-binarise sao_type_idx values in syntax structure 460 described above. The method 7200 starts with the step 7201. The step 7201 decodes an arithmetically encoded bin from the stream 113. Next, step 7202 decodes two bypass-encoded bins from the stream 113. Next, step 7203 returns a sao_type_idx value that corresponds to the bins decoded on steps 7201, 7202 in accordance with the binarisation scheme 540.

Figure 7K:
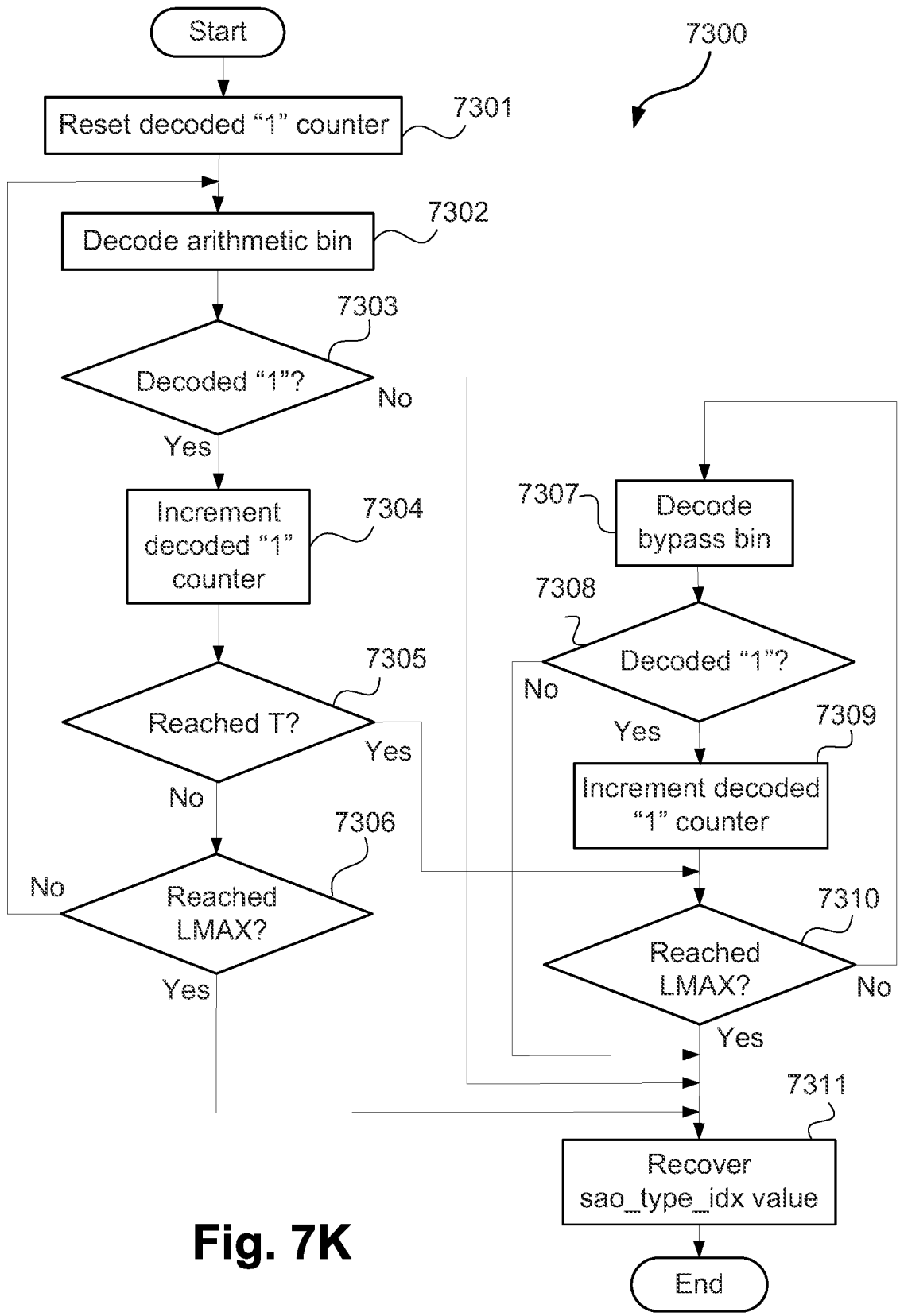
FIG. 7K is a flow diagram of a decoding and de-binarisation process for the binarisation scheme 580.

A method 7300 of decoding and de-binarising a sao_type_idx value using binarisation scheme 580 will be described with the reference to FIG. 7K. The method 7300 may be used to implement the step 742 of the method 740 to decode and de-binarise sao_type_idx value in syntax structure 4200 described above. The method 7300 starts with step 7301. The step 7301 resets to zero a counter ONECNT of decoded "1" values. Next, step 7302 decodes an arithmetically encoded bin from the stream 113. Next, step 7303 checks if the decoded bin value is "1". If this is true then control is passed to step 7304, otherwise control is passed to step 7311. The step 7304 increments the ONECNT counter by one. Next, step 7305 checks whether the ONECNT counter is equal to the maximum number T of arithmetically coded bins for a binarised value. If this is true, the control is passed to step 7310, otherwise the control is passed to step 7306. The step 7306 check whether the ONECNT counter is equal to the maximum length LMAX of binarised sequence 582. If this is true, then the control is passed to the step 7311, otherwise the control is passed to the step 7302. The step 7310 checks whether the ONECNT counter is equal to the maximum length LMAX. If this is true, the control is passed to the step 7311, otherwise the control is passed to the step 7307. The step 7307 decoded a bypass-coded bin. Next, step 730 checks whether the decoded bin equals "1". If this is true, the control is passed to step 7309, otherwise the control is passed to the step 7311. The step 7309 increments the ONECNT counter and passes the control to the step 7310. The step 7311 returns a sao_type_idx value that corresponds to the ONECNT counter value in accordance with the binarisation scheme 580.

A method 7500 of decoding and de-binarising a sao_type_idx value using binarisation scheme 560 will be described with the reference to FIG. 7L(1). The method 7500 may be used to implement the step 742 of the method 740 to decode and de-binarise sao_type_idx value in syntax structure 4100 described above. The method 7500 starts with step 7501. The step 7501 resets a counter ONECNT of decoded "1" bins to zero. Next, step 7502 decodes an arithmetically encoded bin from the stream 113. Next, step 7503 checks whether the decoded bin equals "1". If this is true, the control is passed to the 7504, otherwise the control is passed to step 7506. The step 7504 increments the ONECNT counter by one. Next, step 7505 checks whether the ONECNT counter value is equal to the maximum length LMAX of binarised sequence 582. If this is true, then the control is passed to the step 7506, otherwise the control is passed to step 7502. The step 7506 returns a sao_type_idx value that corresponds to the ONECNT counter value in accordance with the binarisation scheme 560.

A method 7600 of decoding and de-binarising a sao_type_idx value using binarisation scheme 520 will be described with the reference to FIG. 7L(2). The method 7600 may be used to implement the step 742 of the method 740 to decode and de-binarise sao_type_idx value in syntax structure 440 described above. The method 7600 starts by the step 7601. The step 7601 decodes three arithmetically encoded bins from the stream 113. Next, step 7602 returns a sao_type_idx value that corresponds to the values of bins decoded on the step 7601 in accordance with the binarisation scheme 520.

A method 7700 of decoding from the stream 113 the arithmetically encoded portion 501 of a sao_type_idx value using binarisation scheme 500 will be described with the reference to FIG. 7M(1). The method 7700 may be used to implement the steps 782, 784, 786 of the method 780 to decode arithmetically encoded portions 428, 429, 430 of sao_type_idx values in syntax structure 420 described above. The method 7700 starts with step 7701 by decoding an arithmetically encoded bin from the stream 113. Next, step 7702 stores the decoded value in a storage location accessible to the step 7801 of method 7800 described below. After this, the control leaves the method 7700.

A method 7800 of decoding from the stream 113 bypass-coded portion 502 of a sao_type_idx value using binarisation scheme 500 will be described with the reference to FIG. 7M(2). The method 7800 may be used to implement the steps 792, 794, 796 of the method 790 to decode bypass-encoded portions 431, 432, 433 of sao_type_idx values in syntax structure 420. The method 7800 starts with the step 7801. The step 7801 checks whether the value decoded on the step 7701 of the method 7700 equals "1". If this is true, then the control is passed to step 7802, otherwise the control is passed to step 7803. The step 7802 decodes three bypass encoded bins from the stream 113. The step 7803 returns a sao_type_idx value that corresponds to the bins decoded on steps 7701, 7802 in accordance with the binarisation scheme 500.

A method 7900 of decoding from the stream 113 arithmetically encoded portion 541 of a sao_type_idx value using binarisation scheme 540 will be described with the reference to FIG. 7N(1). The method 7900 may be used to implement the steps 782, 784, 786 of the method 780 to decode arithmetically encoded portions 488, 489, 490 of sao_type_idx values in syntax structure 480 described above. The method 7900 starts with the step 7901. The step 7901 decodes an arithmetically encoded bin from the stream 113. Next, step 7902 stores the decoded value in a storage location accessible to step 7921 of the method 7920 described below. After this, the control leaves the method 7900.

A method 7920 of decoding from the stream 113 bypass-coded portion 542 of a sao_type_idx value using binarisation scheme 540 will be described with the reference to FIG. 7N(2). The method 7920 may be used to implement the steps 792, 794, 796 of the method 790 to decode bypass-encoded portions 491, 492, 493 of sao_type_idx values in syntax structure 480 described above. The method 7920 starts with the step 7921. The step 7921 decodes two arithmetically encoded bins from the stream 113. Next, the step 7922 returns a sao_type_idx value that corresponds to the bins decoded on steps 7901, 7921 in accordance with the binarisation scheme 540.

Figure 7O:
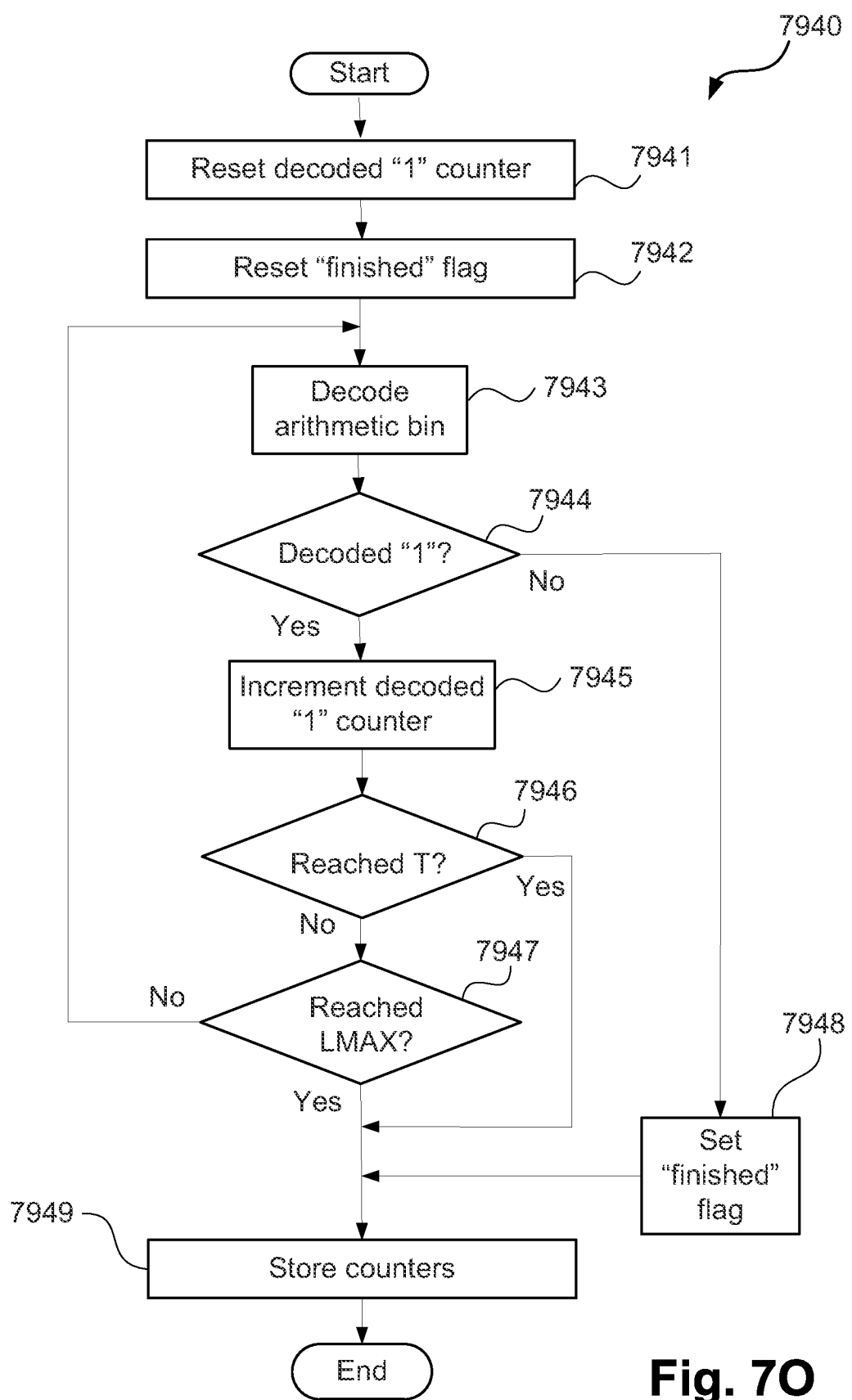
FIGS. 7O and 7P are flow diagrams of the decoding and de-binarisation processes respectively for the binarisation scheme 580.

A method 7940 of decoding from the stream 113 arithmetically coded portion 591 of the sequence 582 will be described with the reference to FIG. 7O. The method 7940 may be used to implement the steps 782, 784, 786 of the method 780 to decode arithmetically encoded portions 4408, 4409, 4410 of sao_type_idx values in syntax structure 4400 described above. The method 7940 starts with step 7941. The step 7941 reset to zero a counter ONECNT of decoded "1" values. Next, step 7942 resets to zero a flag FINISHED indicating that a "0" value was decoded from the stream. Next, step 7943 decodes an arithmetically encode bin from the stream 113. Next, Step 7944 checks whether the decoded bin value equals "1". If this is true, then the control is passed to step 7945, otherwise the control is passed to step 7948. The step 7945 increments the counter ONECNT by one. Next, step 7946 checks whether the value of the counter ONECNT is equal to the maximum number T of arithmetically coded bins for a binarised value. If this is true, then the control is passed to step 7949, otherwise the control is passed to step 7947. The step 7947 checks whether the value of the counter ONECNT is equal to the maximum length LMAX of binarised sequence 582. If this is true the control is passed to step 7949, otherwise the control is passed to step 7943. The step 7948 sets the flag FINISHED to one. The step 7949 stores the values of the flag FINISHED and the counter ONECNT is a storage location accessible to the steps of method 7960 (described below). After the step 7949 the control leaves the method 7940.

Figure 7P:
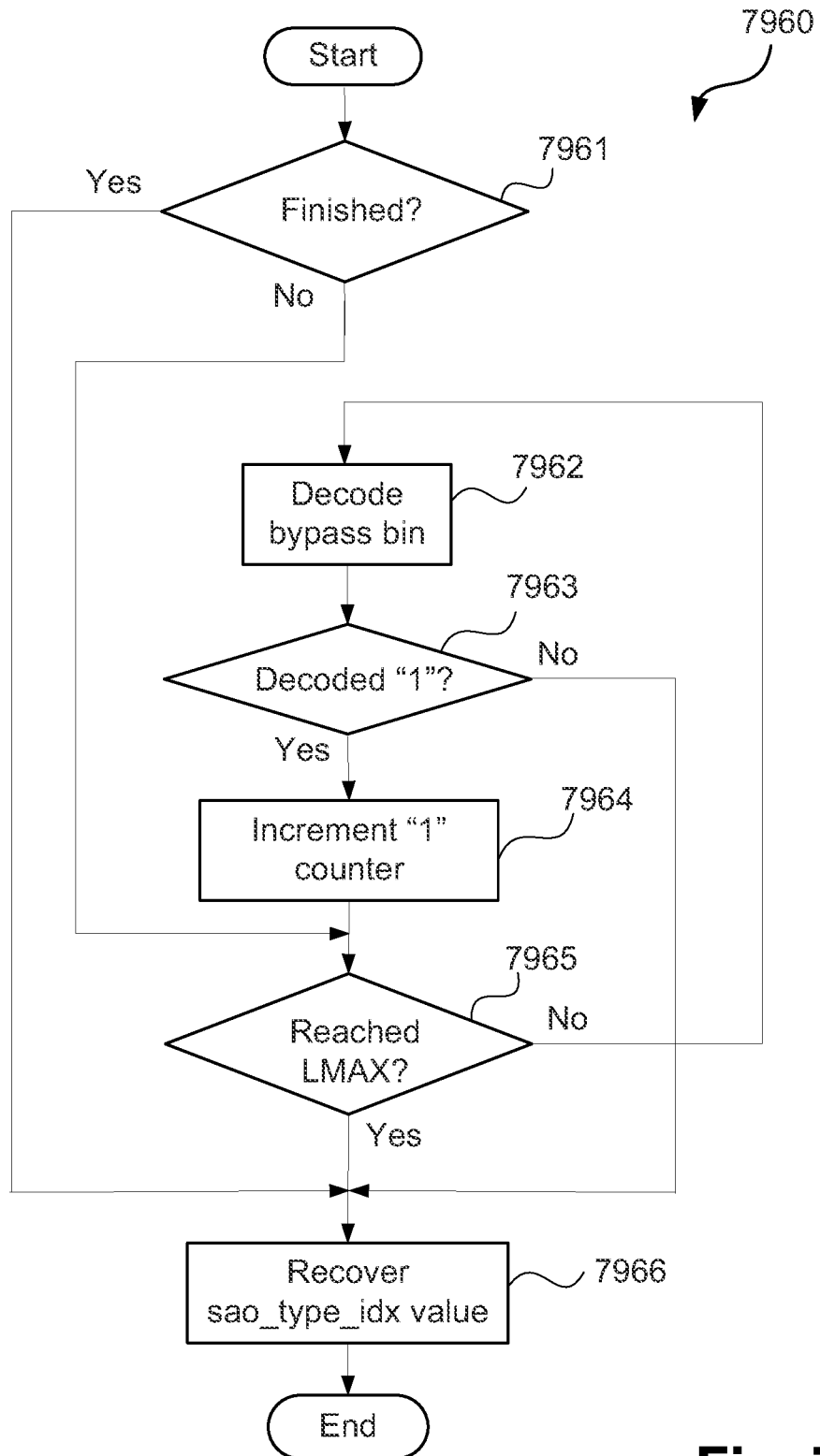

A method 7960 of decoding from the stream 113 bypass-coded portion 592 of the sequence 582 will be described next with the reference to FIG. 7P. The method 7960 may be used to implement the steps 792, 794, 796 of the method 790 to decode bypass-encoded portions 4411, 4412, 4413 of sao_type_idx values in syntax structure 4400 described above. The method 7960 starts with step 7961. The step 7961 checks whether the value of the flag FINISHED set in the method 7940 is equal to one. If this is true, then the control is passed to step 7966, otherwise the control is passed to step 7965. The step 7965 checks whether the value of the counter ONECNT is equal to the maximum length LMAX of binarised sequence 582. If this is true, then the control is passed to the step 7966, otherwise the control is passed to step 7962. The step 7962 decodes a bypass coded bin from the stream 113. Next, step 7963 checks whether the decoded value is "1". If this is true, then the control is passed to step 7964, otherwise the control is passed to step 7966. The step 7964 increments the counter ONECNT by one. The step 7965 checks whether the value of the counter ONECNT is equal to the maximum length LMAX of binarised sequence 582. If this is true, then the control is passed to the step 7966, otherwise the control is passed to the step 7962. The step 7966 returns a sao_type_idx value that corresponds to the value of the counter ONECNT in accordance with the binarisation scheme 580.

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

The invention claimed is:

1. A method of decoding sample adaptive offset type information from a received stream of video data, the method comprising:

determining a value in one bin of sample adaptive offset type information by decoding arithmetically encoded data from the stream of video data, the determined value in the one bin indicating whether sample adaptive offset is applied or not;

determining a fixed length portion of the sample adaptive offset type information, the fixed length portion being subsequent to the one bin in the sample adaptive offset type information, the fixed length portion being determined by decoding only bypass-encoded data from the stream of video data if the determined value in the one bin indicates that sample adaptive offset is applied, and the fixed length portion indicating 0-degree, 90-degree, 135-degree, or 45-degree of edge offset type in a case where the sample adaptive offset type is edge offset type; and decoding the sample adaptive offset type information from the determined value in the one bin and the determined fixed length portion of the sample adaptive offset type information, the sample adaptive offset type information being used to select one of 0-degree, 90-degree, 135-degree, or 45-degree of edge offset type in a case where the sample adaptive offset type is edge offset type, wherein the decoded sample adaptive offset type information is for a largest coding unit.

* * * * *